United States Patent
Kobayashi

(10) Patent No.: US 8,694,447 B2
(45) Date of Patent: Apr. 8, 2014

(54) INFORMATION PROCESSING APPARATUS, INFORMATION PROCESSING METHOD, AND PROGRAM

(75) Inventor: Yoshiyuki Kobayashi, Tokyo (JP)

(73) Assignee: Sony Corporation, Tokyo (JP)

( * ) Notice: Subject to any disclaimer, the term of this patent is extended or adjusted under 35 U.S.C. 154(b) by 258 days.

(21) Appl. No.: 12/954,145

(22) Filed: Nov. 24, 2010

(65) Prior Publication Data

US 2011/0137837 A1     Jun. 9, 2011

(30) Foreign Application Priority Data

Dec. 4, 2009   (JP) ................................ P2009-277083

(51) Int. Cl.
    *G06F 15/18* (2006.01)
(52) U.S. Cl.
    USPC .......................................................... 706/13
(58) Field of Classification Search
    None
    See application file for complete search history.

(56) References Cited

U.S. PATENT DOCUMENTS

| 6,493,686 | B1 * | 12/2002 | Francone et al. ............... 706/12 |
| 7,308,418 | B2 * | 12/2007 | Malek et al. .................. 705/7.32 |
| 8,041,666 | B2 * | 10/2011 | Vossen et al. .................... 706/47 |
| 8,175,998 | B2 * | 5/2012 | Weiler et al. .................... 706/47 |
| 2008/0021855 | A1 * | 1/2008 | Bonabeau et al. .............. 706/46 |
| 2008/0154808 | A1 * | 6/2008 | Grieco ............................ 706/13 |
| 2008/0183648 | A1 * | 7/2008 | Goldberg et al. ............... 706/13 |

FOREIGN PATENT DOCUMENTS

JP          2009-048266          3/2009

OTHER PUBLICATIONS

Tokui et al, Music Composition with Interactive Evolutionary Computation, 2000.*
Tang et al, An Adaptive Fitness Function for Evolutionary Algorithms Using Heuristics and Prediction, 2006.*

* cited by examiner

*Primary Examiner* — Jeffrey A Gaffin
*Assistant Examiner* — Mikayla Chubb
(74) *Attorney, Agent, or Firm* — Finnegan, Henderson, Farabow, Garrett & Dunner, L.L.P.

(57) ABSTRACT

An information processing apparatus is disclosed. The apparatus may include a processing method preparation unit for generating a first processing method. The apparatus may include an evaluator generation unit for generating an evaluator based on a genetic algorithm, using one or more input data sets, each of which may include data and a corresponding evaluation value. The apparatus may include an evaluation unit for calculating, using the evaluator, a first evaluation value using first output data obtained by processing the data using the first processing method. The apparatus may include a processing method update unit for generating a second processing method such that a second evaluation value calculated by the evaluator, using second output data obtained by processing the data using the second processing method, is higher than the first evaluation value. The apparatus may include an output unit that outputs the second output data and the second processing method.

9 Claims, 39 Drawing Sheets

EXAMPLE OF ALGORITHM WHOSE CORRECT ANSWER IS NOT UNIQUELY DETERMINED
(TIME-SERIES PREDICTION ALGORITHM)

OIL PAINTING FILTER CONSTRUCTION

FIG.6

(EXAMPLE OF DATA SET)

|         | OIL PAINTING? |
|---------|---------------|
| IMAGE 1 | YES           |
| IMAGE 2 | YES           |
| ⋮       | ⋮             |
| IMAGE N | NO            |

FIG.16

EXAMPLE OF MOTION DATA

| TIME | 1 | 2 | 3 | 4 | ... | d |
|---|---|---|---|---|---|---|
| X-COORDINATE | 0.5 | 0.6 | 0.6 | 0.6 | ... | 0.7 |
| Y-COORDINATE | 0.5 | 0.5 | 0.6 | 0.6 | ... | 0.5 |
| Z-COORDINATE | 0.5 | 0.5 | 0.5 | 0.6 | ... | 0.6 |

FIG.17

EXAMPLE OF DATA SET

| | BUTTERFLY'S MOTION? |
|---|---|
| MOTION 1 | YES |
| MOTION 2 | YES |
| ⋮ | ⋮ |
| MOTION N | NO |

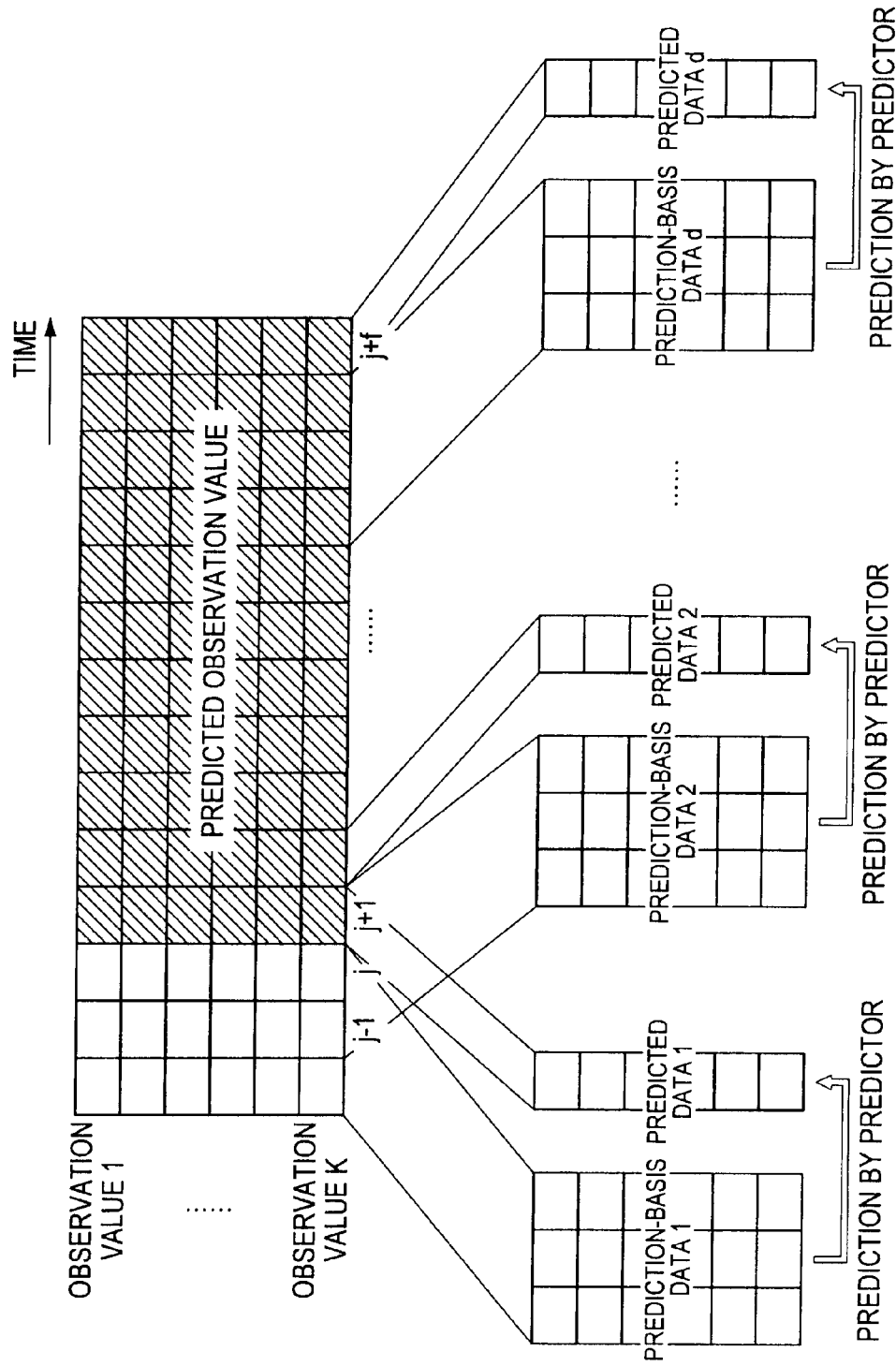

INFORMATION PROCESSING APPARATUS, INFORMATION PROCESSING METHOD, AND PROGRAM

BACKGROUND OF THE INVENTION

1. Field of the Invention

The present invention relates to an information processing apparatus, an information processing method, and a program.

2. Description of the Related Art

In recent years, a method is gaining attention that is for automatically extracting, from an arbitrary data group for which it is difficult to quantitatively determine a feature, a feature quantity of the data group. For example, a method of taking arbitrary music data as an input and automatically constructing an algorithm for automatically extracting the music genre to which the music data belongs is known. The music genres, such as jazz, classics and pops, are not quantitatively determined according to the type of instrument or performance mode. Accordingly, in the past, it was generally considered difficult to automatically extract the music genre from music data when arbitrary music data was given.

However, in reality, features that separate the music genres are potentially included in various combinations of information items such as a combination of pitches included in music data, a manner of combining pitches, a combination of types of instruments, a structure of a melody line or a bass line. Accordingly, a study of a feature quantity extractor has been conducted with regard to the possibility of automatic construction, by machine learning, of an algorithm for extracting such feature (hereinafter, feature quantity extractor). As one study result, there can be cited an automatic construction method, described in JP-A-2009-48266, of a feature quantity extractor based on a genetic algorithm. The genetic algorithm is an algorithm that mimics the biological evolutionary process and takes selection, crossover and mutation into consideration in the process of machine learning.

By using the feature quantity extractor automatic construction algorithm described in the patent document mentioned above, a feature quantity extractor for extracting, from arbitrary music data, a music genre to which the music data belongs can be automatically constructed. Also, the feature quantity extractor automatic construction algorithm described in the patent document is highly versatile and is capable of automatically constructing a feature quantity extractor for extracting, not only from the music data but also from arbitrary data group, a feature quantity of the data group. Accordingly, the feature quantity extractor automatic construction algorithm described in the patent document is expected to be applied to feature quantity analysis of artificial data such as music data and image data and feature quantity analysis of various observation quantities existing in nature.

SUMMARY OF THE INVENTION

The feature quantity extractor automatic construction algorithm described in the patent document has been developed to be used for analysis of a feature quantity of arbitrary data. However, although, on the one hand, analysis of existing data is desired, on the other hand, creation of new data having the same feature as the existing data is also desired. For example, creation, from certain image data, of new image data with higher image resolution is desired. Also, creation, from image data having a certain type of feature, of new image data having another feature is desired. Of course, creation of new data with changed property or feature is desired not only for the image data but also for music data, arbitrary time-series data and the like.

Input data which is a target issue and single output data which is an answer to that target issue have to be given, as data for learning used for automatic construction of feature quantity extractor, to the feature quantity extractor automatic construction algorithm described in the patent document. Accordingly, it is difficult with the feature quantity extractor automatic construction algorithm described in the patent document to construct a feature quantity extractor for solving a target issue whose answer is not uniquely determined and extracting a feature quantity. Thus, when using machine learning based on the genetic algorithm, it is also difficult, as with the feature quantity extractor automatic construction algorithm described in the patent document, to automatically construct an algorithm for solving a target issue whose answer is not uniquely determined.

For example, a motion prediction algorithm for predicting motion of a living thing is constructed based on data for learning having, as input data, motion of the living thing observed at a certain time point and having, as output data, motion of the living thing observed at the next time point. However, motion of a living thing has a random nature, and thus it is difficult to say that the output data for learning is correct. Also, a pattern creation algorithm for creating a beautiful pattern is constructed based on data for learning having, as input data, certain image data and having, as output data, image data with a beautiful pattern obtained by processing the certain image data. However, what kind of pattern is a beautiful pattern is not uniquely determined. That is, there are a plurality of types of correct output data.

Furthermore, output data that can be used for learning by the feature quantity extractor automatic construction algorithm described in the patent document is limited to a scalar quantity. Thus, when using machine learning based on the genetic algorithm, it is also difficult, as with the feature quantity extractor automatic construction algorithm described in the patent document, to automatically construct an algorithm for solving a target issue whose answer is not a scalar quantity. For example, an image quality enhancement algorithm for increasing image quality of image data is constructed based on data for learning having, as input data, low-resolution image data and having, as output data, high-resolution image data. In this case, the low-resolution image data can be easily created by changing the resolution of the high-resolution image data, and thus the output data (high-resolution image data) can be uniquely given.

However, the output data is given by pixel values of a plurality of pixels forming image data. Thus, a parameter to be optimized by the image quality enhancement algorithm is not uniquely determined. That is, whether a mean error between output data created by the image quality enhancement algorithm and the output data given for learning is to be minimized, or whether the maximum error is to be minimized, or whether an error of average pixel values is to be minimized is not automatically determined. If a criterion for image quality is set to the mean error and an image quality enhancement algorithm that minimizes the mean error is constructed, the mean error will surely be small for the output data output from the image quality enhancement algorithm. However, that output data will not infallibly be image data that a person perceives as high image quality.

In light of the foregoing, it is desirable to provide an information processing apparatus, an information processing method and a program, which are new and improved, and which are capable of obtaining an answer to a target issue whose correct answer is not uniquely determined or an answer to a target issue whose answer is not a scalar quantity.

According to an embodiment of the present invention, there is provided an information processing apparatus which includes a processing method preparation unit that prepares a processing method for data, an evaluation unit that calculates an evaluation value of output data obtained in a case data is processed by the processing method prepared by the processing method preparation unit, by using an evaluator for calculating the evaluation value from the data, the evaluator being automatically created by using a plurality of data sets including data and an evaluation value of the data and performing a learning process based on a genetic algorithm, a processing method update unit that repeatedly updates the processing method and calculates a processing method by which the evaluation value to be calculated by the evaluation unit will be higher, and an output unit that outputs, in a case the evaluation value of output data obtained in a case data is processed by the processing method calculated by the processing method update unit satisfies a predetermined condition, the output data, a combination of the output data and the processing method, or the processing method.

The information processing apparatus may further include a data set input unit that inputs the data set including data and an evaluation value of the data, and an evaluator creation unit that automatically creates an evaluator for calculating the evaluation value from the data by using a plurality of data sets input from the data set input unit and performing the learning process based on the genetic algorithm.

The information processing apparatus may further include a feedback acquisition unit that receives an evaluation by a user of the output data or the combination of the output data and the processing method output from the output unit. The evaluator creation unit may automatically create the evaluator by adding, to the plurality of data sets, a data set including an evaluation value acquired by the feedback acquisition unit from the user and the output data corresponding to the evaluation value and performing again the learning process based on the genetic algorithm.

The information processing apparatus may further include a data processing unit that processes input data, input by a user, by the processing method prepared by the processing method preparation unit or the processing method updated by the processing method update unit and creates the output data.

The information processing apparatus may further include a data processing unit that processes predetermined initial data or randomly created initial data by the processing method prepared by the processing method preparation unit or the processing method updated by the processing method update unit and creates the output data.

The processing method may be a processing method of calculating a prediction value of data to be observed at a certain time t from data observed before the time t. The output unit may output at least the processing method. The information processing apparatus may further include a time-series prediction unit that predicts time-series data of an observation value from a certain time point to a future time point by using the observation value at a certain time point as initial data and by repeatedly applying the processing method output from the output unit.

The data set input unit does not have to input the data set. In a case an evaluation by a user of output data created by a random processing method is obtained, the evaluator creation unit may automatically create the evaluator by using a data set including an evaluation value obtained from the user and output data corresponding to the evaluation value.

According to another embodiment of the present invention, there is provided an information processing method which includes the steps of preparing a processing method for data, calculating an evaluation value of output data obtained in a case data is processed by the processing method prepared in the step of preparing, by using an evaluator for calculating the evaluation value from the data, the evaluator being automatically created by using a plurality of data sets including data and an evaluation value of the data and performing a learning process based on a genetic algorithm, repeatedly updating the processing method, performing the step of calculating at every update, and calculating a processing method by which the evaluation value to be calculated by the evaluation unit will be higher, and outputting, in a case the evaluation value of output data obtained in a case data is processed by the processing method calculated in the step of repeatedly updating satisfies a predetermined condition, the output data, a combination of the output data and the processing method, or the processing method.

According to another embodiment of the present invention, there is provided a program for causing a computer to realize a processing method preparation function of preparing a processing method for data, an evaluation function of calculating an evaluation value of output data obtained in a case data is processed by the processing method prepared by the processing method preparation function, by using an evaluator for calculating the evaluation value from the data, the evaluator being automatically created by using a plurality of data sets including data and an evaluation value of the data and performing a learning process based on a genetic algorithm, a processing method update function of repeatedly updating, based on the genetic algorithm, the processing method and calculating a processing method by which the evaluation value to be calculated by the evaluation function will be higher, and an output function of outputting, in a case the evaluation value of output data obtained in a case data is processed by the processing method calculated by the processing method update function satisfies a predetermined condition, the output data, a combination of the output data and the processing method, or the processing method.

According to another embodiment of the present invention, there is provided a recording medium in which the program is recorded, the recording medium being able to be read by a computer.

According to the embodiments of the present invention described above, it is possible to obtain an answer to a target issue whose correct answer is not uniquely determined or an answer to a target issue whose answer is not a scalar quantity.

BRIEF DESCRIPTION OF THE DRAWINGS

FIG. 6 is an explanatory diagram showing an example of a data set used by the oil painting filter automatic construction system according to the embodiment;

FIG. 16 is an explanatory diagram showing an example of motion data used by the pseudo-motion creator automatic construction system according to the embodiment;

FIG. 17 is an explanatory diagram showing an example of a data set used by the pseudo-motion creator automatic construction system according to the embodiment;

FIG. 44 is an explanatory diagram showing an application (application example 3) to a prediction algorithm for time-series data.

DETAILED DESCRIPTION OF THE EMBODIMENT(S)

Figure 1:
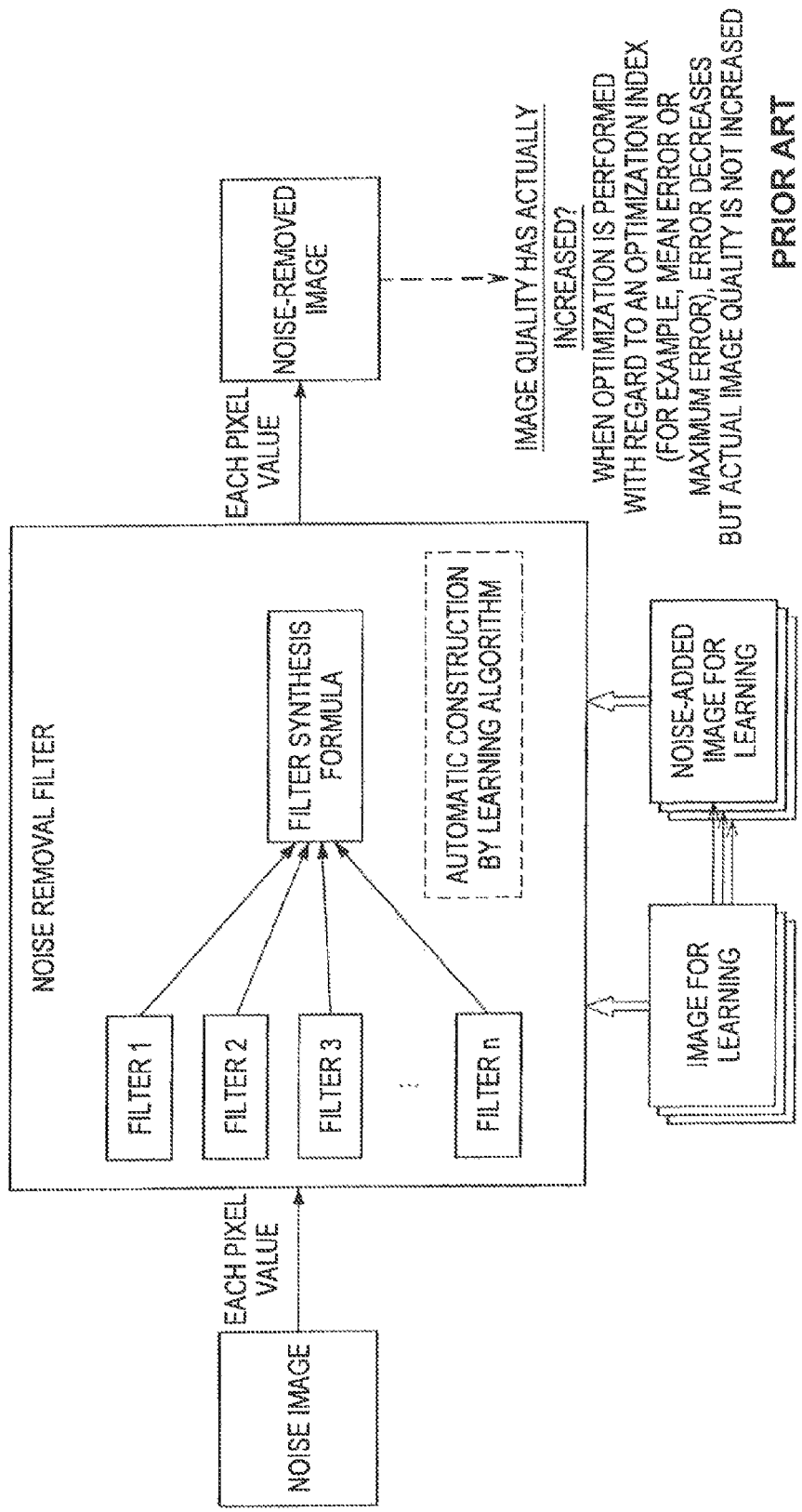
FIG. 1 is an explanatory diagram showing an example of a noise removal filter for an image constructed by machine learning based on a genetic algorithm.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

<Flow of Description>

The flow of a description of embodiments of the present invention described later will be briefly mentioned here. First, a difficulty of obtaining an answer to a target issue whose correct answer is not uniquely determined or an answer to a target issue whose answer is not a scalar quantity by using the feature quantity extractor automatic construction algorithm described in JP-A-2009-48266 will be briefly described with reference to FIGS. 1 and 2.

Next, an overview of an oil painting filter automatic construction system according to a first embodiment of the present invention will be described with reference to FIG. 3. Then, functional configurations of information processing apparatuses 100, 150 (oil painting filter automatic construction system) according to the embodiment will be described with reference to FIGS. 4 and 5. Also, a function of each structural element configuring the information processing apparatuses 100, 150 will be described in detail with reference to FIGS. 6 to 12.

Next, an overview of a pseudo-motion creator automatic construction system according to a second embodiment of the present invention will be described with reference to FIG. 13. Then, functional configurations of information processing apparatuses 200, 250 (pseudo-motion creator automatic construction system) according to the embodiment will be described with reference to FIGS. 14 and 15. Also, a function of each structural element configuring the information processing apparatuses 200, 250 will be described in detail with reference to FIGS. 16 to 26.

Figure 27:
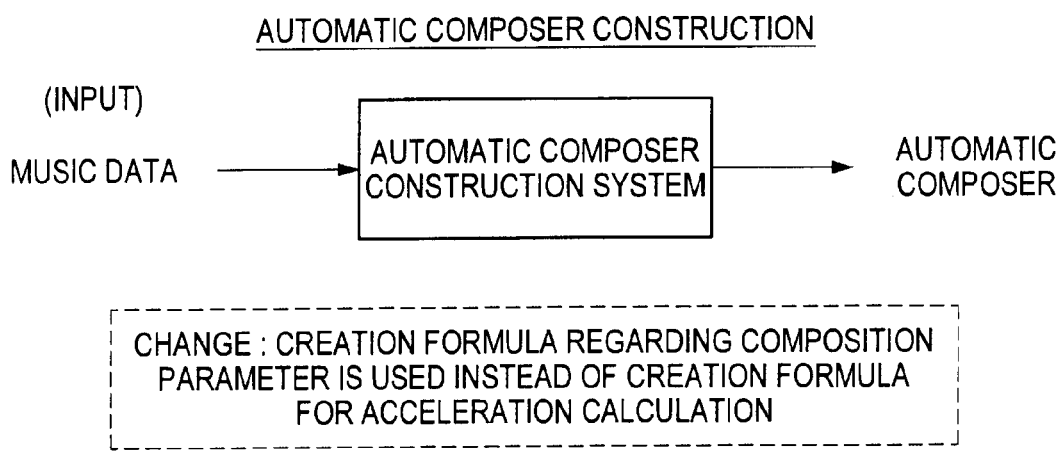
FIG. 27 is an explanatory diagram showing an overview of an automatic composer construction system according to a first application example of the embodiment.

Next, an automatic composer construction system according to a third embodiment of the present invention will be described with reference to FIG. 27. Then, an image/video automatic creator construction system according to a fourth embodiment of the present invention will be described with reference to FIG. 28. Then, an example of a hardware configuration capable of realizing functions of the systems according to the first to fourth embodiments of the present invention will be described with reference to FIG. 29.

Next, a method of automatically constructing, by machine learning based on a genetic algorithm, an evaluator for calculating an evaluation criterion for output data will be described with reference to FIGS. 30 to 43. Then, a method of applying technologies according to the first to fourth embodiments of the present invention to a prediction algorithm for time-series data will be described with reference to FIG. 44. Lastly, technical ideas of the embodiments will be summarized, and operational effects obtained by the technical ideas will be briefly described.

(Description Items)
1: Introduction
  1-1: Example of Algorithm Whose Output Data is Not Scalar Quantity
  1-2: Example of Algorithm Whose Correct Answer is Not Uniquely Determined
2: First Embodiment
  2-1: Overview of Oil Painting Filter Automatic Construction System
  2-2: Functional Configurations of Information Processing Apparatuses 100, 150
  2-3: Oil-Painting-Like Image Creation Method
3: Second Embodiment
  3-1: Overview of Pseudo-Motion Creator Automatic Construction System
  3-2: Functional Configurations of Information Processing Apparatuses 200, 250
  3-3: Pseudo-Motion Creation Method
4: Third Embodiment (Automatic Composer Construction system)
5: Fourth Embodiment (Image/Video Automatic Creator Construction System)
6: Hardware Configuration Example
7: Evaluator Automatic Construction Method
8: Application Example (Prediction Algorithm for Time-Series Data)
9: Summary <1: Introduction>

First, an example of an algorithm which is difficult to automatically construct by an algorithm automatic construction method described in JPA-2009-48266 (Document 1) will be described.

<1-1: Example of Algorithm Whose Output Data is Not Scalar Quantity>

The algorithm automatic construction method described in Document 1 mentioned above is not capable of automatically constructing an algorithm whose output data is not a scalar quantity. A noise removal filter as shown in FIG. 1 can be cited as an example of such algorithm. This noise removal filter is an image processing filter for removing noise from image data that is input.

In the case of constructing the noise removal filter by using the algorithm automatic construction method described in Document 1 mentioned above, the noise removal filter is constructed by preparing multiple pieces of data of image for learning and multiple pieces of data of noise-added image for learning obtained by adding noise to the image for learning and inputting these pieces of data to a learning algorithm. At this time, the pixel value of each pixel forming the noise-added image for learning is made to be input data, and the pixel value of each pixel forming the image for learning is made to be output data.

The learning algorithm combines a plurality of image processing filters 1 to n prepared in advance, and creates a filter synthesis formula. At this time, the learning algorithm creates an optimal filter synthesis formula by changing types of image processing filters to be combined, a parameter of each image processing filter and the like so as to minimize the error between output data obtained by inputting the noise-added image for learning to the filter synthesis formula and the image for learning. The filter synthesis formula created in this manner constructs the noise removal filter.

However, image quality is not increased for all the image data after noise removal obtained by inputting arbitrary noise-added image data to this noise removal filter. For example, in the case the noise removal filter is constructed in the above-described process of creating the optimal filter synthesis formula such that the mean error between the output data obtained by inputting the noise-added image for learning to the filter synthesis formula and the image for learning is minimized, the mean error between the both becomes small. However, the image quality of the noise-removed image that is actually output from the noise removal filter described above appears, to the human eye, to be not increased.

On the other hand, if an index (for example, a mean error, a maximum error, a difference between average pixel values) to be optimized at the time of creation of the filter synthesis formula is not determined, it is not possible to create the filter synthesis formula which is to be the noise removal filter. Accordingly, the algorithm automatic construction method according to Document 1 mentioned above is not capable of automatically constructing an algorithm, such as the noise removal filter, whose output data is not a scalar quantity. Additionally, the reason that an optimal noise-removed image is not created by the noise removal filter created by specifying an optimization index such as the mean error is that optimization regarding an index is not optimization to visual characteristics of human beings. Therefore, to automatically construct an algorithm whose output data is not a scalar quantity, a new method of correctly evaluating the quality of the output data becomes necessary.

The technology of an embodiment described later relates to a technology for enabling to correctly perform such evaluation.

<1-2: Example of Algorithm Whose Correct Answer is Not Uniquely Determined>

Furthermore, the algorithm automatic construction method described in Document 1 mentioned above is not capable of automatically constructing an algorithm whose correct output data (correct answer) is not uniquely determined. A time-series prediction algorithm shown in FIG. 2 can be cited as an example of such algorithm. This time-series prediction algorithm is an algorithm for predicting, from time-series data of observation value observed in the past, time-series data of observation value which will be observed in the future.

In the case of constructing the time-series prediction algorithm by using the algorithm automatic construction method described in Document 1 mentioned above, the time-series prediction algorithm is constructed by preparing multiple observation values observed before a predetermined time and multiple observation values observed after the predetermined time and inputting these observation values in learning algorithm. At this time, the observation values observed before the predetermined time are made to be input data, and the observation values observed after the predetermined time are made to be output data. In this case, the output data for learning is a scalar quantity. However, the feature of the time-series data of observation value is not uniquely determined.

Figure 2:
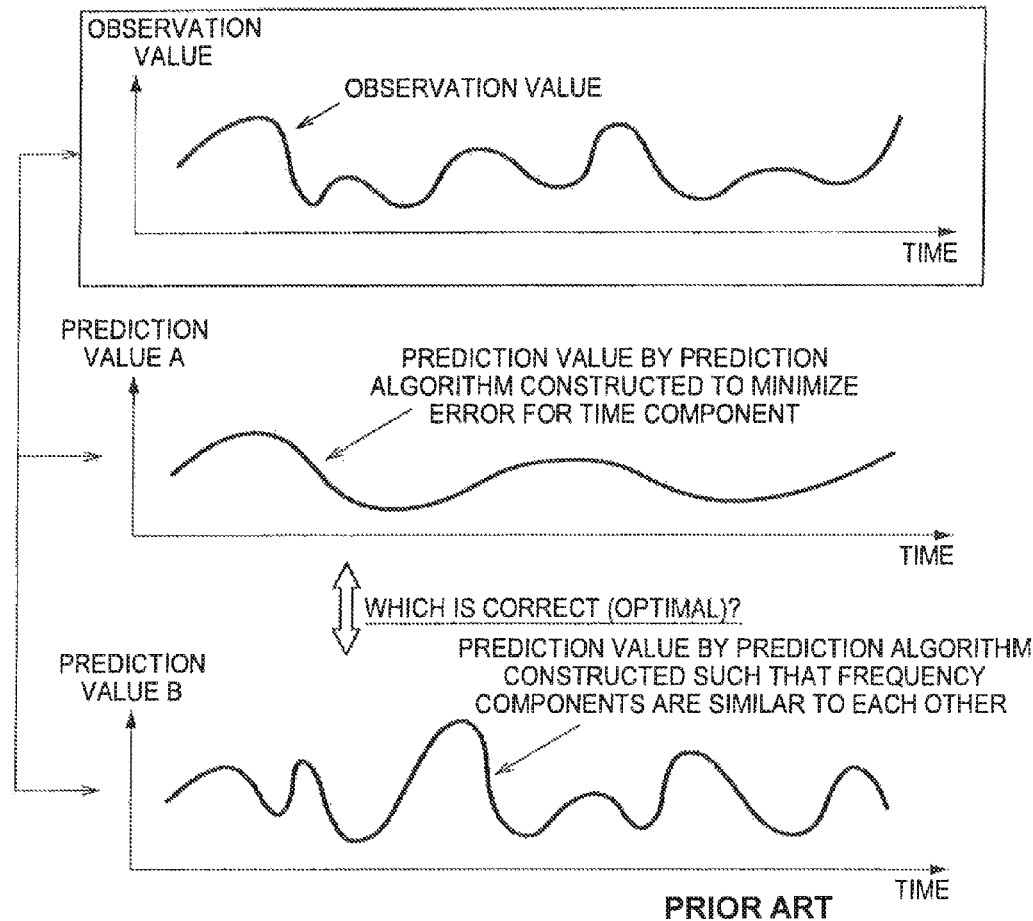
FIG. 2 is an explanatory diagram showing an example of a time-series prediction algorithm constructed by machine learning based on a genetic algorithm.

For example, time-series data of observation value obtained by observing motion of a living thing will considered. Motion of a living thing has a random nature (featureless motion). Therefore, even if an attempt is made to observe movement of position of a living thing and capture a feature of time-series data of the position, featureless motion is included, and thus a time-series prediction algorithm that copies the motion is not constructed. That is, it is not possible to express probabilistic motion by a deterministic algorithm. Furthermore, as shown in FIG. 2, a target to be mimicked (for example, whether to mimic in time domain or in frequency domain) is also not uniquely determined. Therefore, to automatically construct an algorithm whose correct answer is not uniquely determined, a new method of uniquely evaluating the quality of the output data becomes necessary.

The technology of an embodiment described later relates to a technology for enabling to correctly perform such evaluation.

As described above, in a case the output data is not a scalar quantity or in a case the correct answer is not uniquely determined, an appropriate evaluation criterion is not determined, and thus the algorithm automatic construction method described in Document 1 is not capable of constructing an algorithm capable of obtaining appropriate output data. Accordingly, the inventor of the present invention has devised a method of automatically constructing or obtaining an evaluator for determining an appropriate evaluation criterion and automatically creating an algorithm whose output data is not a scalar quantity or an algorithm whose correct answer is not uniquely determined by using the evaluator. By using this method, a noise removal filter capable of obtaining a desirable output, a desirable time-series prediction algorithm and the like can be automatically constructed, for example. In the following, an embodiment according to the present invention will be described.

<2: First Embodiment>

First, a first embodiment of the present invention will be described. The present embodiment relates to a construction method of an oil painting filter. In the following, an explanation will be sequentially given on an overview of an oil painting filter automatic construction system according to the present embodiment, functional configurations of information processing apparatuses 100, 150 capable of realizing a function of the oil painting filter automatic construction system and a creation method of an oil-painting-like image by an oil painting filter. Additionally, although an oil painting filter is taken as an example here, extension is possible to an automatic construction method of an arbitrary algorithm whose output data is not a scalar quantity and a creation method of output data by the algorithm.

<2-1: Overview of Oil Painting Filter Automatic Construction System>

First, an overview of a function of the oil painting filter automatic construction system according to the present embodiment will be described with reference to FIG. 3. FIG. 3 is an explanatory diagram showing an overview of a function of the oil painting filter automatic construction system according to the present embodiment.

Figure 3:
FIG. 3 is an explanatory diagram showing an overview of an oil painting filter automatic construction system according to a first embodiment of the present invention.

As shown in FIG. 3, the oil painting filter automatic construction system is a system for automatically constructing an oil painting filter. First, the oil painting filter automatic construction system automatically creates an evaluator that outputs "likeness to an oil painting (hereinafter, oil painting likeness)" by using multiple data sets for learning including an oil painting image, a non-oil-painting image and correct answer information indicating "oil painting" or "not oil painting" and performing machine learning based on a genetic algorithm.

Next, the oil painting filter automatic construction system creates a first generation oil painting filter by randomly combining image processing filters. Then, the oil painting filter automatic construction system creates an oil-painting-like image by inputting an image to the first generation oil painting filter. Then, the oil painting filter automatic construction system calculates an evaluation value by inputting the created oil-painting-like image to the evaluator. Then, the oil painting filter automatic construction system creates a second generation oil painting filter from the first generation oil painting filter based on the genetic algorithm such that the evaluation value will be high (generation change).

The oil painting filter automatic construction system repeats the generation change until the evaluation value calculated by the evaluator satisfies a predetermined terminating condition, and outputs an oil painting filter of a last generation that satisfied the predetermined terminating condition. Also, the oil painting filter automatic construction system converts an image which is a conversion target into an oil-painting-like image by using the constructed oil painting filter, and outputs the oil-painting-like image.

Heretofore, an overview of the function of the oil painting filter automatic construction system has been described. As described above, the oil painting filter automatic construction system creates an evaluator by machine learning based on the genetic algorithm, and evaluates the oil painting likeness by using the evaluator. Then, the oil painting filter automatic construction system automatically constructs an oil painting filter for which evaluation by the evaluator will be high. According to such configuration, even if an optimization index is not specified by a user, an oil painting filter whose output data is not a scalar quantity can be appropriately constructed.

<2-2: Functional Configurations of Information Processing Apparatuses 100, 150>

Figure 4:
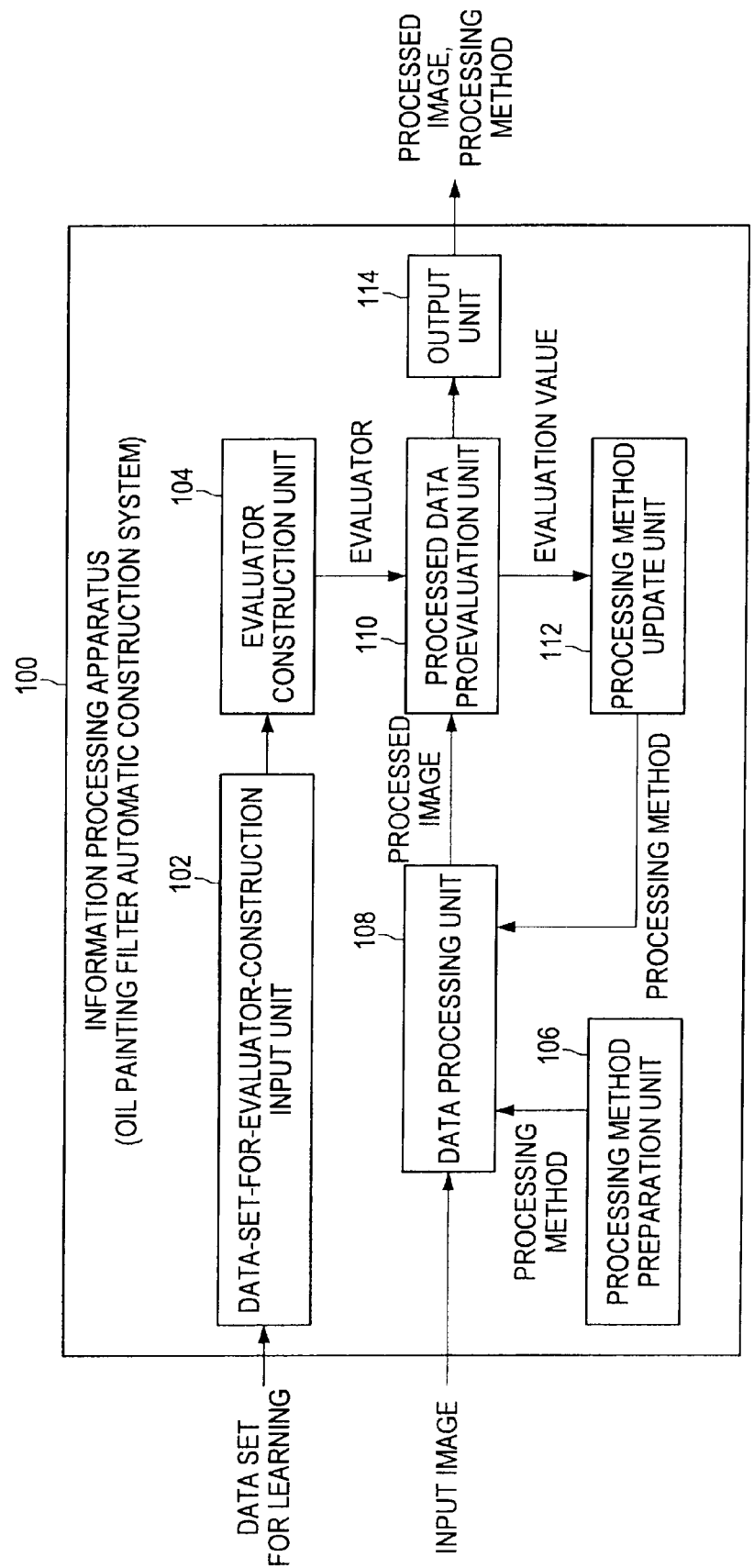
FIG. 4 is an explanatory diagram showing a functional configuration of an information processing apparatus (oil painting filter automatic construction system) according to the embodiment.
Figure 5:
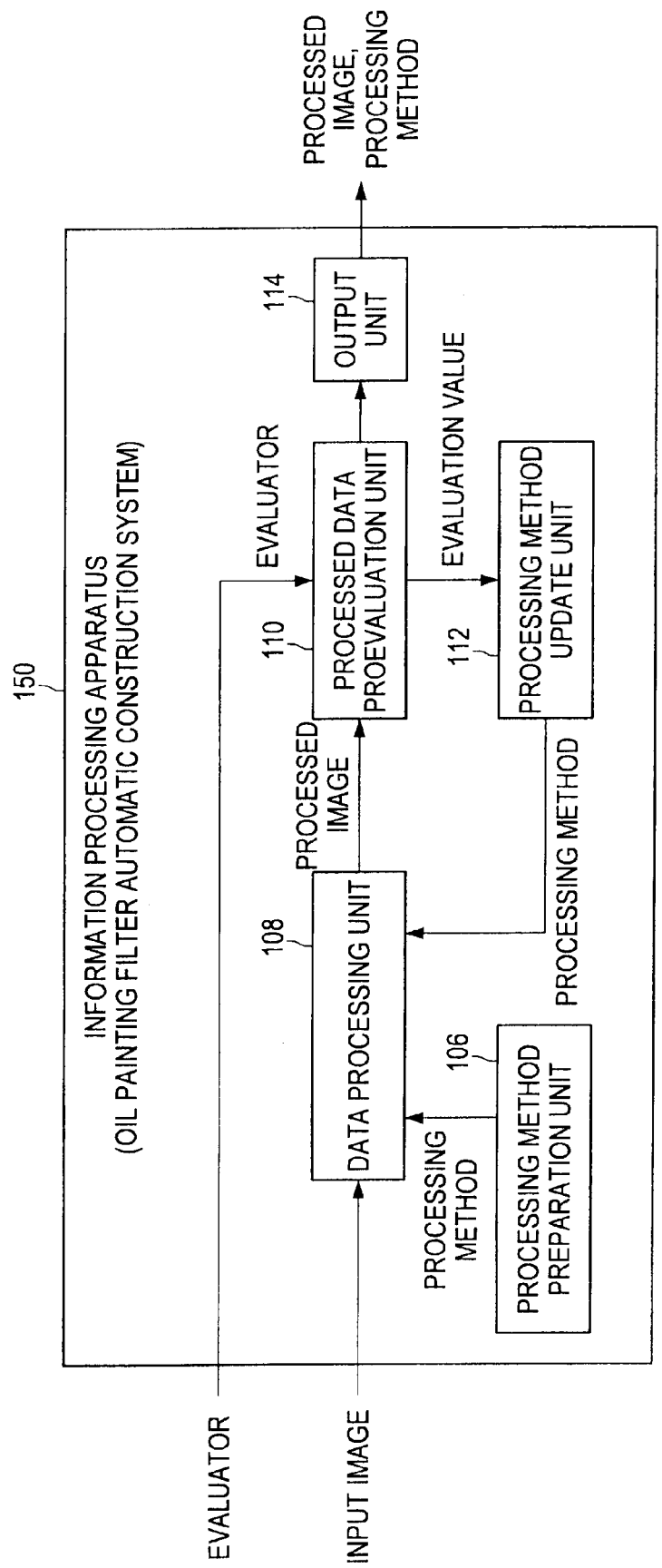
FIG. 5 is an explanatory diagram showing a functional configuration of an information processing apparatus (oil painting filter automatic construction system) according to a modified example of the embodiment.

Next, functional configurations of the information processing apparatuses 100, 150 according to the present embodiment will be described with reference to FIGS. 4 and 5. FIG. 4 is an explanatory diagram showing an example of a functional configuration of the information processing apparatus 100 according to the present embodiment. On the other hand, FIG. 5 is an explanatory diagram showing an example of a functional configuration of the information processing apparatus 150 according to the present embodiment. Additionally, structural elements of the information processing apparatuses 100, 150 having substantially the same function are denoted with the same reference numerals so as to clearly indicate the correspondence relationship between the structural elements.

(Functional Configuration of Information Processing Apparatus 100)

As shown in FIG. 4, the information processing apparatus 100 mainly includes a data-set-for-evaluator-construction input unit 102, an evaluator construction unit 104, a processing method preparation unit 106, a data processing unit 108, a processed data evaluation unit 110, a processing method update unit 112, and an output unit 114. In the following, a function of each structural element will be described along a flow of automatic construction processing for evaluator, a flow of automatic construction processing for oil painting filter and a flow of processing for input image. Additionally, for the sake of explanation, a genetic algorithm is assumed to be used for the process by the processing method update unit 112 described later. However, any method, such as local search and simulated annealing, may be used as long as the method is capable of optimizing an element.

(Automatic Construction of Evaluator)

First, the data-set-for-evaluator-construction input unit 102 acquires a data set for learning (hereinafter, a data set for evaluator construction) and inputs the same to the evaluator construction unit 104. The data-set-for-evaluator-construction input unit 102 may acquire the data set for evaluator construction from an external device via a network or may acquire the data set for evaluator construction from a recording device (not shown) installed in the information processing apparatus 100. Furthermore, the data-set-for-evaluator-construction input unit 102 may also be connected to an input device for a user to manually input correct answer information.

Figure 7:
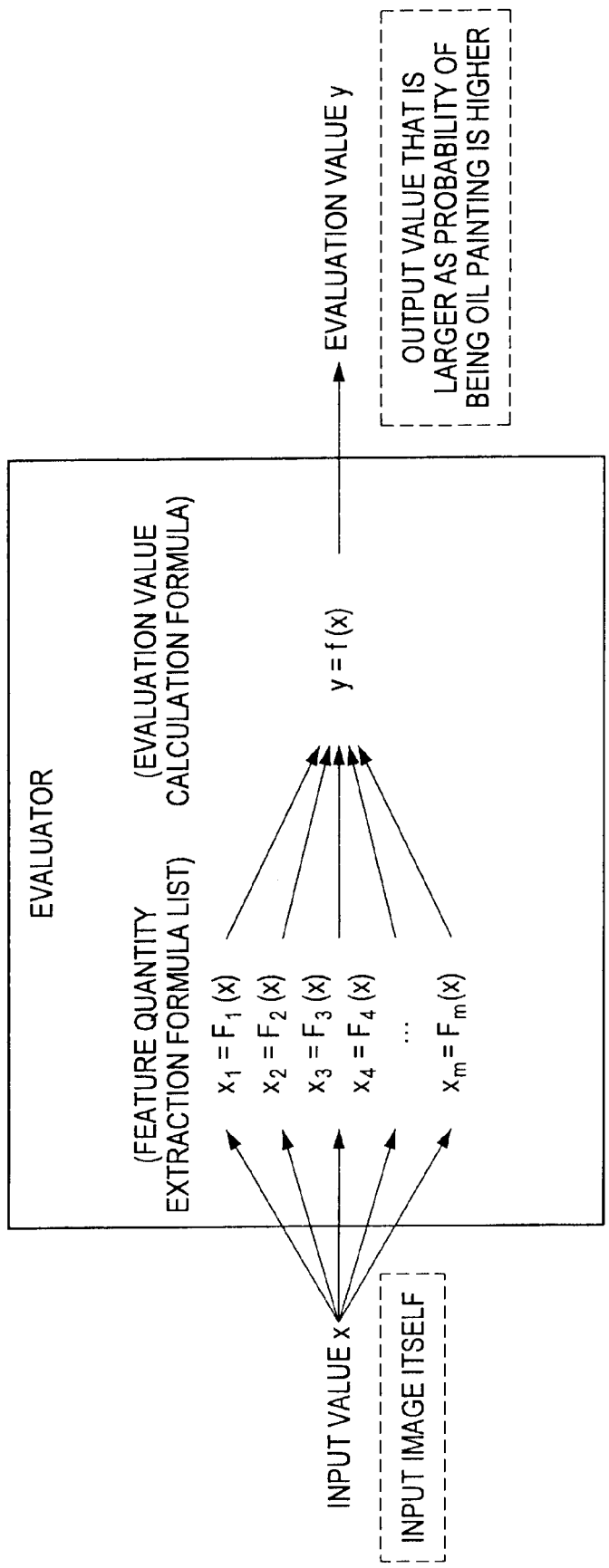
FIG. 7 is an explanatory diagram showing an overview of a construction process of an evaluator performed by the oil painting filter automatic construction system according to the embodiment.

Furthermore, as shown in FIG. 6, the data set for evaluator construction is formed from a plurality of images for learning and pieces of correct answer information indicating whether the images for learning are an oil painting or not. When such data set for evaluator construction is input, the evaluator construction unit 104 constructs an evaluator by machine learning based on the genetic algorithm. Additionally, details of a construction algorithm for the evaluator will be described later. Here, an overview of the construction algorithm for the evaluator will be briefly described with reference to FIG. 7. As shown in FIG. 7, the evaluator is constructed by combination (for example, linear combination) of feature quantity extraction formulae created by combinations of a plurality of processing functions prepared in advance.

First, the evaluator construction unit 104 creates a plurality of feature quantity extraction formulae (a first generation feature quantity extraction formula list) according to which scalar quantities are calculated. Then, the evaluator construction unit 104 takes an image for learning included in the data set for evaluator construction as input value x and calculates a plurality of feature quantities by inputting input value x to each of the feature quantity extraction formulae in the first generation feature quantity extraction formula list. Then, the evaluator construction unit 104 creates a first generation evaluation formula by performing machine learning based on the genetic algorithm by using the plurality of feature quantities and pieces of correct answer information (for example, oil painting=1, non-oil-painting=0) included in the data set for evaluator construction. Furthermore, the evaluator construction unit 104 calculates a contribution rate to the evaluation formula for each feature quantity extraction formula.

For example, in a case the evaluation formula is expressed by the linear combination of the feature quantity extraction formulae, the evaluator construction unit 104 calculates, for each feature quantity extraction formula, a contribution rate to the evaluation formula, based on a combination coefficient of each feature quantity extraction formula. Then, the evaluator construction unit 104 makes a decision regarding a terminating condition based on the contribution rate to the evaluation formula, and in the case the terminating condition is satisfied, outputs the evaluation formula as the evaluator. On the other hand, in the case the terminating condition is not satisfied, the evaluator construction unit 104 takes the feature quantity extraction formulae included in the evaluation formula as second generation feature quantity extraction formulae, and creates, by the genetic algorithm, a second generation feature quantity extraction formula list from the second generation feature quantity extraction formulae in such a manner that elements of feature quantity extraction formulae whose contribution rates are high will tend to be maintained.

Then, the evaluator construction unit 104 uses the second generation feature quantity extraction formula list and creates a second generation evaluation formula as in the case of the first generation. Also, the evaluator construction unit 104 calculates a contribution rate of each feature quantity extraction formula to the second generation evaluation formula. Then, the evaluator construction unit 104 makes a decision regarding a terminating condition based on the contribution rate to the evaluation formula, and in the case the terminating condition is satisfied, outputs the evaluation formula as the evaluator. On the other hand, in the case the terminating condition is not satisfied, the evaluator construction unit 104 takes the feature quantity extraction formulae included in the evaluation formula as third generation feature quantity extraction formulae, and creates a third generation evaluation formula as in the case of the second generation. In this manner, generation change is repeated until the terminating condition is satisfied, and, at the time point the terminating condition is satisfied, the evaluation formula of the last generation is output as the evaluator.

The evaluator constructed by the evaluator construction unit 104 in this manner is input to the processed data evaluation unit 110. This evaluator outputs a value which is larger as the probability of an input image being an oil painting is higher and a value which is smaller as the probability of the input image being an oil painting is lower.

(Automatic Construction of Oil Painting Filter, Processing for Input Image)

When an evaluator is constructed, an oil painting filter is created based on an evaluation value obtained by using this evaluator. First, the processing method preparation unit 106 creates a processing method by combining a plurality of operators. An operator is a smallest unit of a processing method for processing an image. As the operator, a function, a filter or the like as follows is used, for example.

Trigonometric function and the like: Sin, Cos, Tan, ArcSin, . . .

Exponential function and the like: Exp.Log, Pow, Sqrt, . . .
Four arithmetic operations: Add, Multiply, . . .
Digital filter: LPF, HPF, BPF, . . .
Differential operation: Differential
Median filter: Median
Normalization operation: Normalize
White noise addition process: AddWhiteNoise
Image processing filter: Hemming, Sharpness, Blur, . . .

The processing method preparation unit 106 first creates a plurality of processing methods by randomly combining the operators. For example, the processing method preparation unit 106 creates AddWhiteNoise(Median(Blur(x))). This processing method means that a Blur filter (blur processing) is applied to input value x, a Median filter (Median filter processing) is applied to the output of the Blur filter, and a white noise is added to the output of the Median filter. The processing method preparation unit 106 creates a plurality of such processing methods and inputs them to the data processing unit 108.

Figure 8:
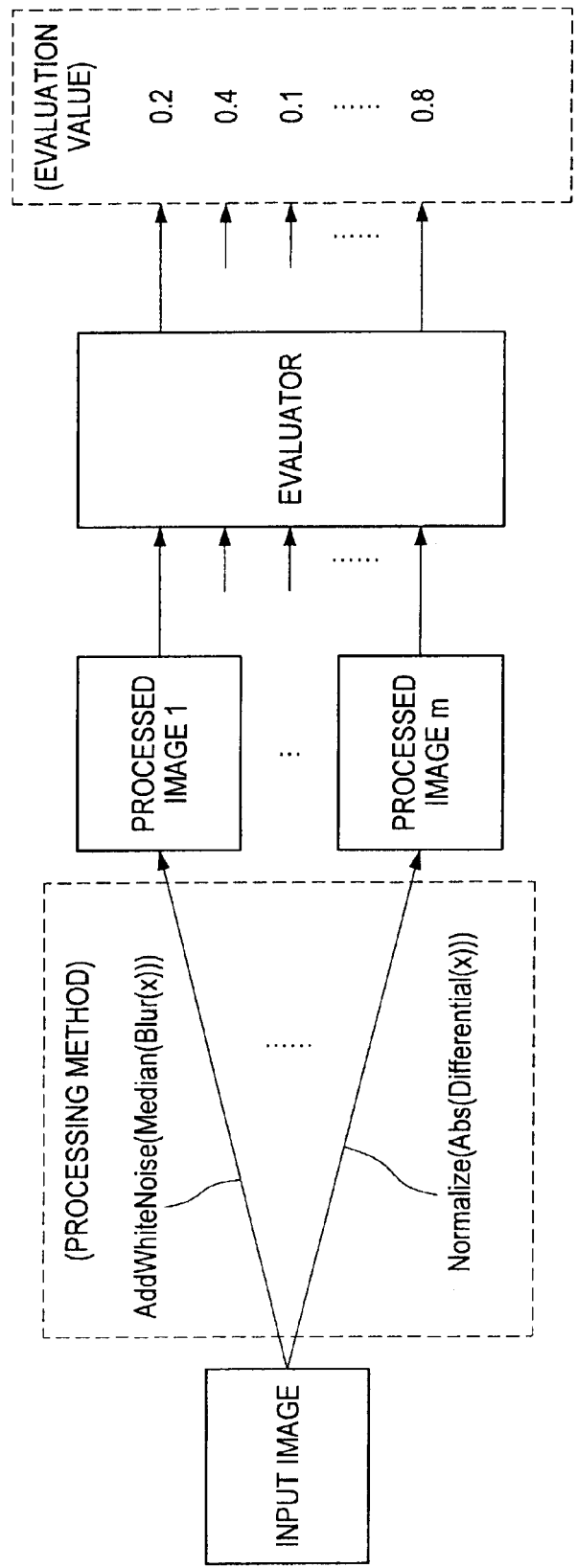
FIG. 8 is an explanatory diagram showing an overview of an evaluation process for a processing method performed by the oil painting filter automatic construction system according to the embodiment.

The data processing unit 108 creates a processed image by processing an input image by the processing method created by the processing method preparation unit 106. As shown in FIG. 8, in a case m processing methods (for example, AddWhiteNoise(Median(Blur(x))), . . . , Normalize(Abs(Differential(x)))) are created by the processing method preparation unit 106, the data processing unit 108 processes the input image by the m processing methods and creates m processed images 1 to m. Then, the data processing unit 108 inputs the processed images 1 to m to the processed data evaluation unit 110.

Figure 9:
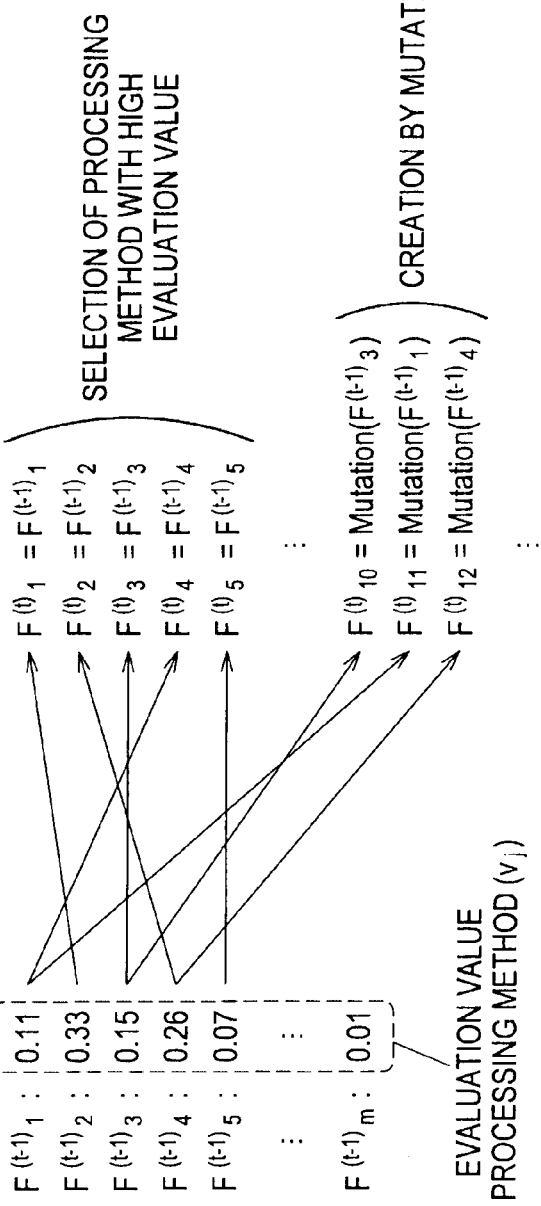
FIG. 9 is an explanatory diagram showing an overview of an update process for a processing method performed by the oil painting filter automatic construction system according to the embodiment.

As shown in FIG. 8, the processed data evaluation unit 110 inputs, to the evaluator, the processed images 1 to m input from the data processing unit 108 and calculates m evaluation values. Then, the processed data evaluation unit 110 inputs the evaluation values calculated for the respective processing methods to the processing method update unit 112. As shown in FIG. 9, the processing method update unit 112 uses the evaluation values calculated for the respective processing methods and updates the processing methods 1 to m based on the genetic algorithm.

In the following explanation, processing method 1 before update is expressed by $F^{(t-1)}_1, \ldots$, and processing method m before update by $F^{(t-1)}_m$. Also, an evaluation value of processing method $F^{(t-1)}_1$ is expressed by $v_1, \ldots$, and an evaluation value of processing method $F^{(t-1)}_m$ by $v_m$. Furthermore, processing method 1 after update is expressed by $F^{(t)}_1, \ldots$, and processing method m after update by $F^{(t-1)}_m$.

First, the processing method update unit 112 selects a predetermined number of processing methods with a high evaluation value among processing methods before update $F^{(t-1)}_1$ to $F^{(t-1)}_m$. In the example of FIG. 9, $F^{(t-1)}_2$, $F^{(t-1)}_4$, $F^{(t-1)}_3$, $F^{(t-1)}_1$, $F^{(t-1)}_5$, and the like are selected in a descending order of evaluation value. The processing method update unit 112 sets the selected processing methods as the processing methods after update. In the example of FIG. 9, $F^{(t)}_1 = F^{(t-1)}_2$, $F^{(t)}_2 = F^{(t-1)}_4$, $F^{(t)}_3 = F^{(t-1)}_3$, $F^{(t)}_4 = F^{(t-1)}_1$, $F^{(t)}_5 = F^{(t-1)}_5$, and the like are set.

Next, the processing method update unit 112 creates new processing methods by mutating a predetermined number of processing methods among processing methods before update $F^{(t-1)}_1$ to $F^{(t-1)}_m$. Then, the processing method update unit 112 sets the new processing methods as the processing methods after update. In the example of FIG. 9, mutation is expressed by a function Mutation( ) Also, in the example of FIG. 9, $F^{(t-1)}_3$, $F^{(t-1)}_1$, $F^{(t-1)}_4$, and the like are selected as the target of mutation, and are set as processing methods after update $F^{(t)}_{10}$, $F^{(t)}_{11}$, $F^{(t)}_{12}$, and the like.

Next, the processing method update unit 112 creates a predetermined number of new processing methods by randomly combining the operators. In the example of FIG. 9, random creation of a processing method is expressed by a function Random( ). Also, in the example of FIG. 9, the new processing methods that have been randomly created are set as processing methods after update $F^{(t)}_{30}$, $F^{(t)}_{31}$, $F^{(t)}_{32}$, . . . , $F^{(t)}_m$. In this manner, the processing method update unit 112 creates the processing method after update from the processing method before update based on the genetic algorithm. Then, the processing method update unit 112 inputs the processing methods after update to the data processing unit 108.

Figure 10:
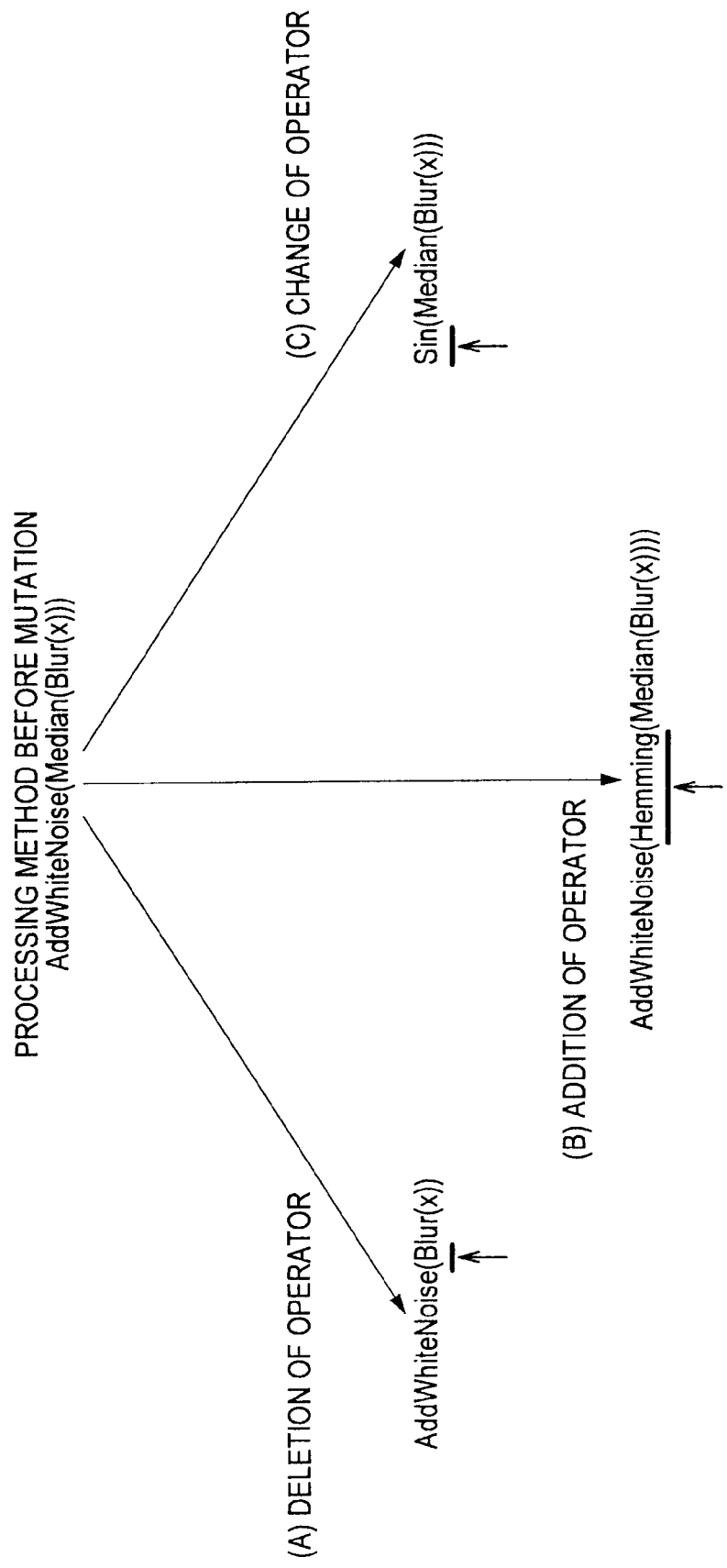
FIG. 10 is an explanatory diagram showing a mutation operation performed at the time of the update process for a processing method performed by the oil painting filter automatic construction system according to the embodiment.

Here, processing of mutation will be described with reference to FIG. 10. FIG. 10 is an explanatory diagram showing an example of processing of mutation. As shown in FIG. 10, the processing of mutation includes three types, i.e. (A) deletion of an operator, (B) addition of an operator and (C) change of an operator, and a combination of these.

For example, in the case a processing method before mutation is Add WhiteNoise(Median(Blur(x))), the processing method update unit 112 may, as a mutation process, delete operator Median( )(A). In this case, the processing method after mutation will be AddWhiteNoise(Blur(x)). Additionally, there is not limit to the types of operators to be deleted, but if input of an operator to be performed next is made invalid due to deletion of an operator, deletion of the operator is to be prohibited.

Furthermore, the processing method update unit 112 may, as a mutation process, add operator Hemming( ) (B). In this case, the processing method after mutation will be AddWhiteNoise(Hemming(Median(Blur(x)))), for example. Additionally, there is no limit to the types of operators to be added, but if input of an operator to be added is invalid or if input to an operator to be performed next is made invalid due to addition of an operator, such addition is to be prohibited.

Furthermore, the processing method update unit 112 may, as a mutation process, change operator AddWhiteNoise( ) to Sin( ) (C). In this case, the processing method after mutation will be Sin(Median(Blur(x))), for example. Additionally, there is no limit to the types of operators to be the operator after change, but if input of an operator to be the operator after change is invalid or if input to an operator to be performed next is made invalid due to a change of an operator, change to such operator is to be prohibited.

As described above, a new processing method is created by a part of a processing method being modified by addition, deletion, change or the like of an operator.

Reference will be again made to FIG. 4. When a processing method after update is input from the processing method update unit 112, the data processing unit 108 processes an input image by the processing method after update and creates a processed image. Then, the data processing unit 108 inputs the created processed image to the processed data evaluation unit 110. The processed data evaluation unit 110 inputs the processed images 1 to m input from the data processing unit 108 and calculates m evaluation values. Then, the processed data evaluation unit 110 inputs the evaluation value calculated for each processing method to the processing method update unit 112.

The processes by the processing method update unit 112, the data processing unit 108 and the processed data evaluation unit 110 are repeatedly performed in this manner. This repeating process is continued until a predetermined terminating condition is satisfied, and is ended when the predetermined terminating condition is satisfied. For example, the terminating condition is satisfied in a case a user performs an end operation, in a case an evaluation value has exceeded a predetermined threshold value, in a case the repeating process has been performed a predetermined number of times, in a case the repeating process has been continuously performed for a predetermined period of time, or in a case corresponding to combination of the above cases.

In a case the terminating condition is satisfied, a processed image created by the data processing unit 108 and a processing method created by the processing method update unit 112 in the last repeating process are output to the output unit 114. Then, the output unit 114 outputs these processed image and processing method. Additionally, the output unit 114 outputs one or both of the processed image and the processing method. In this manner, by the repeating process being performed based on the genetic algorithm, a processing method with a higher evaluation value is calculated, and the likeness to an oil painting of a processed image created by using the processing method increases.

Now, the processed image and the processing method output from the output unit 114 are presented to the user. Then, in a case a feedback relating to a degree of satisfaction to the processed image is obtained from the user, the information processing apparatus 100 updates the evaluator by using the feedback.

Figure 11:
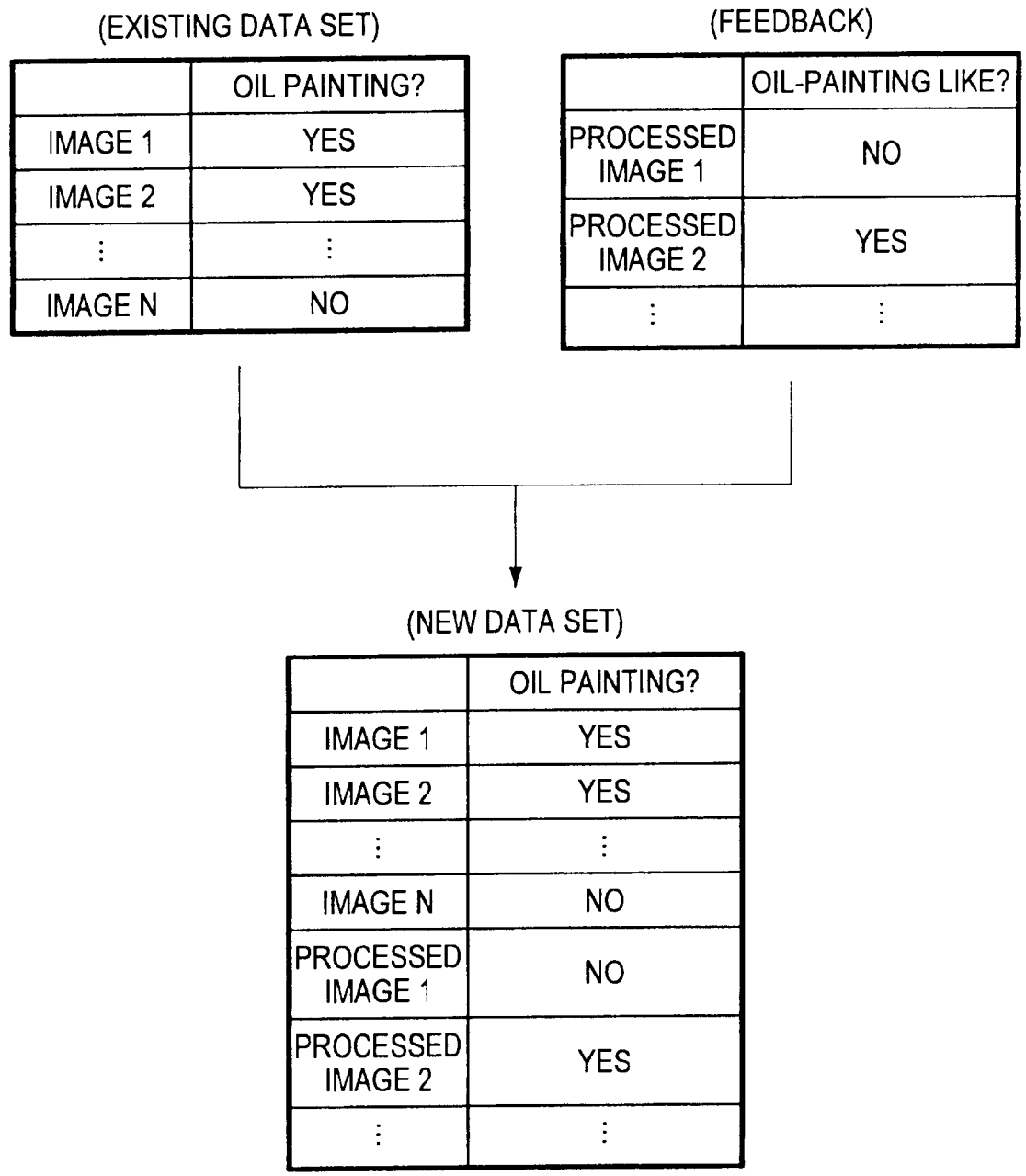
FIG. 11 is an explanatory diagram showing an overview of a reconstruction process for a data set performed by the oil painting filter automatic construction system according to the embodiment.

For example, in a case feedbacks as shown in FIG. 11 are obtained from the user, the data-set-for-evaluator-construction input unit 102 adds information on the feedbacks to the existing data set for evaluator construction and reconstructs a new data set for evaluator construction. Then, the data-set-for-evaluator-construction input unit 102 inputs the new data set for evaluator construction obtained by reconstruction to the evaluator construction unit 104. When the new data set for evaluator construction is input, the evaluator construction unit 104 reconstructs the evaluator by machine learning based on the genetic algorithm described above. Then, the evaluator construction unit 104 inputs the reconstructed evaluator to the processed data evaluation unit 110.

In this manner, when a feedback is obtained from the user, the evaluator is reconstructed and the evaluator held by the processed data evaluation unit 110 is updated. Then, with regard to an input image input next, a processing method is created by using the evaluator after update and a processed image created by using the processing method is output. In this manner, by receiving the feedback of the user, an evaluator capable of evaluating the oil painting likeness with a higher accuracy is automatically constructed.

Heretofore, the functional configuration of the information processing apparatus 100 has been described. Additionally, the processing method that is eventually output from the output unit 114 in the above explanation is the oil painting filter.

(Functional Configuration of Information Processing Apparatus 150)

Next, a functional configuration of the information processing apparatus 150 which is a modified example of the information processing apparatus 100 will be described.

As shown in FIG. 5, the information processing apparatus 150 mainly includes a processing method preparation unit 106, a data processing unit 108, a processed data evaluation unit 110, a processing method update unit 112, and an output unit 114. The difference to the information processing apparatus 100 shown in FIG. 4 is that the information processing apparatus 150 does not construct an evaluator by itself but acquires the evaluator from the outside. Accordingly, the difference to the information processing apparatus 100 lies in the acquisition source of the evaluator to be used by the processed data evaluation unit 110. Additionally, the configuration and the construction method of the evaluator to be used by the processed data evaluation unit 110 is the same for the information processing apparatus 150. That is, the information processing apparatus 150 is a modified example of the information processing apparatus 100 with regard to an acquisition method of the evaluator. Therefore, the function of each structural element of the information processing apparatus 150 is substantially the same with the function of a corresponding structural element of the information processing apparatus 100. Accordingly, an explanation on the details of the function of each structural element of the information processing apparatus 150 will be omitted.

Heretofore, the functional configuration of the information processing apparatus 150 according to the present embodiment has been described.

<2-3: Oil-Painting-Like Image Creation Method>

Figure 12:
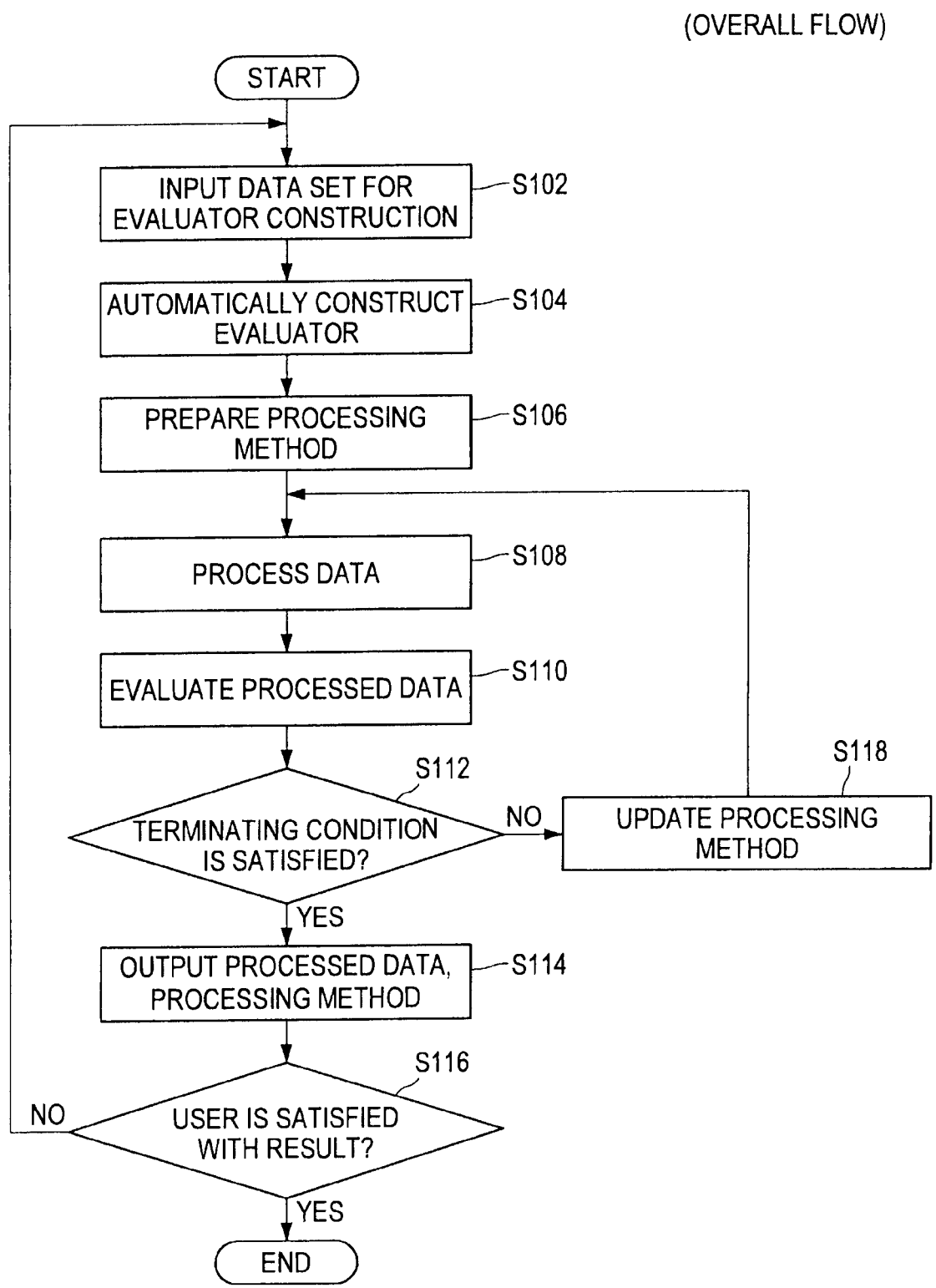
FIG. 12 is an explanatory diagram showing a flow of processing performed by the oil painting filter automatic construction system according to the embodiment.

Next, a creation method of an oil-painting-like image according to the present embodiment will be described with reference to FIG. 12. FIG. 12 is an explanatory diagram showing a flow of processing relating to a creation method of an oil-painting-like image according to the present embodiment. Note that the example of FIG. 12 relates to processing by the information processing apparatus 100 described above.

As shown in FIG. 12, first, the data-set-for-evaluator-construction input unit 102 acquires a data set for evaluator construction, and inputs the same to the evaluator construction unit 104 (S102). Next, the evaluator construction unit 104 automatically constructs an evaluator (S104). Additionally, the process of step S104 will be described later in detail.

Next, the processing method preparation unit 106 randomly combines operators and creates processing methods (S106). Then, the data processing unit 108 processes an input image by the processing methods created by the processing method preparation unit 106 and creates a process image (processed data) for each processing method (S108). Then, the processed data evaluation unit 110 calculates, by using the evaluator constructed by the evaluator construction unit 104, an evaluation value of each piece of processed data created by the data processing unit 108 (S110).

Next, the processed data evaluation unit 110 decides, based on the calculated evaluation value, a user operation, or the like, whether a terminating condition is satisfied or not (S112). In the case the terminating condition is satisfied, the processed data evaluation unit 110 inputs the processed data and the processing method to the output unit 114. Then, the information processing apparatus 100 proceeds with the process to step S114. On the other hand, when the terminating condition is not satisfied, the processed data evaluation unit 110 inputs the evaluation values of respective processing methods to the processing method update unit 112. Then, the information processing apparatus 100 proceeds with the process to step S118.

In the case the process proceeded to step S114, the output unit 114 outputs the processed data and the processing method and presents the same to the user (S114). Then, whether the user is satisfied with the processing result or not is decided (S116), and in the case the user is satisfied, the series of processes is ended. On the other hand, if the user is not satisfied with the processing result and the feedback is input, the information processing apparatus 100 reconstructs a data set for evaluator construction that reflects the feedback, and performs again the processes of step S102 and subsequent steps based on the data set for evaluator construction.

In the case the process proceeded to step S118 by the decision at step S112, the processing method update unit 112 updates the processing methods based on the genetic algorithm (S118). Then, the processing method update unit 112 inputs the processing methods after update to the data processing unit 108. Then, the information processing apparatus 100 returns the process to step S108 and performs again the processes of step S108 and subsequent steps. Eventually, the series of processes is ended when the satisfaction of the user is obtained in the decision at step S116.

Heretofore, the creation method of an oil-painting-like image according to the present embodiment has been described. Additionally, the processing method that is eventually output from the output unit 114 in the above explanation is the oil painting filter.

As described above, in the present embodiment, an evaluator is automatically constructed by the genetic algorithm, and also, a creation process of a processing method based on the genetic algorithm is performed by using the evaluator. Accordingly, it becomes possible to automatically construct an algorithm (oil painting filter) whose output data is not a scalar quantity.

Additionally, heretofore, an explanation has been made consistently on the oil painting filter. However, the oil painting filter can be modified to an arbitrary algorithm whose output data is not a scalar quantity. In this case, the input image is changed to input data that matches the input form of the algorithm. The image is changed to data also for the data set for evaluator construction. However, the mechanisms of the automatic construction method of an evaluator and the automatic construction method of an algorithm according to the present embodiment described above are not modified. Accordingly, such modification is, of course, also within the technical scope of the present embodiment.

Heretofore, the first embodiment of the present invention has been described.

<3: Second Embodiment>

Next, a second embodiment of the present invention will be described. The present embodiment relates to a construction method of an algorithm (pseudo-motion creator) that mimics motion of a living thing in a pseudo manner. In the following, an explanation will be sequentially given on an overview of a pseudo-motion creator automatic construction system, functional configurations of information processing apparatuses 200, 250 capable of realizing a function of the pseudo-motion creator automatic construction system, and a pseudo-motion creation method by a pseudo-motion creator. Additionally, although a pseudo-motion creator is taken as an example here, extension is possible to an automatic construction method of an arbitrary algorithm whose correct answer is not uniquely determined and a creation method of output data by the algorithm.

<3-1: Overview of Pseudo-Motion Creator Automatic Construction System>

First, an overview of a function of the pseudo-motion creator automatic construction system according to the present embodiment will be described with reference to FIG. 13. FIG. 13 is an explanatory diagram showing an overview of a function of the pseudo-motion creator automatic construction system according to the present embodiment.

Figure 13:
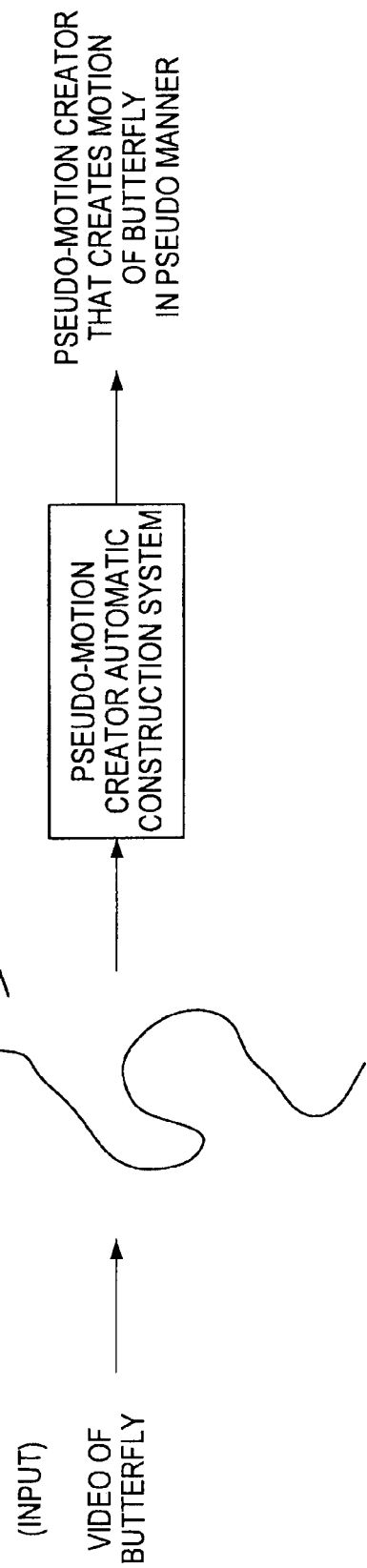
FIG. 13 is an explanatory diagram showing an overview of a pseudo-motion creator automatic construction system according to a second embodiment of the present invention.

As shown in FIG. 13, the pseudo-motion creator automatic construction system is a system for automatically constructing a pseudo-motion creator. First, the pseudo-motion creator automatic construction system according to the present embodiment automatically creates an evaluator that outputs "likeness to a movement track of a specific living thing (hereinafter, specific living thing likeness)" by using multiple data sets for learning including a movement track indicating motion of a certain living thing (hereinafter, specific living thing), a movement track of a different moving body (non-specific living thing) and correct answer indicating "a movement track of the specific living thing" or "not a movement track of the specific living thing" and performing machine learning based on a genetic algorithm. Additionally, the movement track may be extracted from video data by using a motion recognition technology, or time-series coordinate data may be input as the movement track.

Next, the pseudo-motion creator automatic construction system creates a first generation pseudo-motion creator by randomly combining processing functions. Then, the pseudo-motion creator automatic construction system creates a movement track by inputting an initial value to the first generation pseudo-motion creator. Then, the pseudo-motion creator automatic construction system calculates an evaluation value by inputting the created movement track to the evaluator. Then, the pseudo-motion creator automatic construction system creates a second generation pseudo-motion creator from the first generation pseudo-motion creator based on the genetic algorithm such that the evaluation value will be high (generation change).

The pseudo-motion creator automatic construction system repeats the generation change until the evaluation value calculated by the evaluator satisfies a predetermined terminating condition, and outputs a pseudo-motion creator of a last generation that satisfied the predetermined terminating condition. Also, the pseudo-motion creator automatic construction system outputs a movement track that mimics, in a pseudo manner, the movement track of the specific living thing by using the constructed pseudo-motion creator.

Heretofore, an overview of the function of the pseudo-motion creator automatic construction system has been described. As described above, the pseudo-motion creator automatic construction system creates an evaluator by machine learning based on the genetic algorithm, and evaluates the specific living thing likeness of a movement track by using the evaluator. Then, the pseudo-motion creator automatic construction system automatically constructs an pseudo-motion creator for which evaluation by the evaluator will be high. According to such configuration, a pseudo-motion creator whose correct answer is not uniquely determined can be appropriately constructed.

<3-2: Functional Configurations of Information Processing Apparatuses 200, 250>

Figure 14:
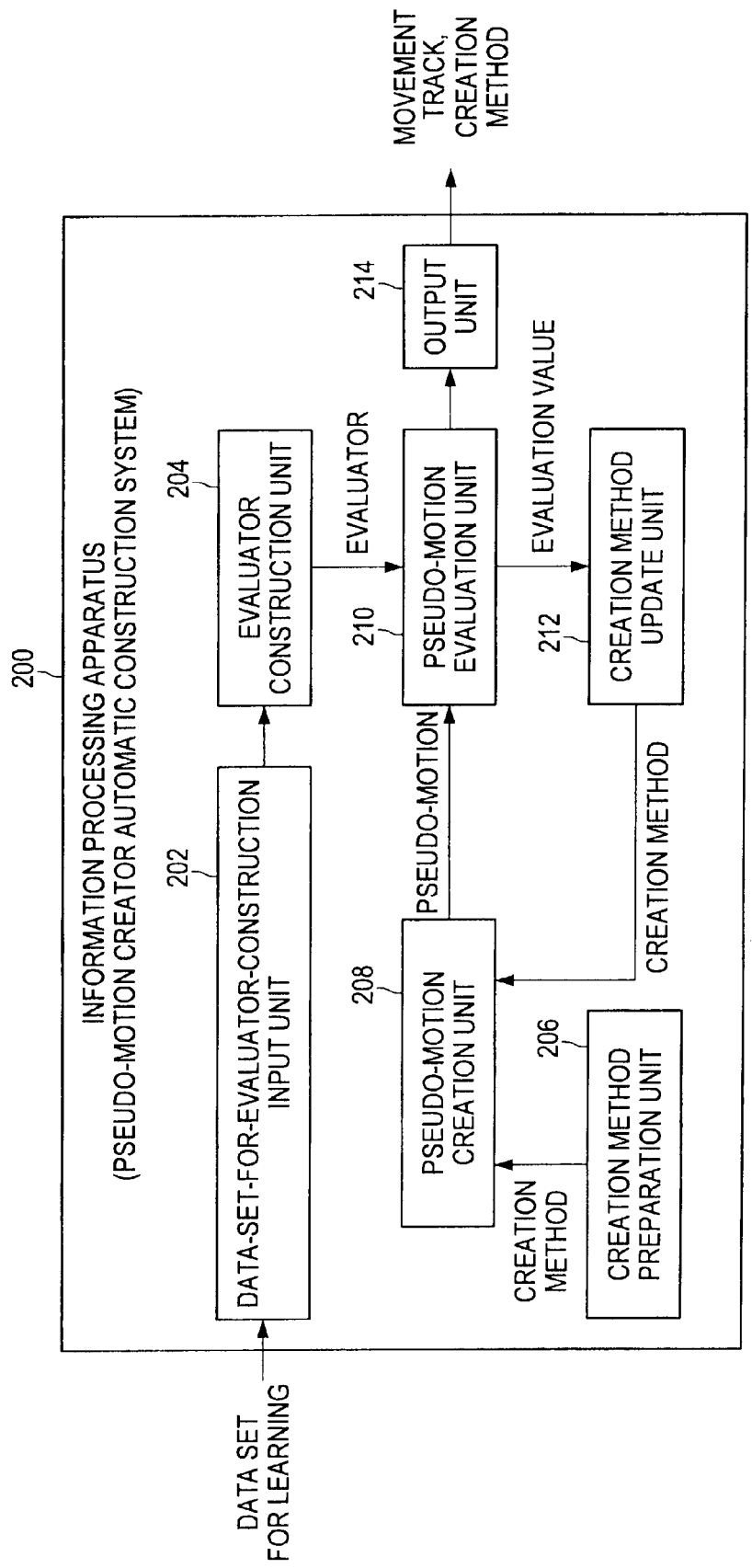
FIG. 14 is an explanatory diagram showing a functional configuration of an information processing apparatus (pseudo-motion creator automatic construction system) according to the embodiment.
Figure 15:
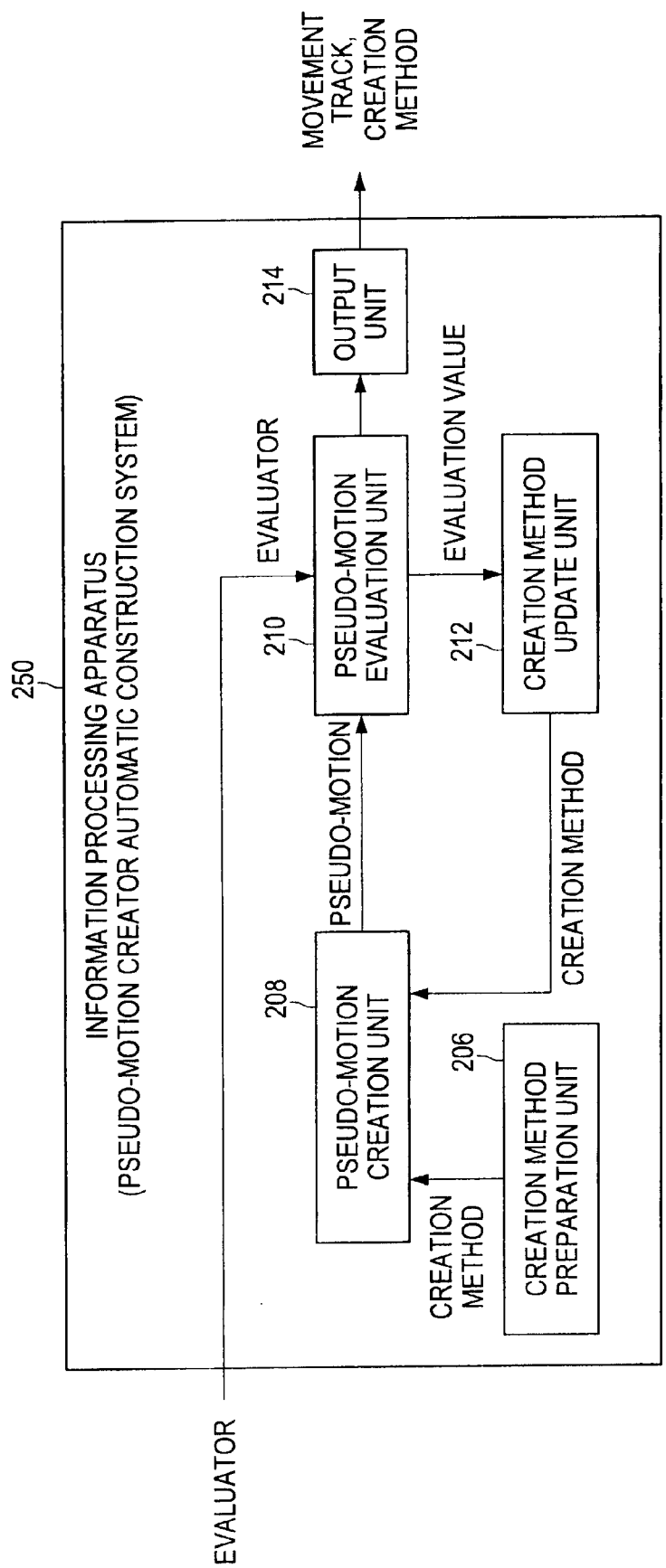
FIG. 15 is an explanatory diagram showing a functional configuration of an information processing apparatus (pseudo-motion creator automatic construction system) according to a modified example of the embodiment.

Next, functional configurations of the information processing apparatuses 200, 250 according to the present embodiment will be described with reference to FIGS. 14 and 15. FIG. 14 is an explanatory diagram showing an example of a functional configuration of the information processing apparatus 200 according to the present embodiment. On the other hand, FIG. 15 is an explanatory diagram showing an example of a functional configuration of the information processing apparatus 250 according to the present embodiment. Additionally, structural elements of the information processing apparatuses 200, 250 having substantially the same function are denoted with the same reference numerals so as to clearly indicate the correspondence relationship between the structural elements. Furthermore, an explanation will be given here on an automatic construction algorithm for a pseudo-motion creator that reproduces, in a pseudo manner, motion of a butterfly.

(Functional Configuration of Information Processing Apparatus 200)

As shown in FIG. 14, the information processing apparatus 200 mainly includes a data-set-for-evaluator-construction input unit 202, an evaluator construction unit 204, a creation method preparation unit 206, a pseudo-motion creation unit 208, a pseudo-motion evaluation unit 210, a creation method update unit 212, and an output unit 214. In the following, a function of each structural element will be described along a flow of automatic construction processing for an evaluator, a flow of automatic construction processing for a pseudo-motion creator and a flow of creation processing for a movement track of a specific living thing. Additionally, for the sake of explanation, the genetic algorithm is assumed to be used for the process by the creation method update unit 212 described later. However, any method, such as local search and simulated annealing, may be used as long as the method is capable of optimizing an element.

(Automatic Construction of Evaluator)

First, the data-set-for-evaluator-construction input unit 202 acquires a data set for learning (hereinafter, a data set for evaluator construction) and inputs the same to the evaluator construction unit 204. The data-set-for-evaluator-construction input unit 202 may acquire the data set for evaluator construction from an external device via a network or may acquire the data set for evaluator construction from a recording device (not shown) installed in the information processing apparatus 200. Furthermore, the data-set-for-evaluator-construction input unit 202 may also be connected to an input device for a user to manually input correct answer information.

Figure 18:
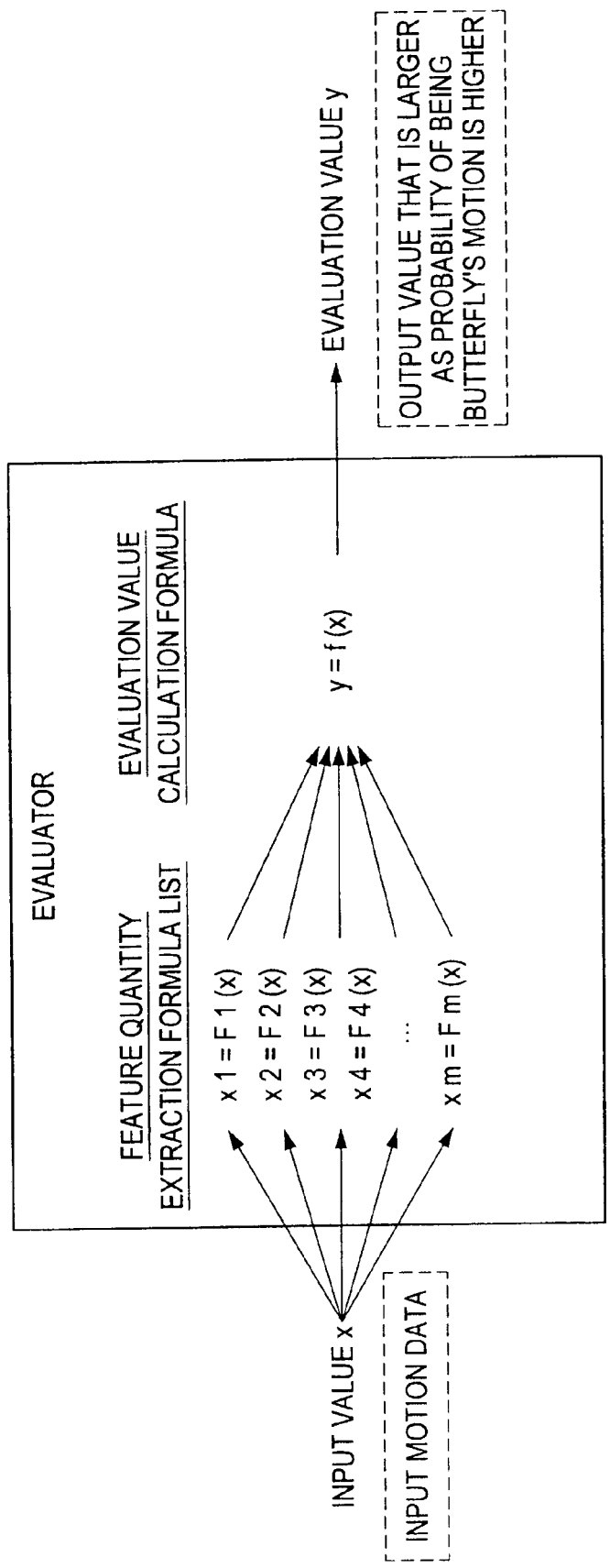
FIG. 18 is an explanatory diagram showing an overview of a construction process of an evaluator performed by the pseudo-motion creator automatic construction system according to the embodiment.

As shown in FIG. 17, the data set for evaluator construction is formed from a plurality of pieces of motion data formed from coordinate data at each time point as shown in FIG. 16 and pieces of correct answer information indicating whether each motion data is that of a butterfly or not. When such data set for evaluator construction is input, the evaluator construction unit 204 constructs an evaluator by machine learning based on the genetic algorithm. Additionally, details of a construction algorithm for the evaluator will be described later. Here, an overview of the construction algorithm for the evaluator will be briefly described with reference to FIG. 18. As shown in FIG. 18, the evaluator is constructed by combination (for example, linear combination) of feature quantity extraction formulae created by combinations of a plurality of processing functions prepared in advance.

First, the evaluator construction unit 204 creates a plurality of feature quantity extraction formulae (a first generation feature quantity extraction formula list) according to which scalar quantities are calculated. Then, the evaluator construction unit 204 takes motion data for learning included in the data set for evaluator construction as input value x and calculates a plurality of feature quantities by inputting input value x to each of the feature quantity extraction formulae in the first generation feature quantity extraction formula list. Then, the evaluator construction unit 204 creates a first generation evaluation formula by performing machine learning based on the genetic algorithm by using the plurality of feature quantities and pieces of correct answer information (for example, butterfly=1, other than butterfly=0) included in the data set for evaluator construction. Furthermore, the evaluator construction unit 204 calculates a contribution rate to the evaluation formula for each feature quantity extraction formula.

For example, in a case the evaluation formula is expressed by the linear combination of the feature quantity extraction formulae, the evaluator construction unit 204 calculates, for each feature quantity extraction formula, a contribution rate to the evaluation formula, based on a combination coefficient of each feature quantity extraction formula. Then, the evaluator construction unit 204 makes a decision regarding a terminating condition based on the contribution rate to the evaluation formula, and in the case the terminating condition is satisfied, outputs the evaluation formula as the evaluator. On the other hand, in the case the terminating condition is not satisfied, the evaluator construction unit 305 takes the feature quantity extraction formulae included in the evaluation formula as second generation feature quantity extraction formulae, and creates, by the genetic algorithm, a second generation feature quantity extraction formula list from the second generation feature quantity extraction formulae in such a manner that elements of feature quantity extraction formulae whose contribution rates are high will tend to be maintained.

Then, the evaluator construction unit 204 uses the second generation feature quantity extraction formula list and creates a second generation evaluation formula as in the case of the first generation. Also, the evaluator construction unit 204 calculates a contribution rate of each feature quantity extraction formula to the second generation evaluation formula. Then, the evaluator construction unit 204 makes a decision regarding a terminating condition based on the contribution rate the evaluation formula, and in the case the terminating condition is satisfied, outputs the evaluation formula as the evaluator. On the other hand, in the case the terminating condition is not satisfied, the evaluator construction unit 204 takes the feature quantity extraction formulae included in the evaluation formula as third generation feature quantity extraction formulae, and creates a third generation evaluation formula as in the case of the second generation. In this manner, generation change is repeated until the terminating condition is satisfied, and, at the time point the terminating condition is satisfied, the evaluation formula of the last generation is output as the evaluator.

The evaluator constructed by the evaluator construction unit 204 in this manner is input to the pseudo-motion evaluation unit 210. This evaluator outputs a value which is larger as the probability of a movement track being that of a butterfly is higher and a value which is smaller as the probability of the movement track being that of a butterfly is lower.

(Automatic Construction of Pseudo-Motion Creator, Creation Processing for Movement Track)

When an evaluator is constructed, a pseudo-motion creator is created based on an evaluation value obtained by using this evaluator. First, the creation method preparation unit 206 creates a creation method by combining a plurality of operators. An operator is a smallest unit of a creation method for creating a movement track. As the operator, a processing element as follows is used, for example.

Constant: Const
Delayer: Delay
Filter: LPF, HPF, BPF, . . .
Vector combination: Combine
Condition determination: If Four arithmetic operations: Add, Sub, Multiply, ...
Sign inversion: ISign
Trigonometric function and the like: Sin, Cos, Tan, ArcSin, ...
Norm calculation: Norm
Noise generation: RndGaussian, RndWhite
Basic waveform oscillation: OscSin, OscTri, OscSqr, ...

Figure 19:
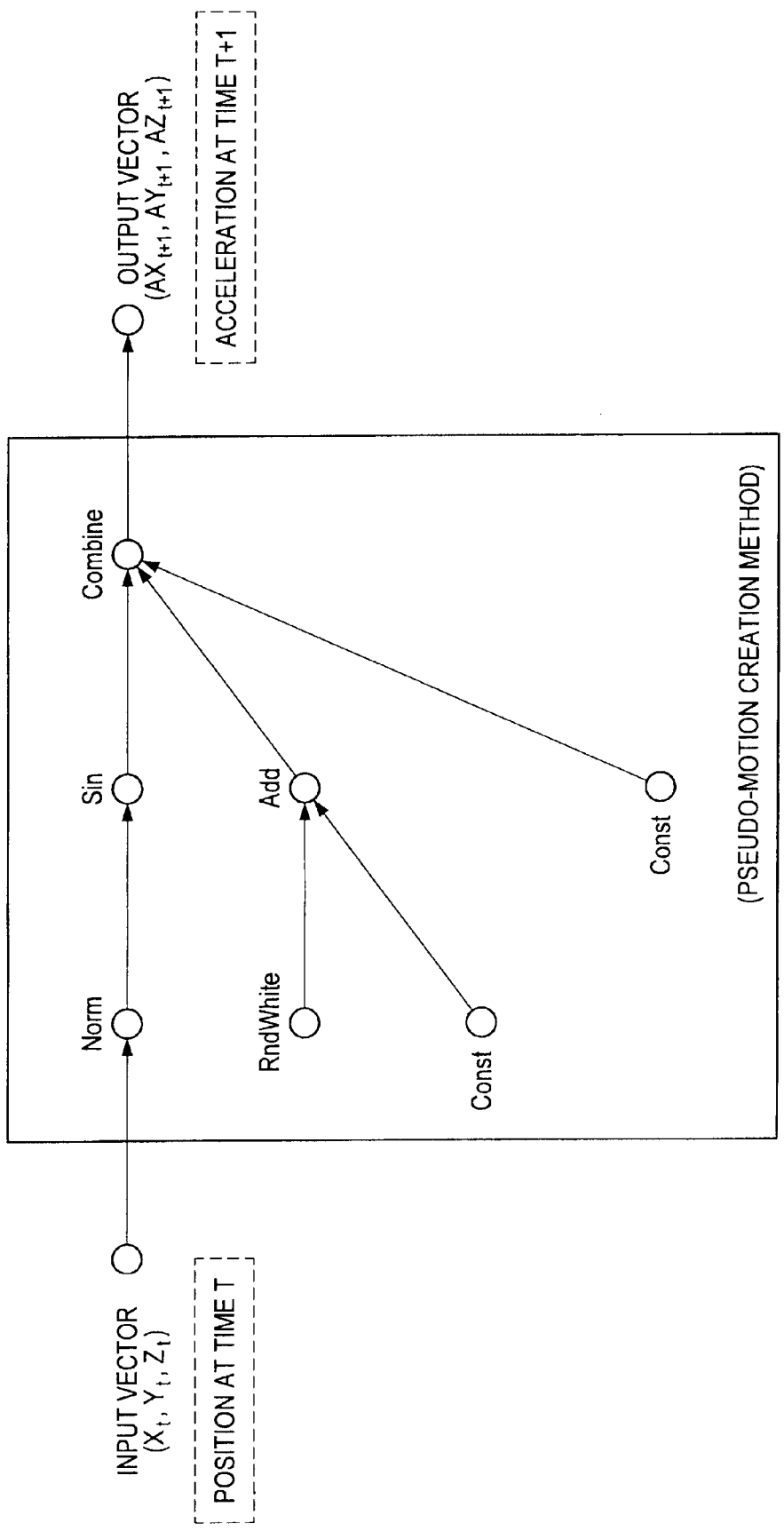
FIG. 19 is an explanatory diagram showing a structure of a pseudo-motion creation method performed by the pseudo-motion creator automatic construction system according to the embodiment.

The creation method preparation unit 206 first creates a plurality of creation methods by randomly combining the operators. For example, as shown in FIG. 19, the creation method preparation unit 206 creates a creation method that outputs, in a case a position vector $(X_t, Y_t, Z_t)$ at a time t is input, an acceleration vector $(AX_{t+1}, AY_{t+1}, AZ_{t+1})$ at a time t+1. The creation method illustrated in FIG. 19 includes norm calculation Norm, sine function Sin, vector combination Combine, white noise generation RndWhite, constant Const, and addition Add.

The expression of the creation method shown in FIG. 19 will be briefly described here. As shown in FIG. 19, the creation method is expressed by a node representing each operator and an arrow between the nodes indicating the order of processing. In the case of the creation method shown in FIG. 19, the arrow of an input vector is connected to the node of norm calculation Norm. Accordingly, norm calculation Norm is performed on the input vector. Also, an arrow is connected from the node of norm calculation Norm to the node of sine function Sin, and thus operation by sine function Sin is performed on the output of norm calculation Norm.

Furthermore, an arrow is connected from the node of sine function Sin to the node of vector combination Combine, and thus a process of vector combination Combine is performed on the output of sine function Sin. Additionally, the processing of vector combination Combine is to couple outputs of nodes connected to the node in a vector format. In the example of FIG. 19, three input arrows are connected to the node of vector combination Combine. Accordingly, the outputs of nodes connected to the three input arrows are coupled in a vector format.

One of the nodes connected to the node of vector combination Combine is the node of sine function Sin mentioned above. Another is the node of addition Add. The last one is the node of constant Const. An arrow extending from the node of white noise generation RndWhite and an arrow extending from the node of constant Const are connected to the node of addition Add. Accordingly, white noise generated at the node of white noise generation RndWhite and a constant output from the node of constant Const are added at the node of addition Add.

Then, the added value at the node of addition Add is coupled in a vector format at the node of vector combination Combine. Also, the constant output at the node of constant Const is coupled in a vector format at the node of vector combination Combine. As a result, a vector having three elements is created at the node of vector combination Combine, and is output as an output vector. That is, in FIG. 19, a creation method of creating output vector $(AX_{t+1}, AY_{t+1}, AZ_{t+1})$ formed from $AX_{t+1}=Sin(Norm(X_t, Y_t, Z_t))$, $AY_{t+1}=Add(RndWhite, Const)$ and $AZ_{t+1}=Const$ is expressed.

Figure 20:
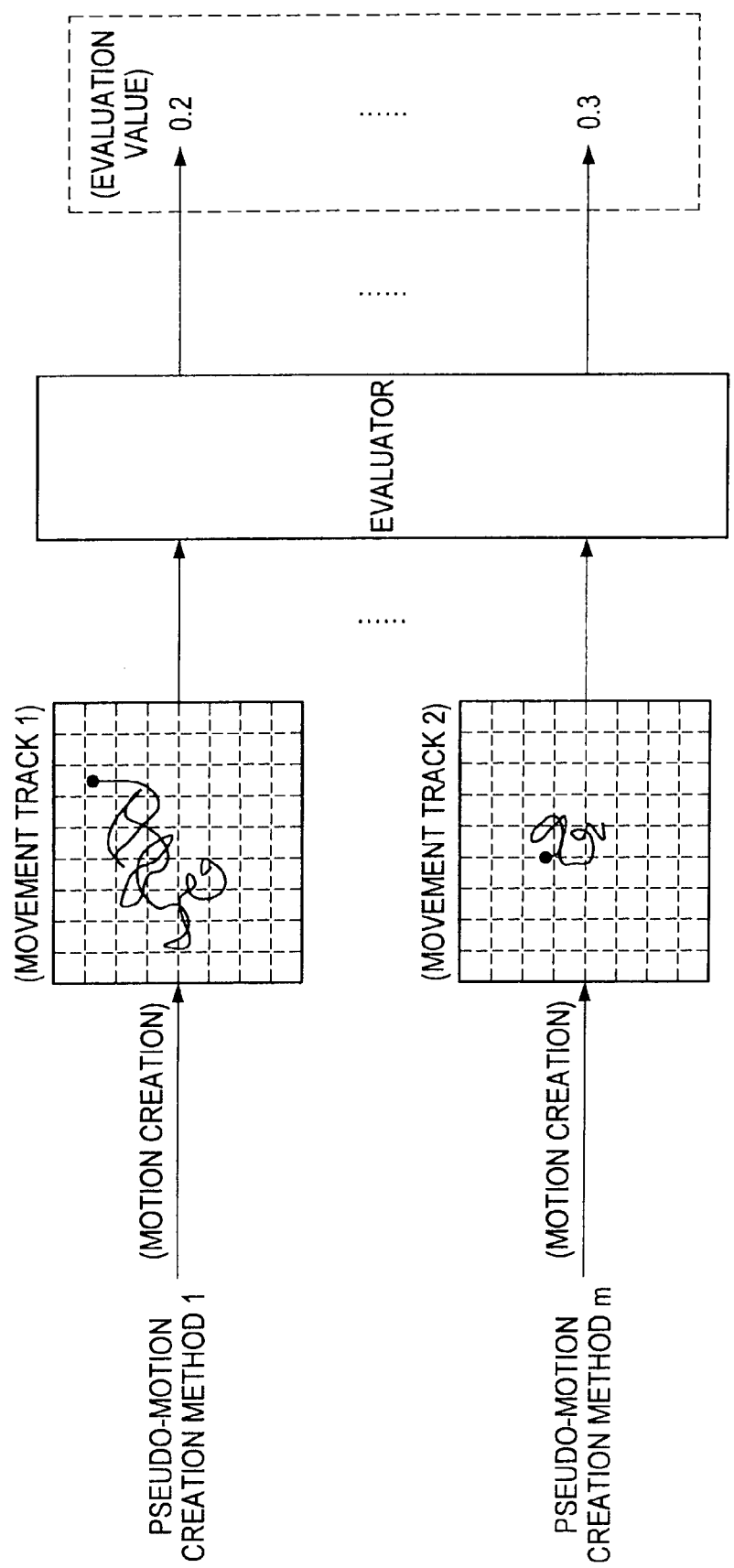
FIG. 20 is an explanatory diagram showing an overview of a construction process of an evaluator performed by the pseudo-motion creator automatic construction system according to the embodiment.

The creation method preparation unit 206 creates a plurality of such creation methods and inputs them to the pseudo-motion creation unit 208. The pseudo-motion creation unit 208 creates movement tracks by using the creation methods created by the creation method preparation unit 206. As shown in FIG. 20, in a case m creation methods are created by the creation method preparation unit 206, the pseudo-motion creation unit 208 creates m movement tracks 1 to m by using the m creation methods. Then, the pseudo-motion creation unit 208 inputs the movement tracks 1 to m to the pseudo-motion evaluation unit 210.

Figure 21:
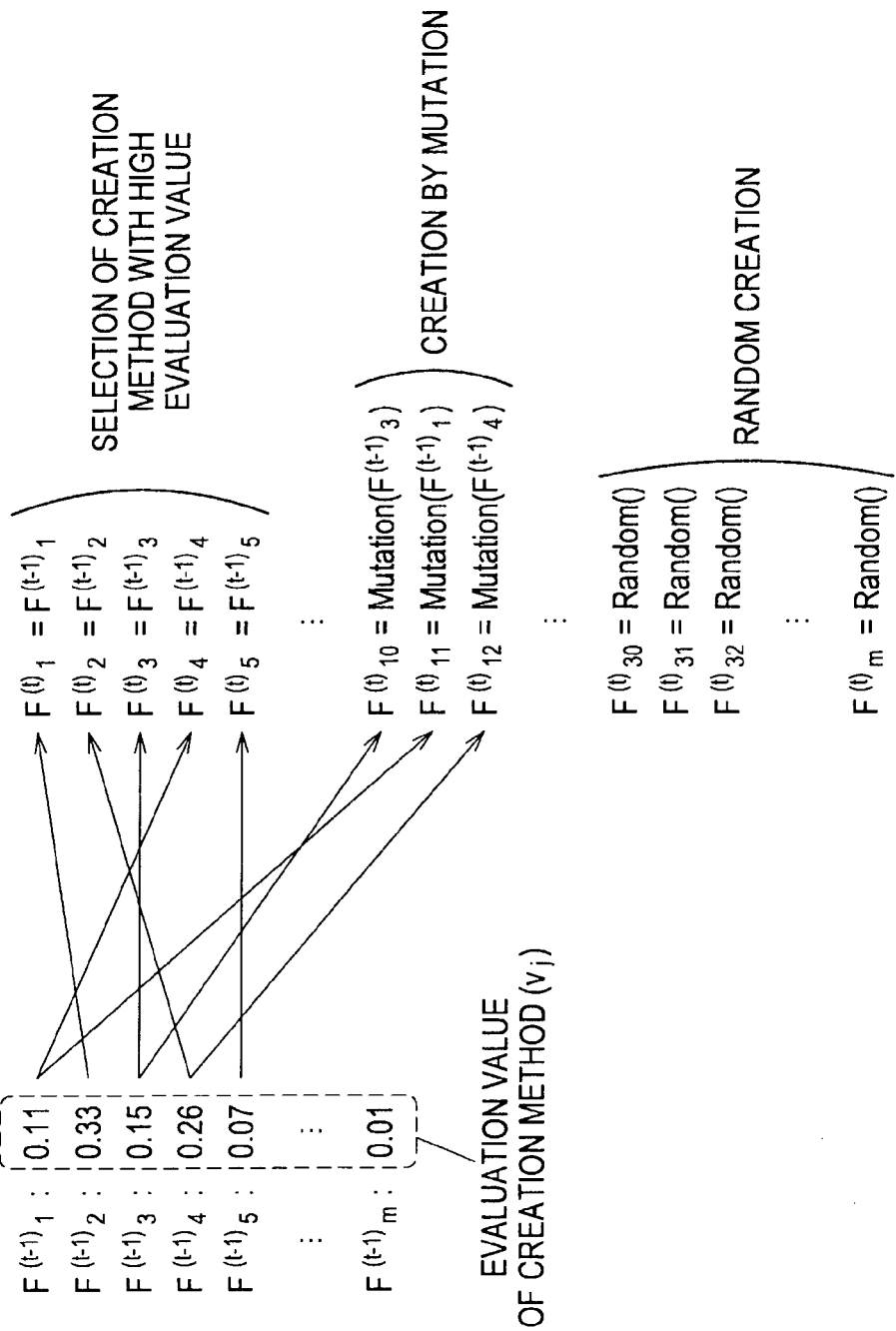
FIG. 21 is an explanatory diagram showing an overview of an update process for the pseudo-motion creation method performed by the pseudo-motion creator automatic construction system according to the embodiment.

As shown in FIG. 20, the pseudo-motion evaluation unit 210 inputs the movement tracks 1 to m input from the pseudo-motion creation unit 208 to the evaluator and calculates m evaluation values. Then, the pseudo-motion evaluation unit 210 inputs the evaluation values calculated for the respective creation methods to the creation method update unit 212. As shown in FIG. 21, the creation method update unit 212 uses the evaluation values calculated for the respective creation methods and updates the creation methods 1 to m based on the genetic algorithm.

In the following explanation, creation method 1 before update is expressed by $F^{(t-1)}_1, \ldots$, and creation method m before update by $F^{(t-1)}_m$. Also, an evaluation value of creation method $F^{(t-1)}_1$ is expressed by $v_1, \ldots$, and an evaluation value of creation method $F^{(t-1)}_m$ by $v_m$. Furthermore, creation method 1 after update is expressed by $F^{(t)}_1, \ldots$, and creation method m after update by $F^{(t)}_m$.

First, the creation method update unit 212 selects a predetermined number of creation methods with a high evaluation value among creation methods before update $F^{(t-1)}_1$ to $F^{(t-1)}_m$. In the example of FIG. 21, $F^{(t-1)}_2$, $F^{(t-1)}_4$, $F^{(t-1)}_3$, $F^{(t-1)}_1$, $F^{(t-1)}_5$, and the like are selected in a descending order of evaluation value. The creation method update unit 212 sets the selected creation methods as the creation methods after update. In the example of FIG. 21, $F^{(t)}_1=F^{(t-1)}_2$, $F^{(t)}_2=F^{(t-1)}_4$, $F^{(t)}_3=F^{(t-1)}_3$, $F^{(t)}_4=F^{(t-1)}_1$, $F^{(t)}_5=F^{(t-1)}_5$, and the like are set.

Next, the creation method update unit 212 creates new creation methods by mutating a predetermined number of creation methods among creation methods before update $F^{(t-1)}_1$ to $F^{(t-1)}_m$. Then, the creation method update unit 212 sets the new creation methods as the creation methods after update. In the example of FIG. 21, mutation is expressed by a function Mutation( ). Also, in the example of FIG. 21, $F^{(t-1)}_3$, $F^{(t-1)}_1$, $F^{(t-1)}_4$, and the like are selected as the target of mutation, and are set as creation methods after update $F^{(t)}_{10}$, $F^{(t)}_{11}$, $F^{(t)}_{12}$, and the like.

Next, the creation method update unit 212 creates a predetermined number of new creation methods by randomly combining the operators. In the example of FIG. 21, random creation of a creation method is expressed by a function Random( ). Also, in the example of FIG. 21, the new creation methods that have been randomly created are set as creation methods after update $F^{(t)}_{30}, F^{(t)}_{31}, F^{(t)}_{32}, \ldots, F^{(t)}_m$. In this manner, the creation method update unit 212 creates the creation method after update from the creation method before update based on the genetic algorithm. Then, the creation method update unit 212 inputs the creation methods after update to the pseudo-motion creation unit 208.

Figure 22:
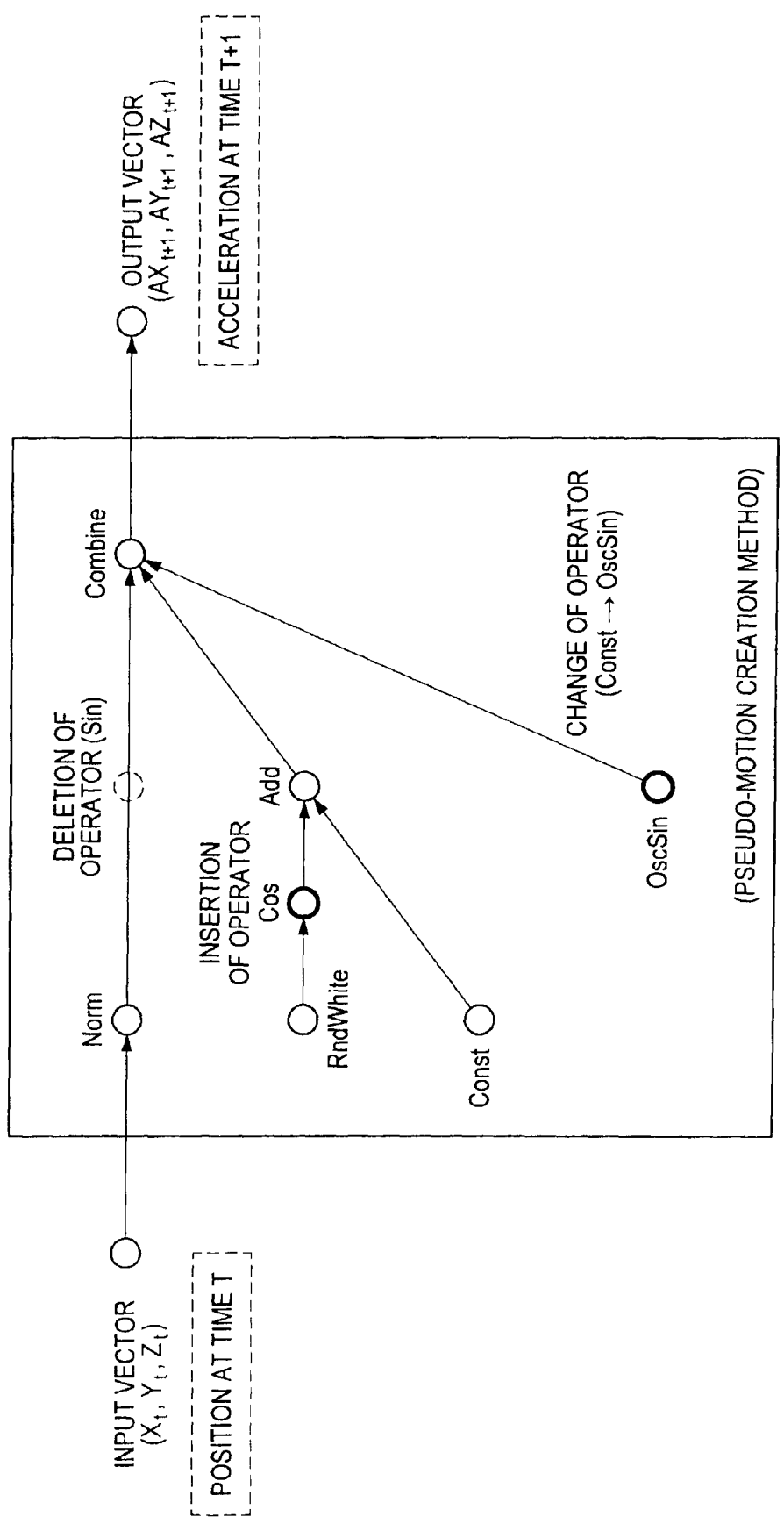
FIG. 22 is an explanatory diagram showing a mutation operation performed at the time of the update process for the pseudo-motion creation method performed by the pseudo-motion creator automatic construction system according to the embodiment.
Figure 23:
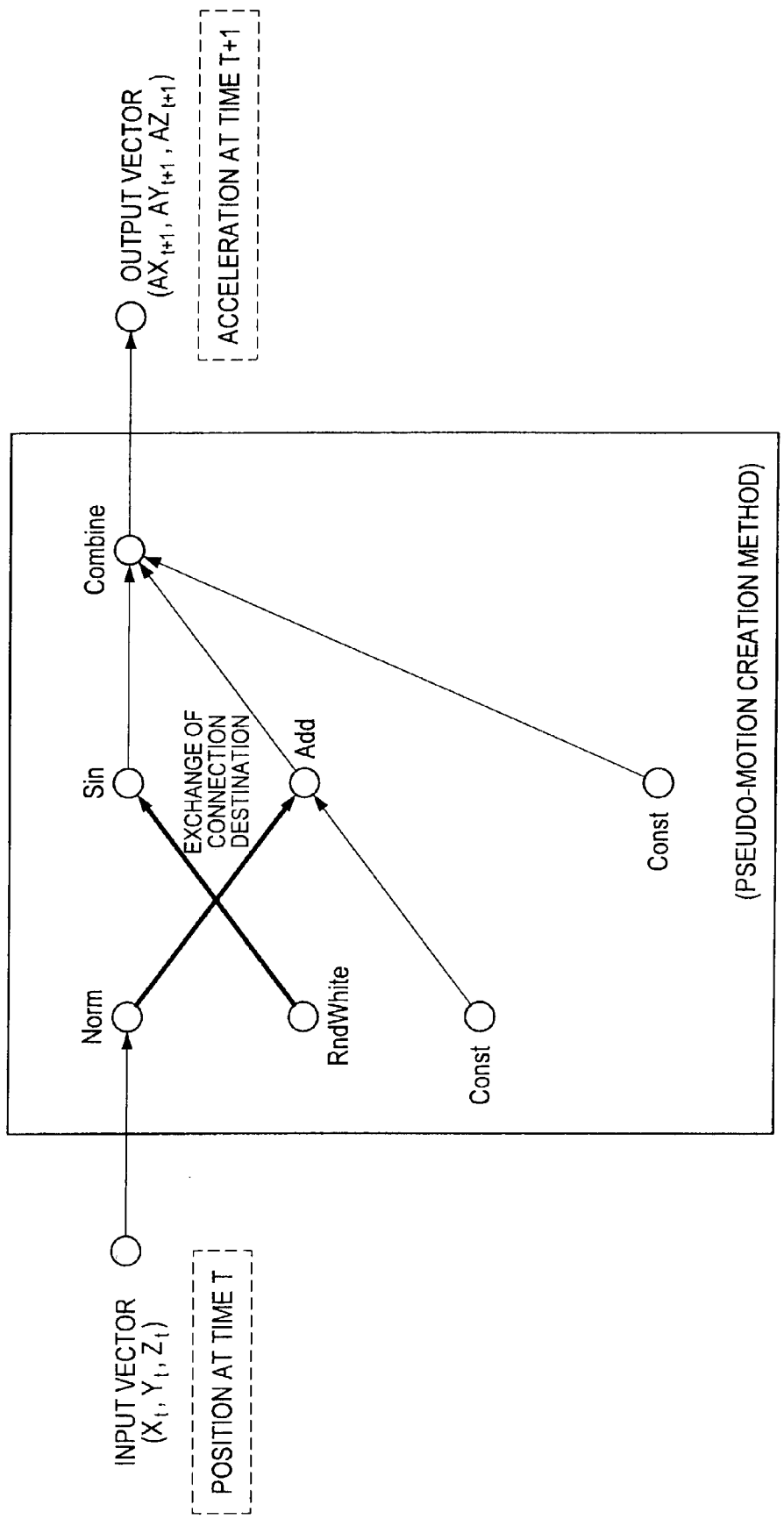
FIG. 23 is an explanatory diagram showing a mutation operation performed at the time of the update process for the pseudo-motion creation method performed by the pseudo-motion creator automatic construction system according to the embodiment.
Figure 24:
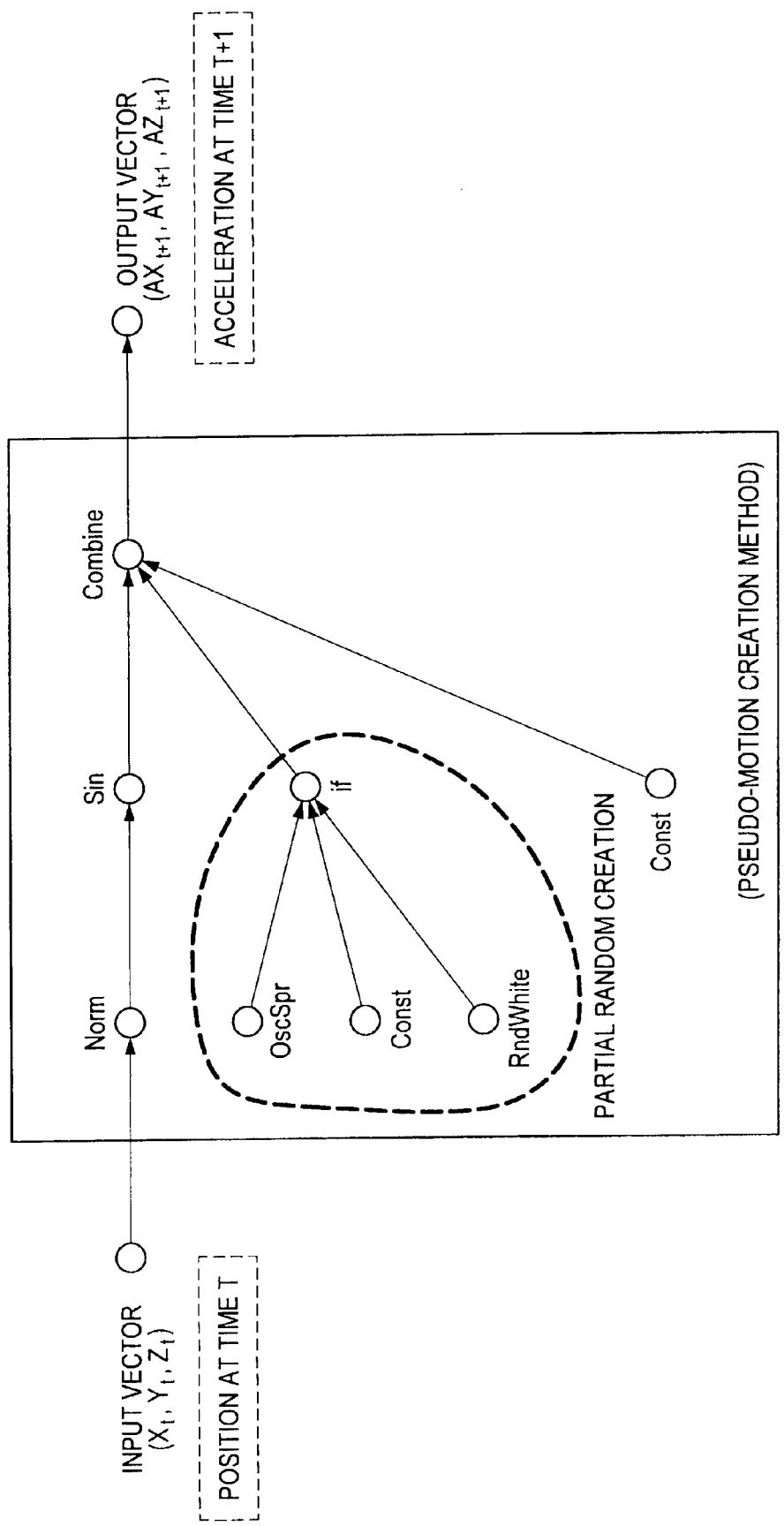
FIG. 24 is an explanatory diagram showing a mutation operation performed at the time of the update process for the pseudo-motion creation method performed by the pseudo-motion creator automatic construction system according to the embodiment.

Here, processing of mutation will be described with reference to FIGS. 22 to 24. FIGS. 22 to 24 are explanatory diagrams showing examples of processing of mutation.

First, reference will be made to FIG. 22. FIG. 22 shows, as an example of mutation, processing relating to deletion of an operator included in a creation method, insertion of an operator, and change of an operator. In the example of FIG. 22, the node of sine function Sin, which was included in the original creation method (example of FIG. 19) is deleted. Also, in this example, the node of cosine function Cos is inserted between the node of white noise generation RndWhite and the node of addition Add. Furthermore, in this example, the node of constant Const is changed to the node of sine wave oscillation OscSin.

That is, by this mutation, the original creation method is changed to a creation method of creating output vector ($AX_{t+1}$, $AY_{t+1}$, $AZ_{t+1}$) formed from $AX_{t+1}$=Norm($X_t$, $Y_t$, $Z_t$), $AY_{t+1}$=Add(Cos(RndWhite), Const) and $AZ_{t+1}$=OscSin.

Next, reference will be made to FIG. 23. FIG. 23 shows, as an example of mutation, processing relating to crossover of operators included in a creation method. The crossover here means to exchange connection destinations of arrows connecting nodes. For example, the arrow that connected the node of norm calculation Norm and the node of sine function Sin in the original creation method (example of FIG. 19) is changed to an arrow that connects the node of norm calculation Norm and the node of addition Add. Furthermore, the arrow that connected the node of white noise generation RndWhite and the node of addition Add in the original creation method is changed to an arrow that connects the node of white noise generation RndWhite and the node of sine function Sin.

That is, by this mutation (exchange between both arrows), the original creation method is changed to a creation method of creating output vector ($AX_{t+1}$, $AY_{t+1}$, $AZ_{t+1}$) formed from $AX_{t+1}$=Sin(RndWhite), $AY_{t+1}$=Add(Norm($X_t$, $Y_t$, $Z_t$), Const) and $AZ_{t+1}$=Const.

Next, reference will be made to FIG. 24. FIG. 24 shows, as an example of mutation, processing of randomly creating a part of operators included in a creation method. In the example of FIG. 24, a node group formed from the node of addition Add and its lower nodes, in the original creation method (example of FIG. 19), is changed altogether to a different node group. That is, by this mutation (partial random creation), the original creation method is changed to a creation method of creating output vector ($AX_{t+1}$, $AY_{t+1}$, $AZ_{t+1}$) formed from $AX_{t+1}$=Sin(Norm($X_t$, $Y_t$, $Z_t$)), $AY_{t+1}$=If(OscSqr, Const, RndWhite), and $AZ_{t+1}$=Const.

Heretofore, the processing of mutation has been described.

Reference will be again made to FIG. 14. When the creation methods after update are input from the creation method update unit 212, the pseudo-motion creation unit 208 creates movement tracks by using the creation methods after update. Then, the pseudo-motion creation unit 208 inputs the created movement tracks to the pseudo-motion evaluation unit 210. The pseudo-motion evaluation unit 210 inputs movement tracks 1 to m input from the pseudo-motion creation unit 208 to the evaluator and calculates m evaluation values. Then, the pseudo-motion evaluation unit 210 inputs the evaluation values calculated for respective creation methods to the creation method update unit 212.

The processes by the creation method update unit 212, the pseudo-motion creation unit 208 and the pseudo-motion evaluation unit 210 are repeatedly performed in this manner. This repeating process is continued until a predetermined terminating condition is satisfied, and is ended when the predetermined terminating condition is satisfied. For example, the terminating condition is satisfied in a case a user performs an end operation, in a case an evaluation value has exceeded a predetermined threshold value, in a case the repeating process has been performed a predetermined number of times, in a case the repeating process has been continuously performed for a predetermined period of time, or in a case corresponding to combination of the above cases.

In a case the terminating condition is satisfied, a movement track created by the pseudo-motion creation unit 208 and a creation method created by the creation method update unit 212 in the last repeating process are output to the output unit 214. Then, the output unit 214 outputs these movement track and creation method. Additionally, the output unit 214 outputs one or both of the movement track and the creation method. In this manner, by the repeating process being performed based on the genetic algorithm, a creation method with a higher evaluation value is calculated, and the likeness to a butterfly of a movement track created by using the creation method increases.

Now, the movement track and the creation method output from the output unit 214 are presented to the user. Then, in a case a feedback relating to a degree of satisfaction to the movement track is obtained from the user, the information processing apparatus 200 updates the evaluator by using the feedback.

Figure 25:
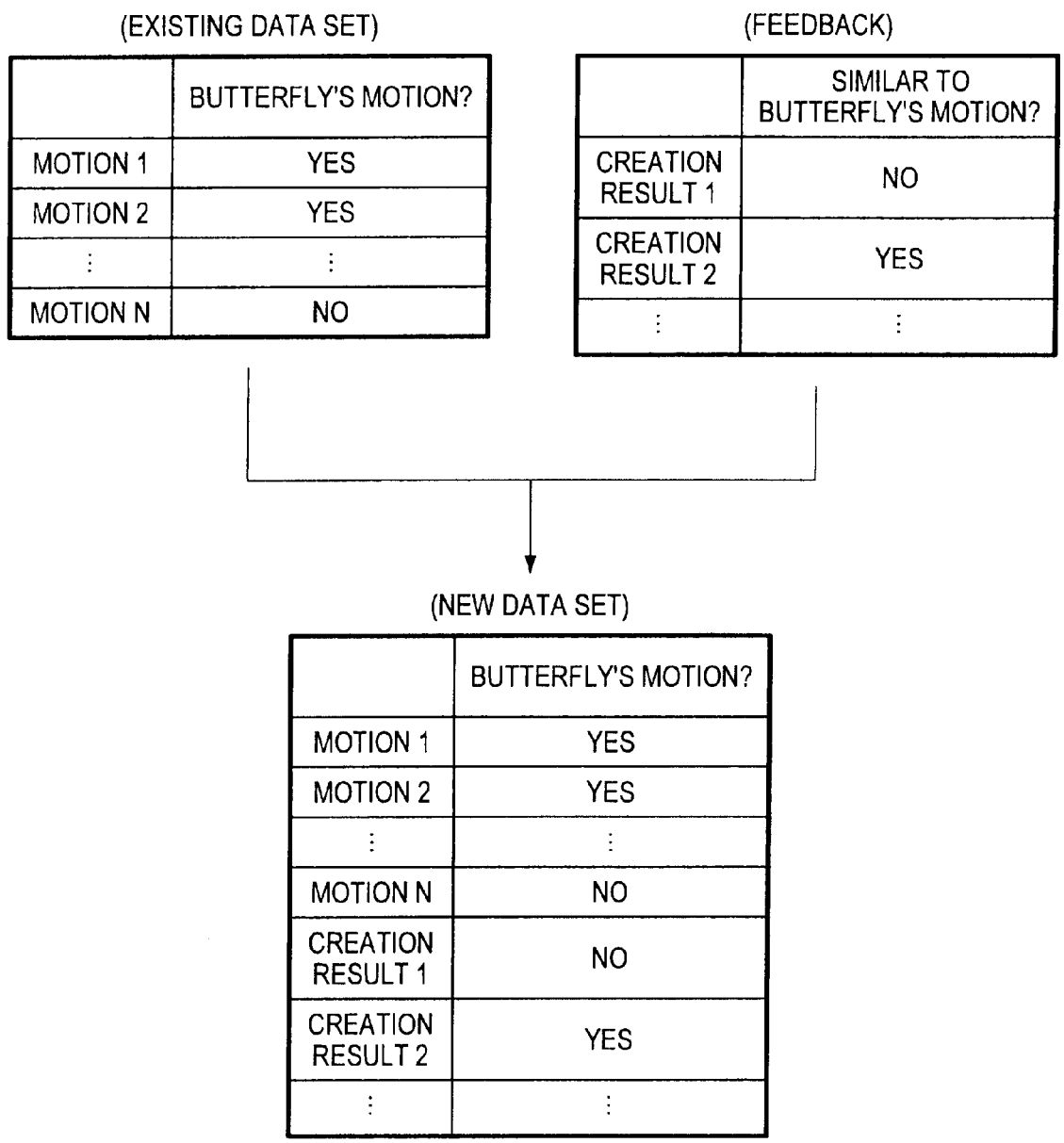
FIG. 25 is an explanatory diagram showing an overview of a reconstruction process for a data set performed by the pseudo-motion creator automatic construction system according to the embodiment.

For example, in a case feedbacks as shown in FIG. 25 are obtained from the user, the data-set-for-evaluator-construction input unit 202 adds information on the feedbacks to the existing data set for evaluator construction and reconstructs a new data set for evaluator construction. Then, the data-set-for-evaluator-construction input unit 202 inputs the new data set for evaluator construction obtained by reconstruction to the evaluator construction unit 204. When the new data set for evaluator construction is input, the evaluator construction unit 204 reconstructs the evaluator by machine learning based on the genetic algorithm described above. Then, the evaluator construction unit 204 inputs the reconstructed evaluator to the pseudo-motion evaluation unit 210.

In this manner, when a feedback is obtained from the user, the evaluator is reconstructed and the evaluator held by the pseudo-motion evaluation unit 210 is updated. Then, a creation method is created by using the evaluator after update, and a movement track created by using the creation method is output. In this manner, by receiving the feedback of the user, an evaluator capable of evaluating the likeness to a butterfly with a higher accuracy is automatically constructed.

Heretofore, the functional configuration of the information processing apparatus 200 according to the present embodiment has been described. Additionally, the creation method that is eventually output from the output unit 214 in the above explanation is the pseudo-motion creator.

(Functional Configuration of Information Processing Apparatus 250)

Next, a functional configuration of the information processing apparatus 250 which is a modified example of the information processing apparatus 200 will be described.

As shown in FIG. 15, the information processing apparatus 250 mainly includes a creation method preparation unit 206, a pseudo-motion creation unit 208, a pseudo-motion evaluation unit 210, a creation method update unit 212, and an output unit 214. The difference to the information processing apparatus 200 shown in FIG. 14 is that the information processing apparatus 250 does not construct an evaluator by itself but acquires the evaluator from the outside. Accordingly, the difference to the information processing apparatus 200 lies in the acquisition source of the evaluator to be used by the pseudo-motion evaluation unit 210. Additionally, the configuration and the construction method of the evaluator to be used by the pseudo-motion evaluation unit 210 is the same for the information processing apparatus 250. That is, the information processing apparatus 250 is a modified example of the information processing apparatus 200 with regard to an acquisition method of the evaluator. Therefore, the function of each structural element of the information processing apparatus 250 is substantially the same with the function of a corresponding structural element of the information processing apparatus 200. Accordingly, an explanation on the details of the function of each structural element of the information processing apparatus 250 will be omitted.

Heretofore, the functional configuration of the information processing apparatus 250 according to the present embodiment has been described.

<3-3: Pseudo-Motion Creation Method>

Figure 26:
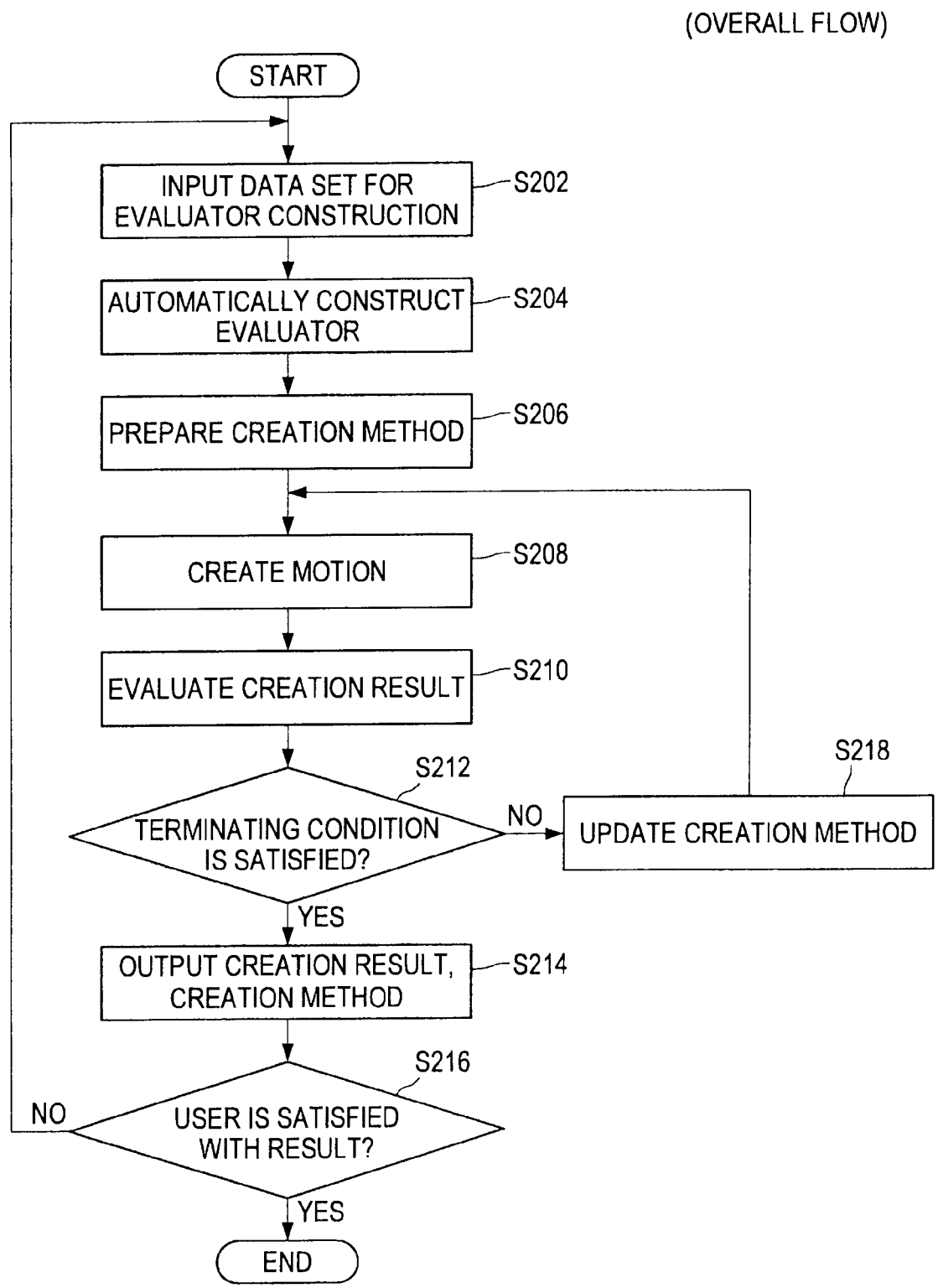
FIG. 26 is an explanatory diagram showing a flow of processing performed by the pseudo-motion creator automatic construction system according to the embodiment.

Next, a creation method of a pseudo-motion according to the present embodiment will be described with reference to FIG. 26. FIG. 26 is an explanatory diagram showing a flow of processing relating to a creation method of a pseudo-motion according to the present embodiment. Note that the example of FIG. 26 relates to processing by the information processing apparatus 200 described above.

As shown in FIG. 26, first, the data-set-for-evaluator-construction input unit 202 acquires a data set for evaluator construction, and inputs the same to the evaluator construction unit 204 (S202). Next, the evaluator construction unit 204 automatically constructs an evaluator (S204). Additionally, the process of step S204 will be described later in detail.

Next, the creation method preparation unit 206 randomly combines operators and creates creation methods (S206). Then, the pseudo-motion creation unit 208 creates movement tracks (pseudo-motions) by using the creation methods created by the creation method preparation unit 206 (S208). Then, the pseudo-motion evaluation unit 210 calculates, by using the evaluator constructed by the evaluator construction unit 204, an evaluation value of each movement track created by the pseudo-motion creation unit 208 (S210).

Next, the pseudo-motion evaluation unit 210 decides, based on the calculated evaluation value, a user operation, or the like, whether a terminating condition is satisfied or not (S212). In the case the terminating condition is satisfied, the pseudo-motion evaluation unit 210 inputs the movement track and the creation method to the output unit 214. Then, the information processing apparatus 200 proceeds with the process to step S214. On the other hand, when the terminating condition is not satisfied, the pseudo-motion evaluation unit 210 inputs the evaluation values of respective creation methods to the creation method update unit 212. Then, the information processing apparatus 200 proceeds with the process to step S218.

In the case the process proceeded to step S214, the output unit 214 outputs the movement track and the creation method and presents the same to the user (S214). Then, whether or not the user is satisfied with the movement track created in a pseudo manner is decided (S216), and in the case the user is satisfied, the series of processes is ended. On the other hand, if the user is not satisfied with the creation result of the movement track and the feedback is input, the information processing apparatus 200 reconstructs a data set for evaluator construction that reflects the feedback, and performs again the processes of step S202 and subsequent steps based on the data set for evaluator construction.

In the case the process proceeded to step S218 by the decision at step S212, the creation method update unit 212 updates the creation methods based on the genetic algorithm (S218). Then, the creation method update unit 212 inputs the creation methods after update to the pseudo-motion creation unit 208. Then, the information processing apparatus 200 returns the process to step S208 and performs again the processes of step S208 and subsequent steps. Eventually, the series of processes is ended when the satisfaction of the user is obtained in the decision at step S216.

Heretofore, the creation method of a pseudo-motion according to the present embodiment has been described. Additionally, the creation method that is eventually output from the output unit 214 in the above explanation is the pseudo-motion creator.

As described above, in the present embodiment, an evaluator is automatically constructed by the genetic algorithm, and also, a creation process of a creation method based on the genetic algorithm is performed by using the evaluator. Accordingly, it becomes possible to automatically construct an algorithm (butterfly's motion prediction (pseudo-motion creation) algorithm)) whose correct answer is not uniquely determined.

Additionally, heretofore, an explanation has been made consistently on the pseudo-motion creator. However, the pseudo-motion creator can be modified to an arbitrary algorithm whose correct answer is not uniquely determined. In this case, the motion data in the data set for evaluator construction is changed to other appropriate data. However, the mechanisms of the automatic construction method of an evaluator and the automatic construction method of an algorithm according to the present embodiment described above are not modified. Accordingly, such modification is, of course, also within the technical scope of the present embodiment.

Heretofore, the second embodiment of the present invention has been described.

<4: Third Embodiment (Automatic Composer Construction System)>

Next, a third embodiment of the present embodiment will be described with reference to FIG. 27. The present embodiment relates to a construction method of an automatic composer. Furthermore, a configuration of an automatic composer construction system according to the present embodiment is expressed as FIG. 27. Note that the operation of the automatic composer construction system is similar to the operation of the information processing apparatus 200 according to the above-described second embodiment shown in FIG. 26. The difference between them lies in the configuration of the data set for evaluator construction and the configuration of an output vector output by a creation method.

For example, the data set for evaluator construction is changed to a combination of music data, non-music data (combination of random sounds, or the like) and correct answer information indicating "music" or "not music". Also, the output vector of the creation method created in step S206 of FIG. 26 is changed from the acceleration vector to a combination of parameters relating to music, such as resonance, sound source and scale. With these changes, the automatic composer construction system for automatically constructing the automatic composer is realized.

Heretofore, the third embodiment of the present invention has been described.

<5: Fourth Embodiment (Image/Video Automatic Creator Construction System)>

Figure 28:
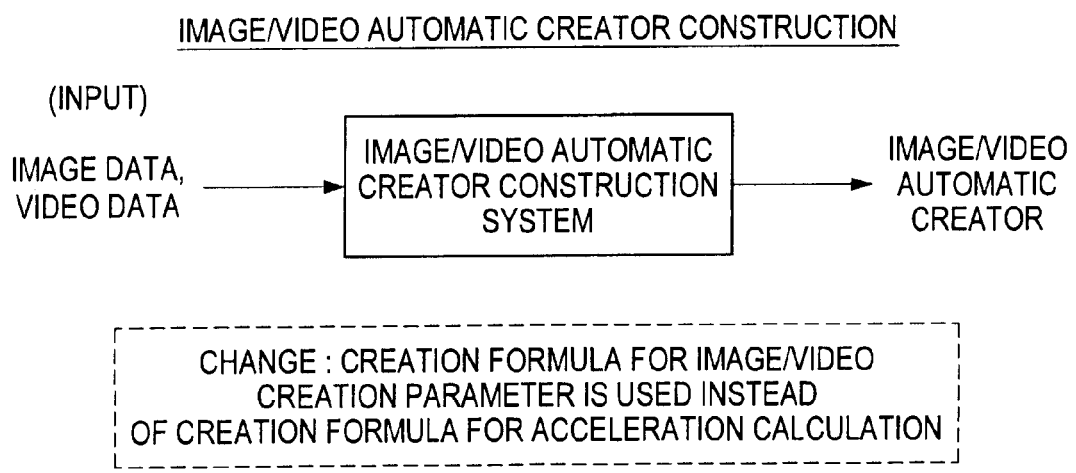
FIG. 28 is an explanatory diagram showing an image/video automatic creator construction system according to a second application example of the embodiment.

Next, a fourth embodiment of the present invention will be described with reference to FIG. 28. The present embodiment relates to a construction method of an image/video automatic creator. Furthermore, a configuration of an image/video automatic creator construction system according to the present embodiment is expressed as FIG. 28. Note that the operation of the image/video automatic creator construction system is similar to the operation of the information processing apparatus 200 according to the second embodiment shown in FIG. 26. The difference between the two lies in the configuration of the data set for evaluator construction and the configuration of an output vector output by a creation method.

For example, the data set for evaluator construction is changed to a combination of video/image data, non-video/non-image data (a combination of random pixel values, or the like) and correct answer information indicating "video/image" or "not video/image". Also, the output vector of the creation method created in step S206 of FIG. 26 is changed from the acceleration vector to a combination of parameters relating to an image/video. With these changes, the image/ video automatic creator construction system for automatically constructing the image/video automatic creator is realized.

Heretofore, the fourth embodiment of the present invention has been described.

<6: Hardware Configuration>

Here, an example of a hardware configuration of each system according to the first to fourth embodiments described above will be described. The function of each structural element of the information processing apparatus 100 described above can be realized by using the hardware configuration of an information processing apparatus shown in FIG. 29, for example. That is, the function of each of the structural elements is realized by controlling the hardware shown in FIG. 29 by using a computer program.

Figure 29:
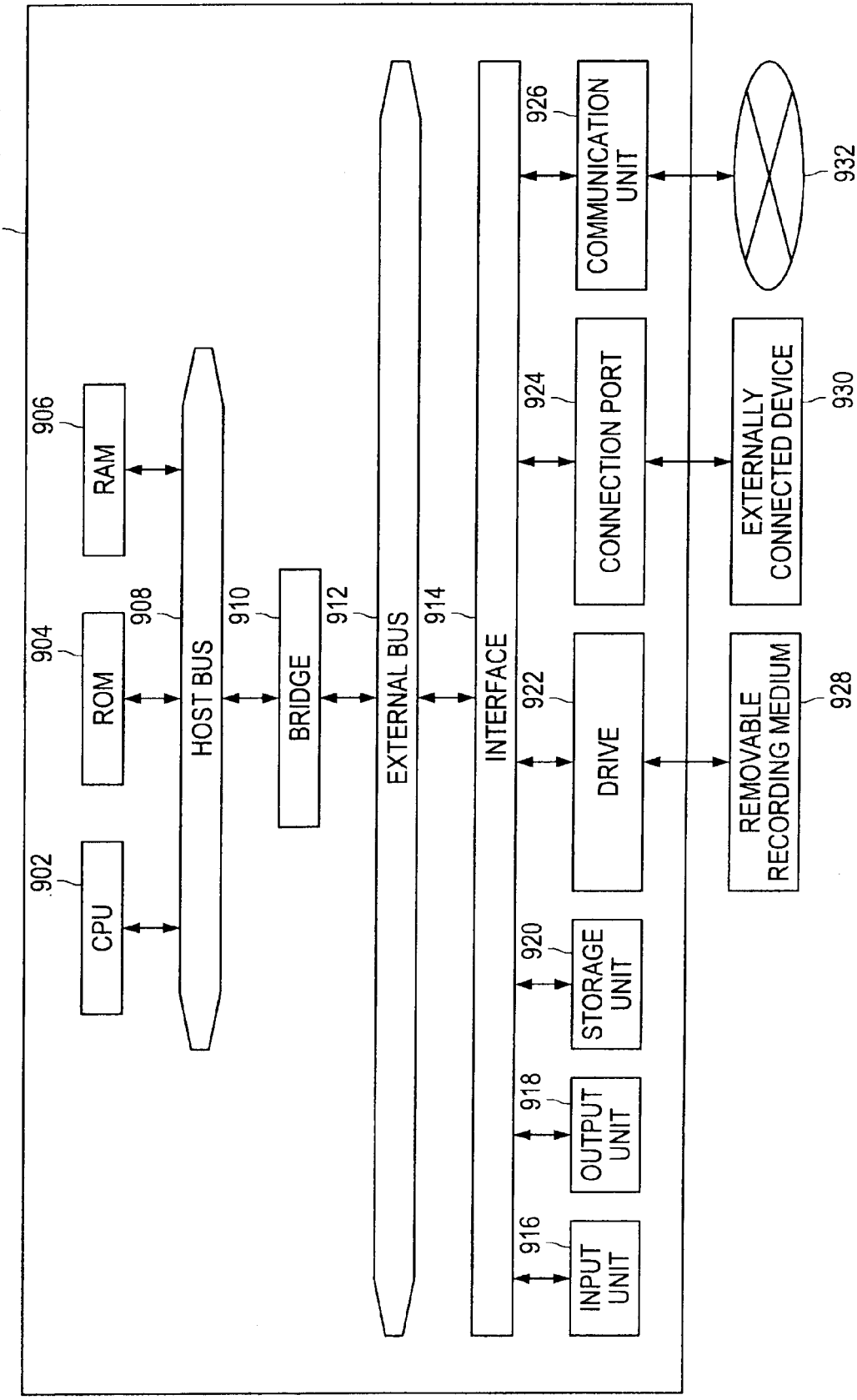
FIG. 29 is an explanatory diagram showing an example of a hardware configuration capable of realizing a function of the information processing apparatus of each embodiment of the present invention.

As shown in FIG. 29, this hardware mainly includes a CPU 902, a ROM 904, a RAM 906, a host bus 908, and a bridge 910. Furthermore, this hardware includes an external bus 912, an interface 914, an input unit 916, an output unit 918, a storage unit 920, a drive 922, a connection port 924, and a communication unit 926. Moreover, the CPU is an abbreviation for Central Processing Unit. Also, the ROM is an abbreviation for Read Only Memory. Furthermore, the RAM is an abbreviation for Random Access Memory.

The CPU 902 functions as an arithmetic processing unit or a control unit, for example, and controls entire operation or a part of the operation of each structural element based on various programs recorded on the ROM 904, the RAM 906, the storage unit 920, or a removal recording medium 928. The ROM 904 is means for storing, for example, a program to be loaded on the CPU 902 or data or the like used in an arithmetic operation. The RAM 906 temporarily or perpetually stores, for example, a program to be loaded on the CPU 902 or various parameters or the like arbitrarily changed in execution of the program.

These structural elements are connected to each other by, for example, the host bus 908 capable of performing high-speed data transmission. For its part, the host bus 908 is connected through the bridge 910 to the external bus 912 whose data transmission speed is relatively low, for example. Furthermore, the input unit 916 is, for example, a mouse, a keyboard, a touch panel, a button, a switch, or a lever. Also, the input unit 916 may be a remote control that can transmit a control signal by using an infrared ray or other radio waves.

The output unit 918 is, for example, a display device such as a CRT, an LCD, a PDP or an ELD, an audio output device such as a speaker or headphones, a printer, a mobile phone, or a facsimile, that can visually or auditorily notify a user of acquired information. Moreover, the CRT is an abbreviation for Cathode Ray Tube. The LCD is an abbreviation for Liquid Crystal Display. The PDP is an abbreviation for Plasma Display Panel. Also, the ELD is an abbreviation for Electro-Luminescence Display.

The storage unit 920 is a device for storing various data. The storage unit 920 is, for example, a magnetic storage device such as a hard disk drive (HDD), a semiconductor storage device, an optical storage device, or a magneto-optical storage device. The HDD is an abbreviation for Hard Disk Drive.

The drive 922 is a device that reads information recorded on the removal recording medium 928 such as a magnetic disk, an optical disk, a magneto-optical disk or a semiconductor memory, or writes information in the removal recording medium 928. The removal recording medium 928 is, for example, a DVD medium, a Blu-ray medium, an HD-DVD medium, various types of semiconductor storage media, or the like. Of course, the removal recording medium 928 may be, for example, an electronic device or an IC card on which a non-contact IC chip is mounted. The IC is an abbreviation for Integrated Circuit.

The connection port 924 is a port such as an USB port, an IEEE1394 port, a SCSI, an RS-232C port, or a port for connecting an externally connected device 930 such as an optical audio terminal. The externally connected device 930 is, for example, a printer, a mobile music player, a digital camera, a digital video camera, or an IC recorder. Moreover, the USB is an abbreviation for Universal Serial Bus. Also, the SCSI is an abbreviation for Small Computer System Interface.

The communication unit 926 is a communication device for connecting to a network 932, and is, for example, a communication card for a wired or wireless LAN, Bluetooth (registered trademark), or WUSB, an optical communication router, an ADSL router, or various communication modems. The network 932 connected to the communication unit 926 is configured from a wire-connected or wirelessly connected network, and is the Internet, a home-use LAN, infrared communication, visible light communication, broadcasting, or satellite communication, for example. Moreover, the LAN is an abbreviation for Local Area Network. Also, the WUSB is an abbreviation for Wireless USB. Furthermore, the ADSL is an abbreviation for Asymmetric Digital Subscriber Line.

Heretofore, an example of the hardware configuration has been described.

<7: Evaluator Automatic Construction Method>

Next, a flow of automatic construction processing for an evaluator will be described with reference to FIGS. 30 to 43. FIGS. 30 to 43 are explanatory diagrams showing flows of automatic construction processing for an evaluator. The automatic construction processing for an evaluator described here is performed by the functions of the evaluator construction units 104 and 204.

(Overall Flow)

Figure 30:
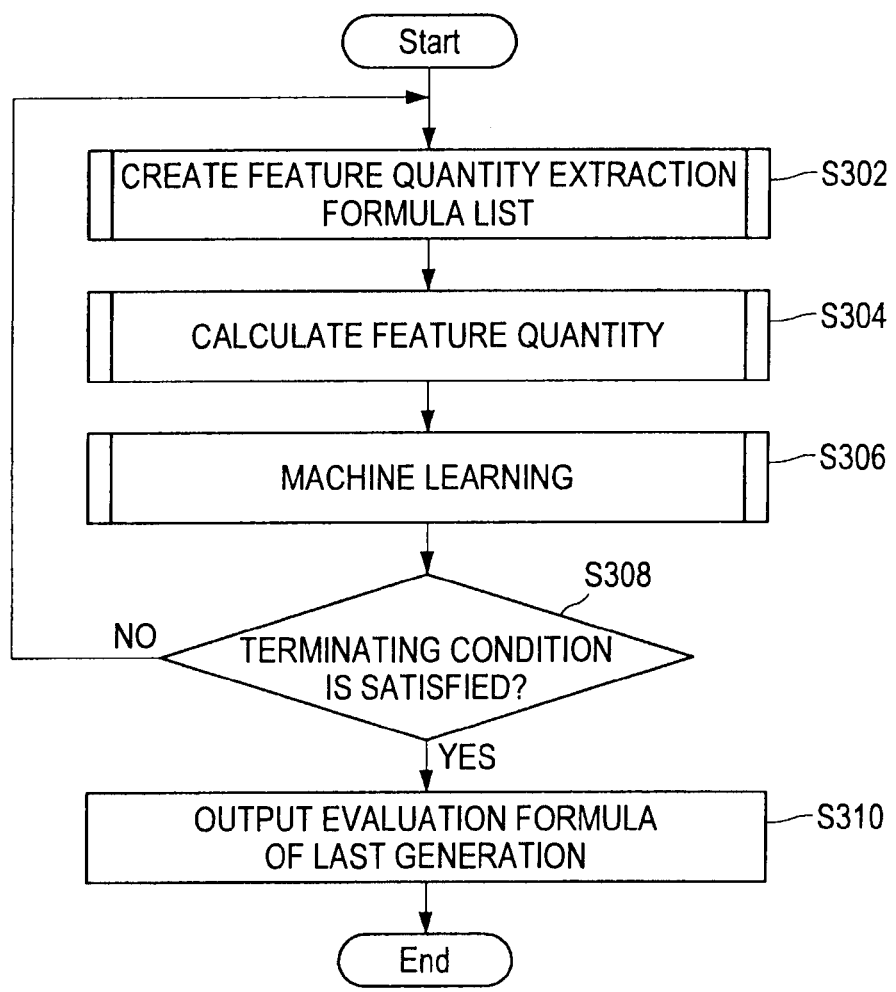
FIG. 30 is an explanatory diagram showing an automatic construction method of the evaluator of each embodiment of the present invention.

As shown in FIG. 30, the evaluator construction unit 104 or 204 first creates a feature quantity extraction formula list by randomly combining processing functions (S302). Next, the evaluator construction unit 104 or 204 calculates a feature quantity by using a data set for evaluator construction and each feature quantity extraction formula included in the feature quantity extraction formula list (S304). Then, the evaluator construction unit 104 or 204 creates an evaluation formula created by combining feature quantity extraction formulae, by using the feature quantities and correct information in the data set for evaluator construction and by machine learning based on a genetic algorithm (S306).

Next, the evaluator construction unit 104 or 204 calculates a contribution rate of the feature quantity extraction formula (second generation feature quantity extraction formula) included in the evaluation formula to the evaluation formula and a reliability of the evaluation formula based on the contribution rate, and determines a terminating condition based on the reliability (S308). In a case the terminating condition is satisfied in step S308, the evaluator construction unit 104 or 204 outputs the evaluation formula as an evaluator (S310). On the other hand, in a case the reliability did not satisfy the terminating condition, the evaluator construction unit 104 or 204 creates a second feature quantity extraction formula list from the second generation feature quantity extraction formulae based on the genetic algorithm (S302).

Next, the evaluator construction unit 104 or 204 creates an evaluation formula by performing the processes of steps S304 to S310 based on the second generation feature quantity extraction formula list, and calculates its reliability (S304 to S310). In a case the reliability satisfied the terminating condition, the evaluator construction unit 104 or 204 outputs the evaluation formula as an evaluator. On the other hand, in a case the reliability did not satisfy the terminating condition, the evaluator construction unit 104 or 204 performs again the processes of steps S302 to S306, as in the case of the second generation feature quantity extraction formula. In this manner, generation change is repeated until the reliability of the evaluation formula satisfies the terminating condition. The evaluation formula is output as the evaluator at the time point the reliability of the evaluation satisfied the terminating condition.

In the following, the processes of steps S302, S304 and S306 will be described in greater detail. Additionally, the terminating condition mentioned above is that an end operation is performed by a user or that the evaluator of the last generation is sufficiently accurate (that the reliability is sufficiently above a predetermined value).

(S302: Creation of Feature Quantity Extraction Formula List)

First, the process of step S302 will be described in greater detail with reference to FIGS. 31 to 39.

Figure 31:
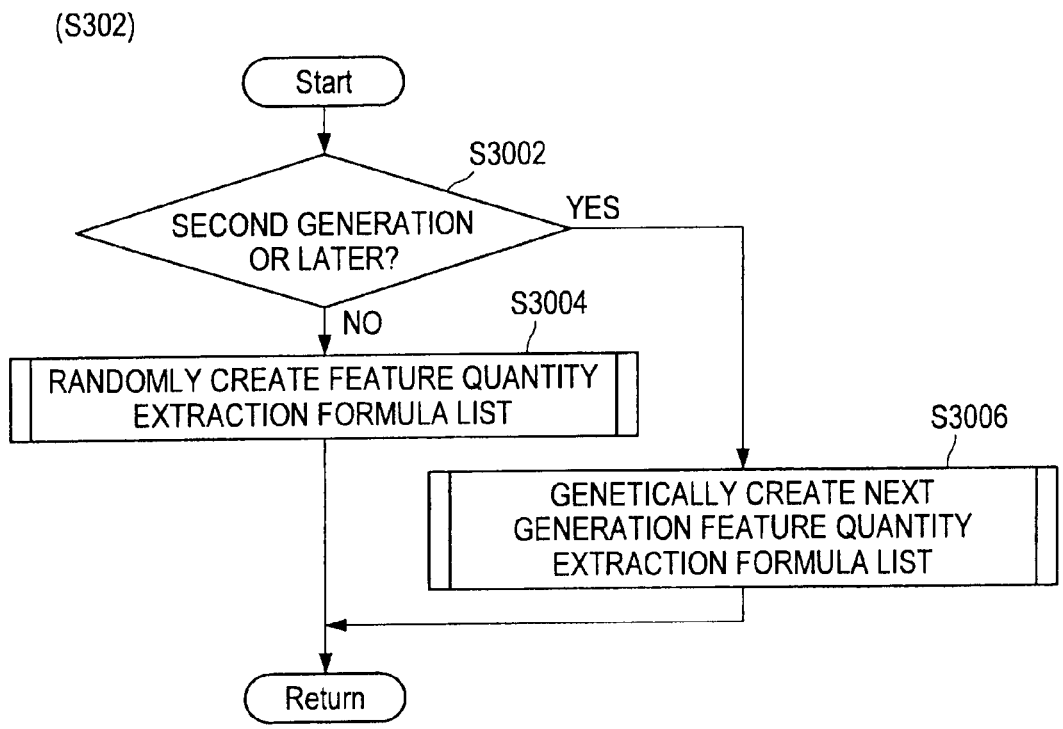
FIG. 31 is an explanatory diagram showing an automatic construction method of the evaluator of each embodiment of the present invention.

As shown in FIG. 31, the evaluator construction unit 104 or 204 decides whether a feature quantity extraction formula list to be created in step S302 is that of the second generation or later (S3002). In the case of creating a feature quantity extraction formula list of the second generation or later, the evaluator construction unit 104 or 204 proceeds with the process to step S3006. On the other hand, in the case of creating a first generation feature quantity extraction formula list, the evaluator construction unit 104 or 204 proceeds with the process to step S3004.

In the case the process proceeded to step S3004, the evaluator construction unit 104 or 204 creates a feature quantity extraction formula list by randomly combining processing functions (a processing target axis and an operator described later) prepared in advance (S3004). On the other hand, in the case the process proceeded to step S3006, the evaluator construction unit 104 or 204 creates a next generation feature quantity extraction formula list by inputting next generation feature quantity extraction formulae to a genetic algorithm (S3006). Then, the evaluator construction unit 104 or 204 proceeds with the process to step S306.

(S3004 (Cf. S302): Random Creation of Feature Quantity Extraction Formula List)

Here, the process according to step S3004 mentioned above will be described in greater detail with reference to FIG. 32. Additionally, it is assumed that the number of feature quantity extraction formulae included in the feature quantity extraction formula list is set in advance to m.

First, in step S3004, the evaluator construction unit 104 or 204 repeats m times a creation process of a feature quantity extraction formula that is obtained by randomly combining processing functions (S3012, S3016). That is, the evaluator construction unit 104 or 204 repeatedly performs the process of step S3014 while incrementing a parameter M from 1 to m. First, the evaluator construction unit 104 or 204 sets parameter M to 0 (S3012), and creates a feature quantity extraction formula by randomly combining processing functions (S3014). Next, the evaluator construction unit 104 or 204 increments parameter M by 1 and performs again the process of step S3014 (S3016). After repeatedly performing the process of step S3014 until parameter M reaches m, the evaluator construction unit 104 or 204 ends the process of step S3004.

(S3014 (Cf. S3004): Random Creation of Feature Quantity Extraction Formula)

Figure 33:
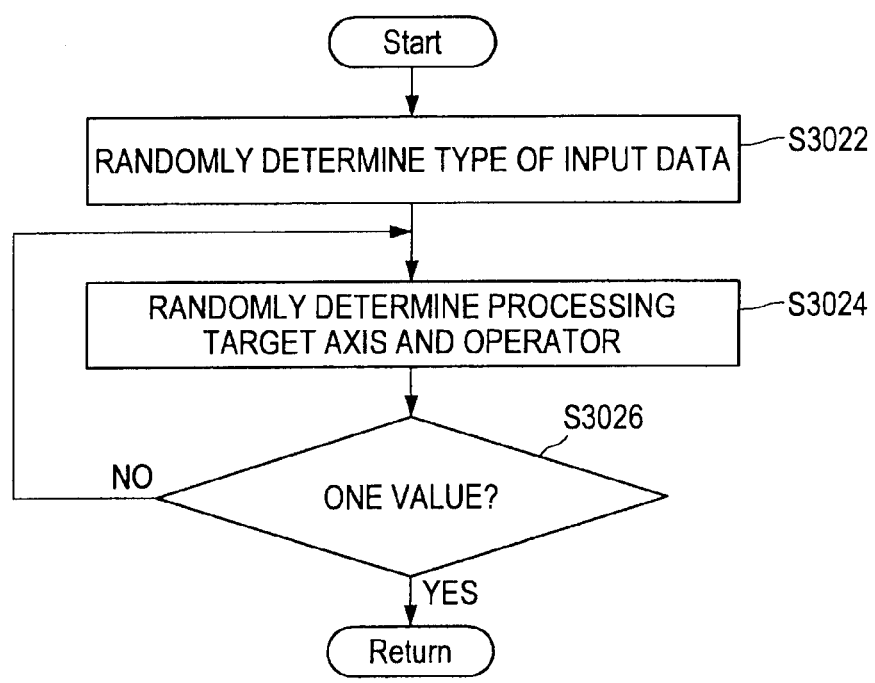
FIG. 33 is an explanatory diagram showing an automatic construction method of the evaluator of each embodiment of the present invention.

Here, the process according to step S3014 mentioned above will be described in greater detail with reference to FIG. 33. Additionally, it is assumed that the processing functions (processing target axis, operator) used for construction of a feature quantity extraction formula are set in advance. Moreover, the processing target axis here means a coordinate axis to be the target of operation, such as time, frequency, position or the type of observation value. That is, information on along what coordinate axis operation by an operator is to be performed (direction of operation) is specified by the processing target axis.

Furthermore, the operator here is an operator indicating the contents of a process. A feature quantity extraction formula can be constructed by using various types of operators such as differential operation, maximum value output, a low-pass filter, a high-pass filter, an unbiased variance, a fast Fourier transform or absolute value output. Additionally, depending on the type of the operator, a parameter for operation is specified as the operator. For example, in the case of a low-pass filter or a high-pass filter, a parameter for specifying a stopband or a passband is specified. Furthermore, besides the processing functions, information indicating the type of data to be a processing target (hereinafter, type information) may be included in the feature quantity extraction formula.

First, in step S3014, the evaluator construction unit 104 or 204 randomly determines the type (type information) of input data (S3022). However, in a case where the type of input data is one, the process of step S3014 may be skipped. Next, the evaluator construction unit 104 or 204 randomly determines a combination of a processing target axis and an operator (processing functions) for constructing a feature quantity extraction formula (S3024). Then, the evaluator construction unit 104 or 204 creates a feature quantity extraction formula by combining the processing functions that have been randomly determined, and decides whether or not the output of the feature quantity extraction formula will be one value (scalar quantity) (S3028).

Figure 32:
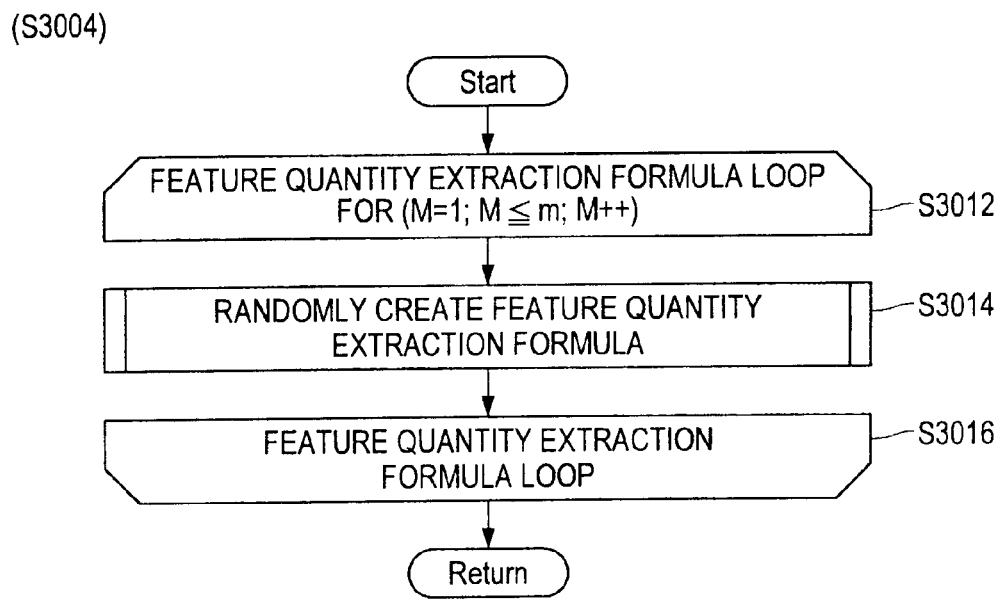
FIG. 32 is an explanatory diagram showing an automatic construction method of the evaluator of each embodiment of the present invention.

In the case the output of the feature quantity extraction formula becomes one value in step S3028, the evaluator construction unit 104 or 204 proceeds with the process to step S3016 in FIG. 32. On the other hand, in the case the output of the feature quantity extraction formula does not become one value, the evaluator construction unit 104 or 204 returns the process to step S3024, and again creates a feature quantity extraction formula by randomly determining the processing functions.

(S3006 (Cf. S302): Feature Quantity Extraction Formula List Creation by Genetic Algorithm)

Figure 34:
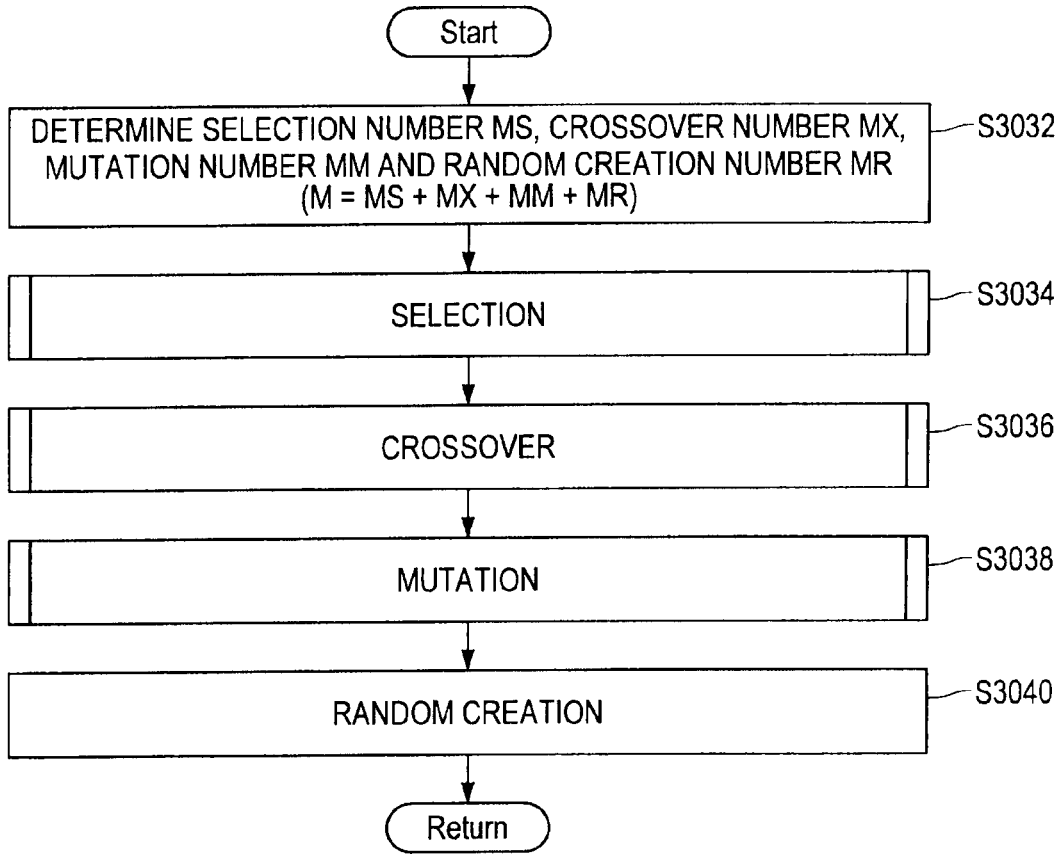
FIG. 34 is an explanatory diagram showing an automatic construction method of the evaluator of each embodiment of the present invention.

Here, the process according to step S3006 mentioned above will be described in greater detail with reference to FIG. 34.

Additionally, it is assumed that the feature quantity extraction formulae of a g-th ($g \geq 2$) generation are the feature quantity extraction formulae of the previous generation. Also, it is assumed that the number of feature quantity extraction formulae to be created by a selection operation performed in step S3006 is ms, the number of feature quantity extraction formulae to be created by a crossover operation is mx, the number of feature quantity extraction formulae to be created by mutation is mm, and the number of feature quantity extraction formulae to be randomly created is mr. Furthermore, it is assumed that the number of feature quantity extraction formulae to be included in a feature quantity extraction formula list is m.

First, the evaluator construction unit 104 or 204 determines the selection number ms, the crossover number mx, the mutation number mm and the random creation number mr (S3032). Additionally, the selection number ms, the crossover number mx, the mutation number mm and the random creation number mr may be randomly determined to satisfy m=ms+mx+mm+mr or may be partly or wholly determined in advance, or the selection number ms may be determined based on contribution rates to the g-th generation feature quantity extraction formulae and the crossover number mx, the mutation number mm and the random creation number mr may be randomly determined according to the selection number ms.

When the selection number ms, the crossover number mx and the mutation number mm are determined, the evaluator construction unit 104 or 204 selects ms feature quantity extraction formulae with the highest contribution rates from the g-th generation feature quantity extraction formulae and adds them to the feature quantity extraction formula list (S3034). Next, the evaluator construction unit 104 or 204 exchanges a part of the processing functions between the g-th generation feature quantity extraction formulae, creates mx new feature quantity extraction formulae, and adds them to the feature quantity extraction formula list (S3036).

Next, the evaluator construction unit 104 or 204 selects mm feature quantity extraction formulae from the g-th generation feature quantity extraction formulae, randomly changes a part of the processing functions structuring the feature quantity extraction formulae, and adds the feature quantity extraction formulae after change to the feature quantity extraction formula list (S3038). Next, the evaluator construction unit 104 or 204 randomly creates mr feature quantity extraction formulae, and adds them to the feature quantity extraction formula list (S3040). When the processes of steps S3032 to S3040 are complete, the evaluator construction unit 104 or 204 proceeds with the process to step S304.

(S3034 (Cf. S3006): Selection)

Here, the process according to step S3034 (selection process) mentioned above will be described in greater detail with reference to FIG. 35. Additionally, the selection process performed here is one of characteristic processes of a genetic algorithm corresponding to the mechanism of, when taking a feature quantity extraction formula as a living body and processing functions as genes, a living body with superior genes surviving with high probability in the evolutionary process.

Figure 35:
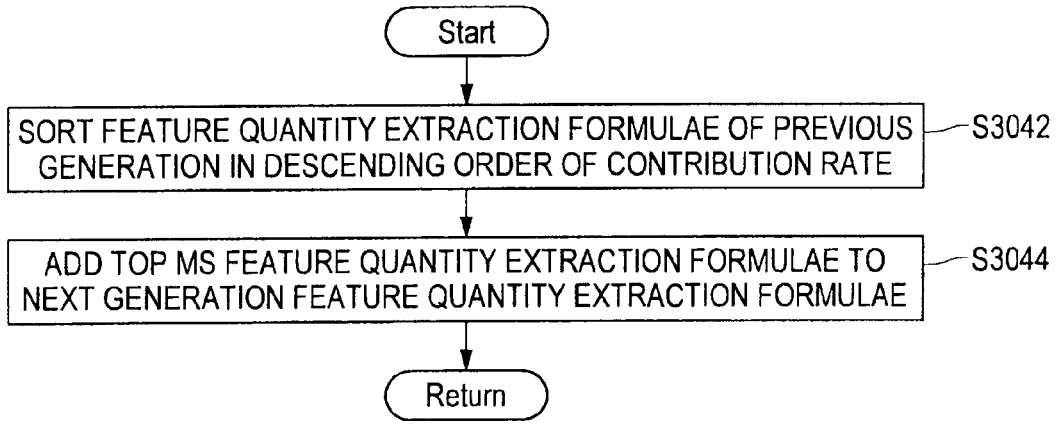
FIG. 35 is an explanatory diagram showing an automatic construction method of the evaluator of each embodiment of the present invention.

As shown in FIG. 35, first, the evaluator construction unit 104 or 204 arranges the g-th generation feature quantity extraction formulae in the descending order of contribution rate described later (S3042). Next, the evaluator construction unit 104 or 204 adds, to the feature quantity extraction formula list, top ms feature quantity extraction formulae in the descending order of contribution rate (S3044). Then, the evaluator construction unit 104 or 204 proceeds with the process to step S3036.

(S3036 (Cf. S3006): Crossover)

Here, the process according to step S3036 (crossover process) mentioned above will be described in greater detail with reference to FIG. 36. Additionally, the crossover process performed here is one of characteristic processes of a genetic algorithm corresponding to the mechanism of, when taking a feature quantity extraction formula as a living body and processing functions as genes, genes of a living body being partially exchanged in the evolutionary process and a living body with a new combination of genes being born.

Figure 36:
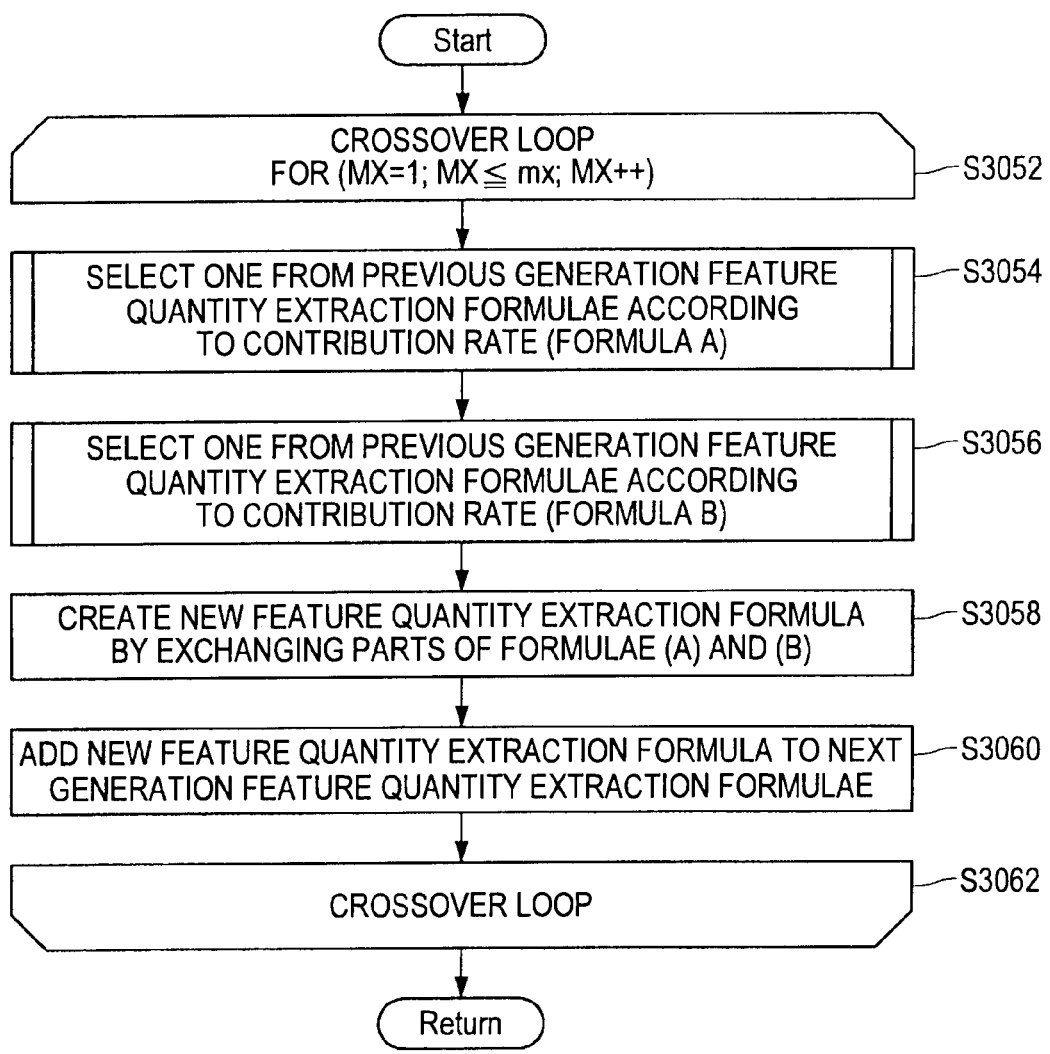
FIG. 36 is an explanatory diagram showing an automatic construction method of the evaluator of each embodiment of the present invention.

As shown in FIG. 36, the evaluator construction unit 104 or 204 repeatedly performs the processes of step S3054 to S3060 mx times while changing, from 1 to mx, index MX for specifying a feature quantity extraction formula to be created by the crossover process (S3052, S3062). First, the evaluator construction unit 104 or 204 sets index MX to 1, and proceeds with the process to step S3054 (S3052). When the process proceeded to step S3054, the evaluator construction unit 104 or 204 selects one feature quantity extraction formula (formula A) from the g-th generation feature quantity extraction formulae based on the contribution rate (S3054).

Next, the evaluator construction unit 104 or 204 selects one feature quantity extraction formula (formula B) from the g-th generation feature quantity extraction formulae based on the contribution rate (S3056). Then, the evaluator construction unit 104 or 204 creates a new feature quantity extraction formula by exchanging a part of the processing functions included in formula A selected in step S3054 and a part of the processing functions included in formula B selected in step S3056 (S3058). Then, the evaluator construction unit 104 or 204 adds the new feature quantity extraction formula created in step S3058 to the feature quantity extraction formula list (S3060).

After performing the processes of steps S3054 to S3060, the evaluator construction unit 104 or 204 increments index MX by 1, and performs again the processes of steps S3054 to S3060. The evaluator construction unit 104 or 204 repeats the processes of steps S3054 to S3060 until index MX reaches mx, and creates mx feature quantity extraction formulae. Then, the evaluator construction unit 104 or 204 proceeds with the process to step S3038.

(S3054, S3056 (Cf. S3036): Selection of Feature Quantity Extraction Formula)

Here, the processes according to steps S3054 and S3056 mentioned above will be described in greater detail with reference to FIG. 37.

Figure 37:
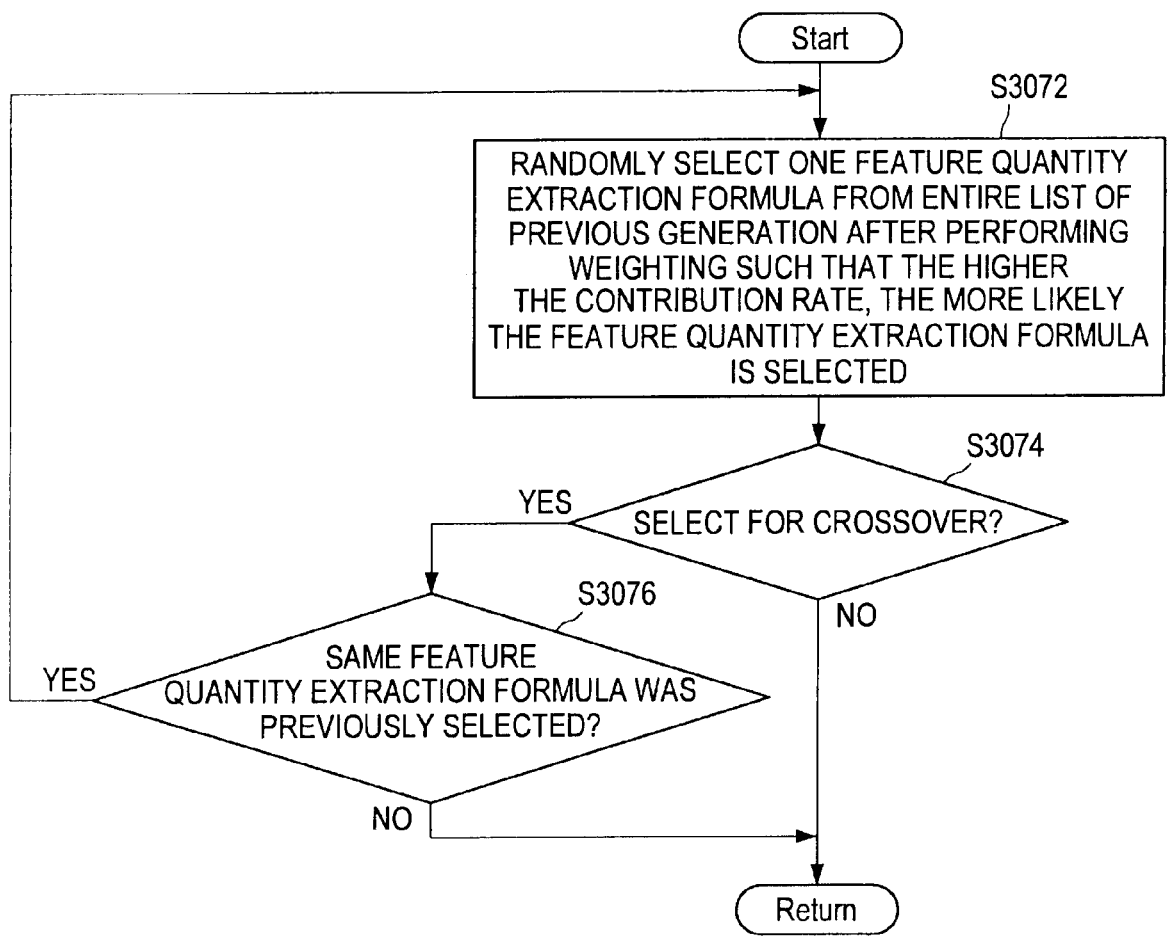
FIG. 37 is an explanatory diagram showing an automatic construction method of the evaluator of each embodiment of the present invention.

As shown in FIG. 37, the evaluator construction unit 104 or 204 first weights selection probability for each feature quantity extraction formula such that the higher the contribution rate of a feature quantity extraction formula, the higher the probability of the feature quantity extraction formula being selected, and then randomly selects one feature quantity extraction formula from the g-th generation feature quantity extraction formulae (S3072). Then, the evaluator construction unit 104 or 204 decides whether the selected feature quantity extraction formula is one that has already been selected for the crossover process or not (S3074).

In a case the feature quantity extraction formula is one that has already been selected for the crossover process, the evaluator construction unit 104 or 204 proceeds with the process to step S3076. On the other hand, in a case the feature quantity extraction formula has not been already selected for the crossover process, the evaluator construction unit 104 or 204 proceeds with the process to the next processing step (S3056 (in the case of S3054) or S3058 (in the case of S3056)) forming step S3036.

In the case the process proceeded to step S3076, the evaluator construction unit 104 or 204 decides whether the same feature quantity extraction formula has already been selected or not (S3076). In a case the same feature quantity extraction formula has already been selected, the evaluator construction unit 104 or 204 returns the process again to step S3072, and newly selects one feature quantity extraction formula (S3072). On the other hand, in a case the same feature quantity extraction formula has not already been selected, the evaluator construction unit 104 or 204 proceeds with the process to the next processing step (S3056 (in the case of S3054) or S3058 (in the case of S3056)) forming step S3036.

(S3038 (Cf S3006): Mutation)

Here, the process according to step S3038 (mutation process) mentioned above will be described in greater detail with reference to FIG. 38. Additionally, the mutation process performed here is one of characteristic processes of a genetic algorithm corresponding to the mechanism of, when taking a feature quantity extraction formula as a living body and processing functions as genes, genes of a living body being partially mutated in the evolutionary process and a living body with a new combination of genes being born.

Figure 38:
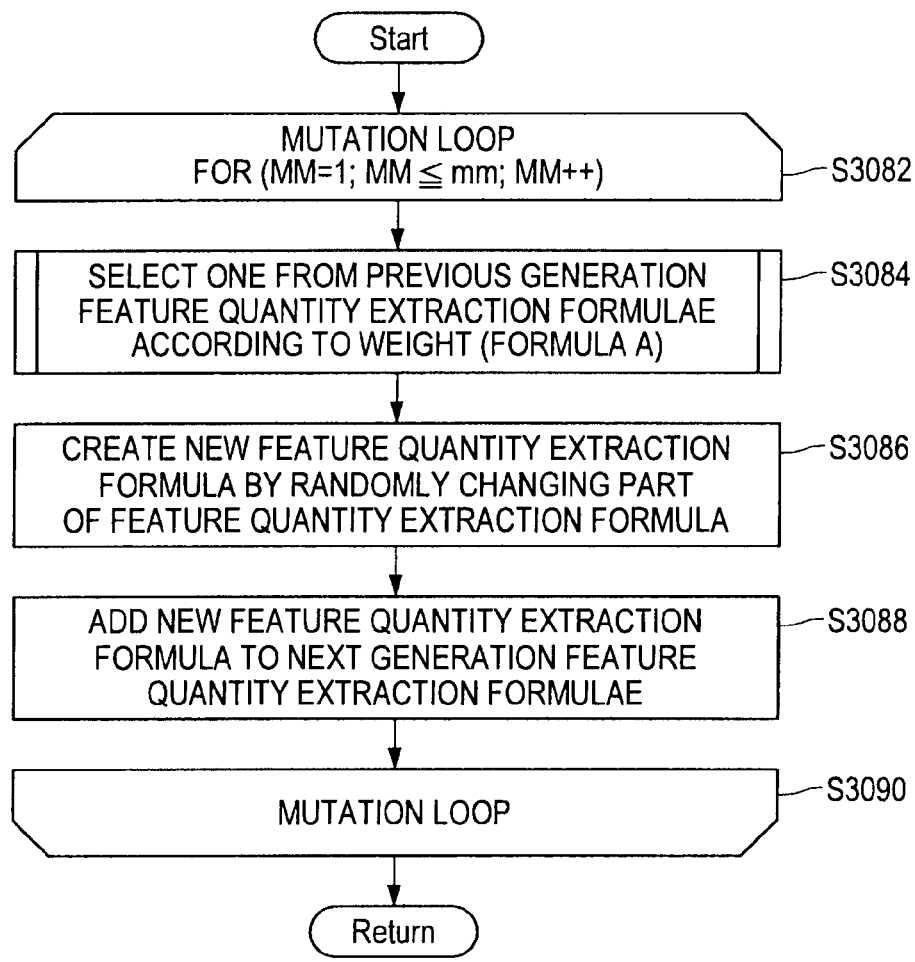
FIG. 38 is an explanatory diagram showing an automatic construction method of the evaluator of each embodiment of the present invention.

As shown in FIG. 38, the evaluator construction unit 104 or 204 repeatedly performs the processes of steps 53084 to 53088 while incrementing index MM from 1 to mm, and creates mm feature quantity extraction formulae (S3082, S3090). First, the evaluator construction unit 104 or 204 sets index MM to 1 (S3082), and selects one feature quantity extraction formula (formula A) from the g-th generation feature quantity extraction formulae (S3084). At this time, the evaluator construction unit 104 or 204 performs the same process as the process of step S3054 shown in FIG. 37 and selects one feature quantity extraction formula (formula A) based on the contribution rates of the feature quantity extraction formulae.

Next, the evaluator construction unit 104 or 204 changes a part of the processing functions included in the feature quantity extraction formula to randomly selected processing functions, and creates a new feature quantity extraction formula (S3086). Then, the evaluator construction unit 104 or 204 adds the new feature quantity extraction formula created in step S3086 to the feature quantity extraction formula list (S3088). Then, the evaluator construction unit 104 or 204 increments index MM by 1, and performs again the processes of steps S3084 to 53088 (S3090).

Next, the evaluator construction unit 104 or 204 repeatedly performs the processes of steps 53084 to 53088 until index MM reaches mm, and creates mm feature quantity extraction formulae. Then, the evaluator construction unit 104 or 204 proceeds with the process to step S3040.

(S3040 (Cf S3006): Random Creation)

Here, the process according to step S3040 (random creation process) mentioned above will be described in greater detail with reference to FIG. 39.

Figure 39:
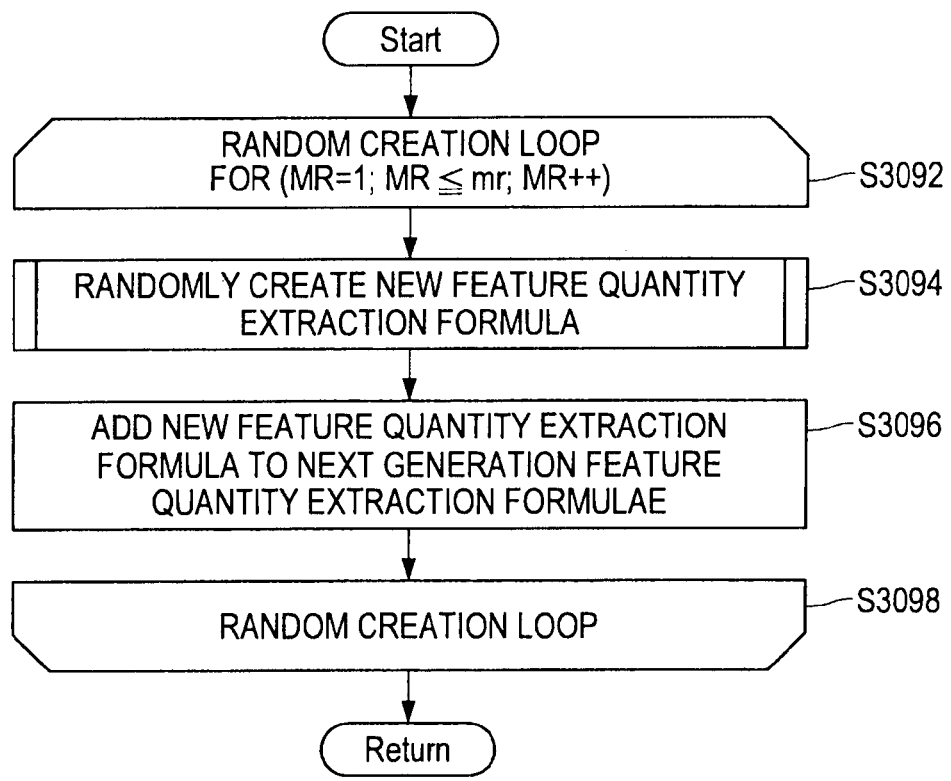
FIG. 39 is an explanatory diagram showing an automatic construction method of the evaluator of each embodiment of the present invention.

As shown in FIG. 39, the evaluator construction unit 104 or 204 repeatedly performs the processes of steps S3094 to S3096 while incrementing index MR from 1 to mr, and creates mr feature quantity extraction formulae (S3092, S3098). First, the evaluator construction unit 104 or 204 sets index MR to 1 (S3092), and creates a new feature quantity extraction formula by randomly combining the processing functions (S3094).

Next, the evaluator construction unit 104 or 204 adds the new feature quantity extraction formula created in step S3092 to the feature quantity extraction formula list (S3096). Then, the evaluator construction unit 104 or 204 increments index MR by 1, and performs again the processes of steps S3094 and 53096 (S3098). Then, the evaluator construction unit 104 or 204 repeatedly performs the processes of steps S3094 and S3096 until index MR reaches mr, and creates mr feature quantity extraction formulae. Additionally, each feature quantity extraction formula is created such that the output will be a scalar quantity.

When the process of step S3040 is complete, the process of step S3006 is complete. When a feature quantity extraction formula list including total m feature quantity extraction formulae is created by steps S3034, S3036, S3038 and S3040, the evaluator construction unit 104 or 204 proceeds with the process to step S304.

(S304: Calculation of Feature Quantity)

Next, the process of step S304 will be described in greater detail with reference to FIG. 40. Additionally, it is assumed that a feature quantity extraction formula list is created in step S3004 or S3006. It is also assumed that this feature quantity extraction formula list includes m feature quantity extraction formulae.

Figure 40:
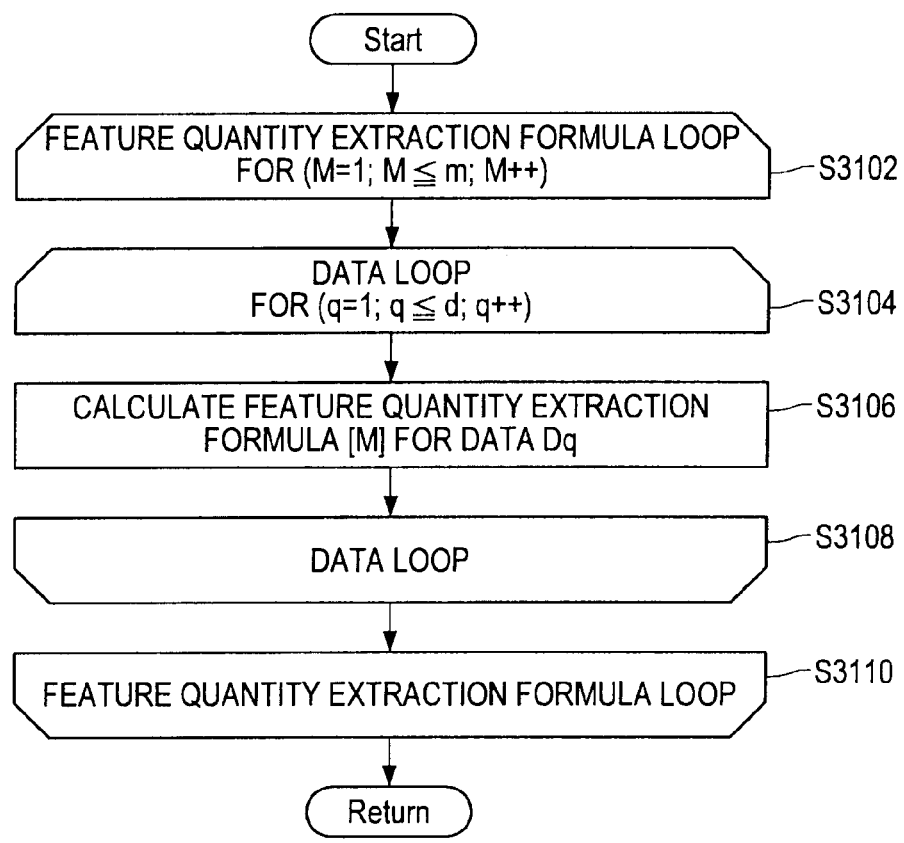
FIG. 40 is an explanatory diagram showing an automatic construction method of the evaluator of each embodiment of the present invention.

As shown in FIG. 40, the evaluator construction unit 104 or 204 repeatedly performs the processes of steps S3104 to S3108 while updating index M from 1 to m (S3102, S3110). Also, the evaluator construction unit 104 or 204 repeatedly performs the process of step S3106 while updating index q from 1 to d (S3104, S3108).

First, the evaluator construction unit 104 or 204 sets index M to 1 and proceeds with the process to step S3104 (S3102). Next, the evaluator construction unit 104 or 204 sets index q to 1 and proceeds with the process to step S3106 (S3104).

Next, the evaluator construction unit 104 or 204 inputs evaluation target data Dq to feature quantity extraction formula [M] and calculates a feature quantity (S3106). Here, feature quantity extraction formula [M] means the M-th feature quantity extraction formula among feature quantity extraction formulae included in the feature quantity extraction formula list. Then, the evaluator construction unit 104 or 204 returns the process to step S3104 (S3108), increments index q by 1 (S3104), and proceeds with the process again to step S3106.

Then, the evaluator construction unit 104 or 204 repeatedly performs the processes of steps 53104 to S3108 until index q reaches d, and calculates feature quantities [M][q] obtained by inputting pieces of evaluation target data Dq (q=1, . . . , d) to feature quantity extraction formula [M].

Next, the evaluator construction unit 104 or 204 proceeds with the process to step S3110, and returns the process to step S3102 (S3110). Then, the evaluator construction unit 104 or 204 increments index M by 1 (S3102), proceeds with the process again to step S3104, and repeatedly performs the processes of steps S3104 to 53108.

The evaluator construction unit 104 or 204 repeatedly performs the processes of steps S3104 to S3108 until index M reaches m, and calculates feature quantities [M][q] obtained by inputting pieces of evaluation target data Dq (q=1, . . . , d) to feature quantity extraction formulae [M] (M=1, . . . , m; q=1, . . . , d).

In this manner, in step S304, the evaluator construction unit 104 or 204 calculates feature quantity [M][q] (M=1, . . . , m; q=1, . . . , d) by inputting a piece of evaluation target data Dq (q=1, . . . , d) to each feature quantity extraction formula [M] (M=1, . . . , m). Furthermore, after feature quantity [M][q] has been calculated in the process of step S304, the evaluator construction unit 104 or 204 proceeds with the process to step S306.

(S306: Machine Learning)

Next, the process of step S306 will be described in greater detail with reference to FIG. 41. Additionally, it is assumed that feature quantity [M][q] (M=1, . . . , m; q=1, . . . , d) is calculated. It is also assumed that correct answer information Dq (q=1, . . . , d) is prepared.

Figure 41:
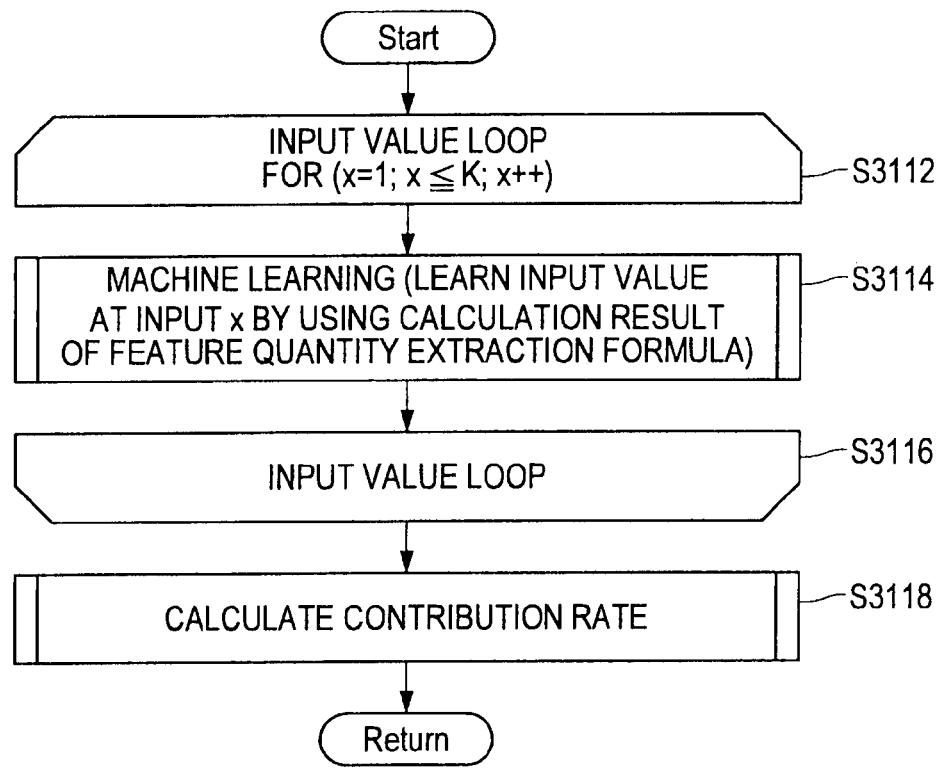
FIG. 41 is an explanatory diagram showing an automatic construction method of the evaluator of each embodiment of the present invention.

As shown in FIG. 41, the evaluator construction unit 104 or 204 repeatedly performs the process of step S3114 while incrementing index x from 1 to K (S3112, S3116). First, the evaluator construction unit 104 or 204 sets index x to 1 (S3112), and proceeds with the process to step S3114. Next, the evaluator construction unit 104 or 204 performs machine learning by using feature quantity [M][q] and correct answer information Dq corresponding to observation value x, and calculates an evaluation formula for observation value x (S3114). In a case of creating an evaluation formula by linearly combining a plurality of feature quantity extraction formulae, each combination coefficient is calculated in step S3114.

Next, the evaluator construction unit 104 or 204 returns the process to step S3112 (S3116), increments index x by 1 (S3112), and performs the process of step S3114. Furthermore, the evaluator construction unit 104 or 204 repeatedly performs the process of step S3114 until index x reaches K, and creates an evaluation formula for each of observation values 1 to K.

Next, the evaluator construction unit 104 or 204 calculates a contribution rate of each feature quantity extraction formula to the evaluation formula constructed in steps S3112 to S3116 (S3118). At this time, the evaluator construction unit 104 or 204 calculates, based on a combination coefficient of each feature quantity extraction formula included in the evaluation formula, the contribution rate of each feature quantity extraction formula to the evaluation formula. Then, the evaluator construction unit 104 or 204 proceeds with the process to step S308.

(S3114 (Cf. S306): Creation of Evaluator by Machine Learning)

Here, the process according to step S3114 mentioned above will be described in greater detail with reference to FIG. 42.

Figure 42:
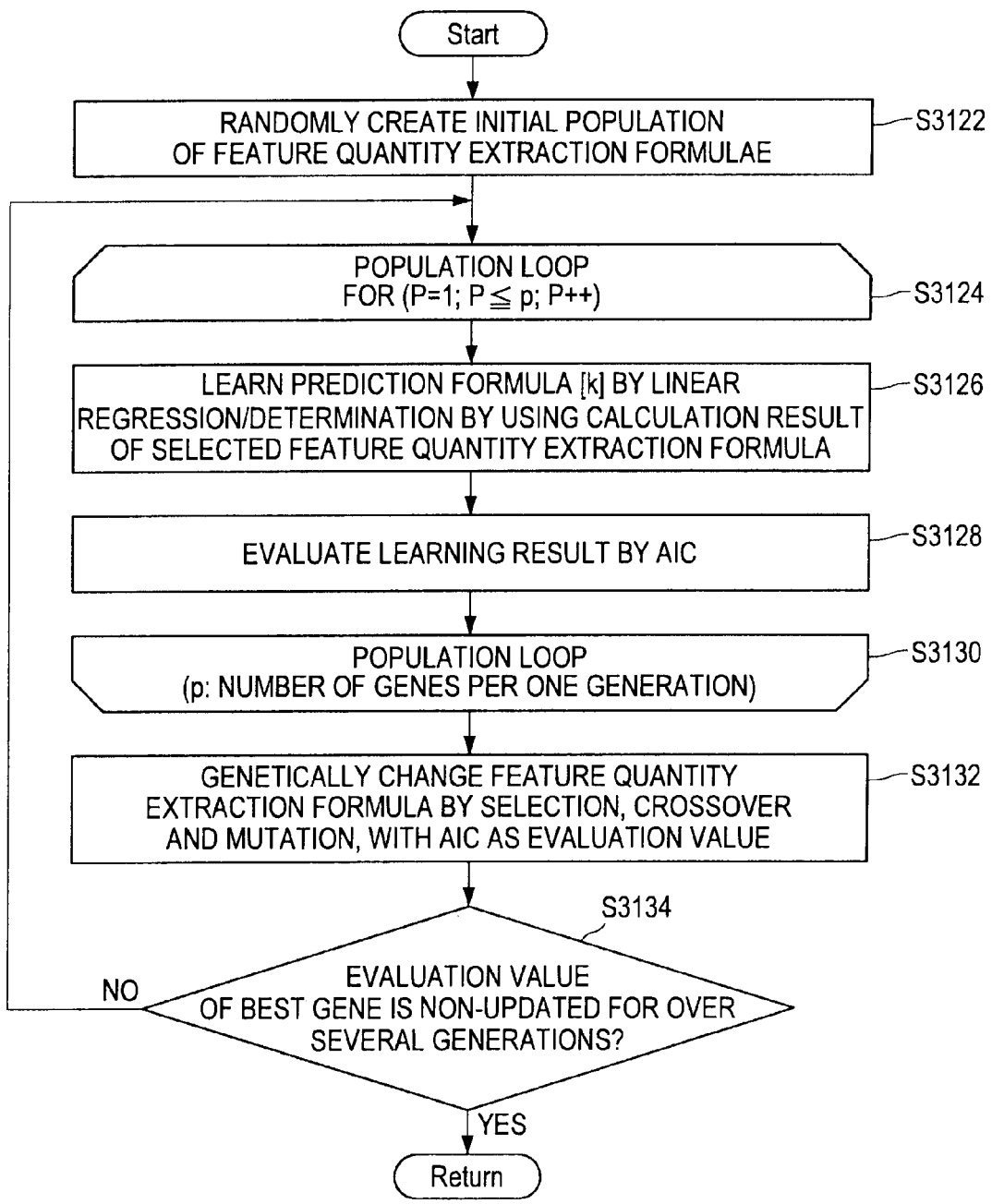
FIG. 42 is an explanatory diagram showing an automatic construction method of the evaluator of each embodiment of the present invention.

As shown in FIG. 42, the evaluator construction unit 104 or 204 randomly selects, from a feature quantity extraction formula list, feature quantity extraction formulae to be used for creation of an evaluation formula, and creates an initial population (first generation genes) (S3122). Here, the number of feature quantity extraction formulae forming the initial population is assumed to be set to p in advance. Then, the evaluator construction unit 104 or 204 repeatedly performs the processes of steps 53126 and S3128 while updating index P from 1 to p (S3124, S3130).

First, the evaluator construction unit 104 or 204 sets index P to 1, and proceeds with the process to step S3126 (S3124). Then, the evaluator construction unit 104 or 204 creates an evaluation formula for each of observation values 1 to K by performing linear regression and determination based on a feature quantity calculated by a feature quantity calculation unit 134 for a feature quantity extraction formula included in the initial population and prediction-basis data (S3126). Next, the evaluator construction unit 104 or 204 evaluates the evaluation formulae created in step S3126 by using AIC (S3128).

Next, the evaluator construction unit 104 or 204 returns the process to step S3124 (S3130), increments index P by 1 and proceeds with the process to step S3126 (S3124). Then, the evaluator construction unit 104 or 204 performs again the processes of steps S3126 and S3128. Then, the evaluator construction unit 104 or 204 repeats the processes of steps S3126 and S3128 until index P reaches p, and proceeds with the process to step S3132.

When the process proceeds to step S3132, the evaluator construction unit 104 or 204 uses AIC as the reliability, and changes a combination of feature quantity extraction formulae used for creation of an evaluation formula by selection, crossover and mutation (S3132). That is, in step S3132, the evaluator construction unit 104 or 204 creates second generation genes from the first generation genes.

Next, the evaluator construction unit 104 or 204 decides whether the reliability of the best gene is not updated for over a predetermined number of generations (S3134). In a case it is not a state where the reliability of the best gene is not updated for over a predetermined number of generations, the evaluator construction unit 104 or 204 returns the process to step S3124, and performs again the processes of steps S3124 to S3134.

On the other hand, in the case the reliability of the best gene is not updated for over a predetermined number of generations, the evaluator construction unit 104 or 204 proceeds with the process to step S3116. Furthermore, when the repeating process of steps S3112 to S3116 is complete, the evaluator construction unit 104 or 204 proceeds with the process to step S3118.

(S3118 (Cf. S306): Calculation of Contribution Rate)

Here, the process according to step S3118 mentioned above will be described in greater detail with reference to FIG. 43.

Figure 43:
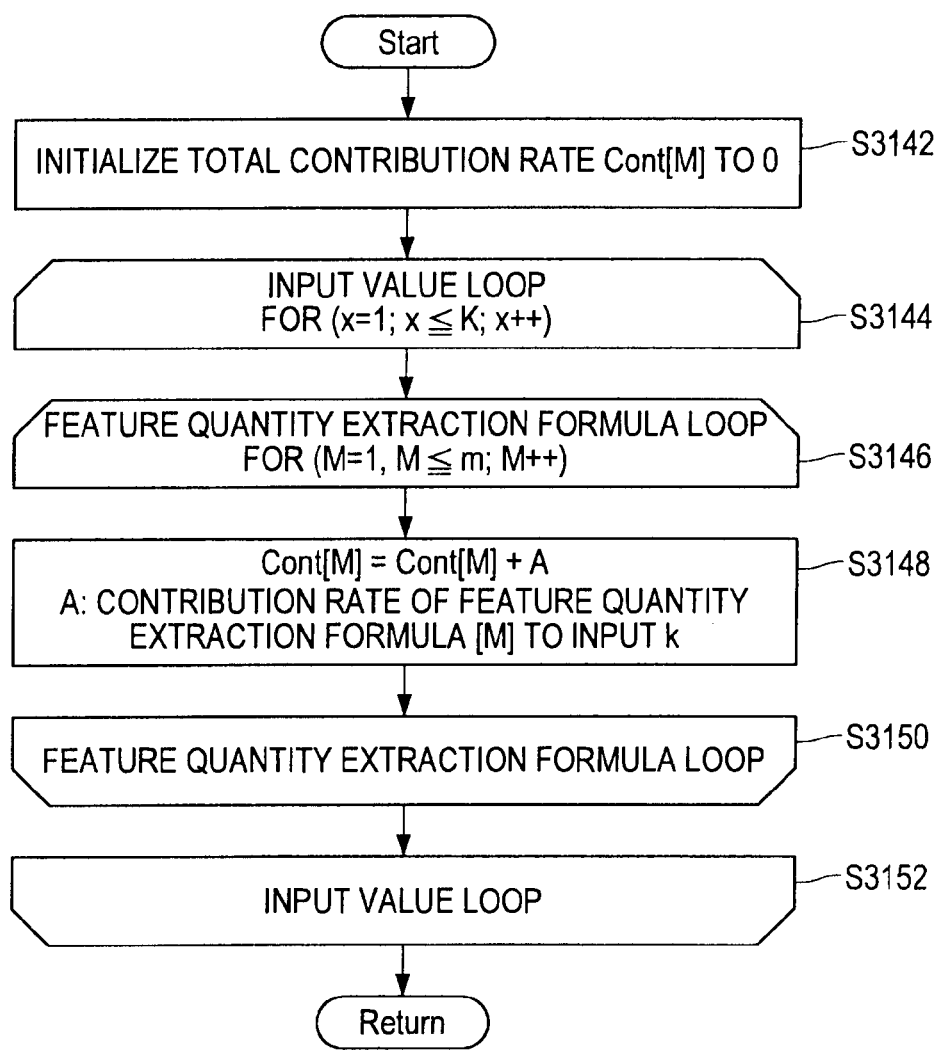
FIG. 43 is an explanatory diagram showing an automatic construction method of the evaluator of each embodiment of the present invention.

As shown in FIG. 43, the evaluator construction unit 104 or 204 initializes total contribution rate Cont[M] to 0 (S3142). Next, the evaluator construction unit 104 or 204 repeatedly performs the processes of steps S3146 to S3150 while updating index x from 1 to K (S3144, S3152). Also, in the case the process proceeded to step S3146, the evaluator construction unit 104 or 204 repeatedly performs the process of step S3148 while updating index M from 1 to m (S3146, S3150).

In step S3148, the evaluator construction unit 104 or 204 first calculates, with regard to observation value x, a contribution rate of feature quantity extraction formula [M] to an evaluation formula. This contribution rate is calculated based on a combination coefficient of feature quantity extraction formula [M] calculated for each observation value at the time of creating an evaluation formula. For example, the contribution rate is a value that includes a square of the combination coefficient. Additionally, the contribution rate of a feature quantity extraction formula not included in the evaluation formula is 0. Next, a machine learning unit 136 calculates total contribution rate Cont[M]=Cont[M]+contribution rate of feature quantity extraction formula [M] to observation value x (S3148).

By repeating the processes of steps S3144 to S3152 and repeating the processes of steps S3146 to S3150, the total contribution rate Cont[M] of each feature quantity extraction formula to the observation values 1 to K will be calculated for all the feature quantity extraction formulae included in the feature quantity extraction formula list. The total contribution rate Cont[M] of each feature quantity extraction formula calculated in step S3118 will be used as reliability for the evaluation formula. When the process of step S3118 is complete, the evaluator construction unit 104 or 204 ends the process of step S306.

Heretofore, the flow of automatic construction process of an evaluator has been described.

<8: Application Example (Prediction Algorithm for Time-Series Data)>

Next, a method of extending the technology of the above-described embodiment to an automatic construction method of a time-series prediction algorithm for predicting future time-series data from the past time-series data will be described with reference to FIG. 44. FIG. 44 is an explanatory diagram showing a method of extension to a time-series prediction algorithm.

The algorithm automatic construction method according to each embodiment described above is realized by modifying the configuration of data and correct answer information in a data set for evaluator construction and the configuration of input data. For example, as shown in FIG. 44, in a case time-series data is obtained for a plurality of observation values, prediction-basis data of a predetermined time width w and predicted data observed at a time following the prediction-basis data are extracted. Then, for each time, the prediction-basis data is set to the data in the data set for evaluator construction and the predicted data is set to the correct answer information.

First, an evaluator is constructed by using the data set for evaluator construction set in this manner and by machine learning based on a genetic algorithm. Then, a creation method of creating the predicted data from the prediction-basis data is prepared, and a prediction value of the predicted data is created by using the creation method. Next, the prediction value is input to the evaluator and an evaluation value is calculated, and the creation method is repeatedly updated by using the genetic algorithm in such a manner that the evaluation value will be higher. Then, in the case a terminating condition is satisfied, the creation method and the evaluation value are output. The creation method output here is the prediction algorithm for time-series data.

The prediction algorithm for time-series data described here is an application example of the first embodiment described above. By adopting this application example, it becomes possible to automatically create a prediction algorithm for predicting a prediction value of a data amount changing over time.

<9: Summary>

Lastly, technical contents of the embodiment of the present invention will be briefly summarized. The technical contents described here can be applied to various types of information processing apparatuses, such as a PC and a game machine.

The functional configuration of the information processing apparatus described above can be expressed as follows. The information processing apparatus includes a processing method preparation unit that prepares a processing method for data, an evaluation unit that calculates an evaluation value of output data obtained in a case data is processed by the processing method prepared by the processing method preparation unit, by using an evaluator for calculating the evaluation value from the data, the evaluator being automatically created by using a plurality of data sets including data and an evaluation value of the data and performing a learning process based on a genetic algorithm, a processing method update unit that repeatedly updates, based on the genetic algorithm, the processing method and calculates a processing method by which the evaluation value to be calculated by the evaluation unit will be higher, and an output unit that outputs, in a case the evaluation value of output data obtained in a case data is processed by the processing method calculated by the processing method update unit satisfies a predetermined condition, the output data, a combination of the output data and the processing method, or the processing method.

As described, by having an evaluator automatically constructed by machine learning based on a genetic algorithm and constructing an algorithm for creating desired output data by the genetic algorithm by using the evaluator, construction of an algorithm whose output data is not a scalar quantity is made possible. Also, this configuration enables automatic construction, by machine learning based on the genetic algorithm, of an algorithm whose correct answer is not uniquely determined.

It should be understood by those skilled in the art that various modifications, combinations, sub-combinations and alterations may occur depending on design requirements and other factors insofar as they are within the scope of the appended claims or the equivalents thereof.

The present application contains subject matter related to that disclosed in Japanese Priority Patent Application JP 2009-277083 filed in the Japan Patent Office on Dec. 4, 2009, the entire content of which is hereby incorporated by reference.

What is claimed is:

1. An information processing apparatus comprising:
a memory storing instructions; and
at least one processor configured to execute the instructions to:
generate a first processing method by performing a learning process based on a genetic algorithm using a plurality of data sets,
each data set including data and and a parameter representing a property of the each data;
generate a first output data by processing a first input data set using the first processing method, the first input data set including a first input data and a first parameter representing a property of the first data;
calculate a first evaluation value using the first output data;
calculate a second evaluation value by:
generating a second processing method by updating the first processing method;
generating a second output data by processing the first input data using the second processing method; and
calculating the second evaluation value using the second output data, wherein the second processing method is generated such that the second evaluation value is
higher than the first evaluation value when the first parameter has a first value, and
lower than the first evaluation value when the first parameter has a second value; and
output at least one of the second output data or the second processing method.

2. The information processing apparatus according to claim 1, wherein the at least one processor is further configured to input the data sets.

3. The information processing apparatus according to claim 1, wherein the at least one processor is further configured to:
receive, from a user, a second parameter representing a property of the second output data or the combination of the second output data and the second processing method; and
include in the data sets, a second data set including the second output data and the second parameter.

4. The information processing apparatus according to claim 3, wherein the at least one processor is further configured to:
process input data, input by a user using the first processing method or the second processing method; and
generate output data corresponding to the input data input by the user.

5. The information processing apparatus according to claim 3, wherein the at least one processor is further configured to:
process one of predetermined initial data or randomly created initial data by the first processing method or the second processing method; and
generate output data corresponding to the predetermined initial data or the randomly created initial data.

6. The information processing apparatus according to claim 5,
wherein the second processing method comprises calculating a prediction value of data to be observed at a certain time t from data observed before the time t, and
wherein the at least one processor is further configured to:
output at least the second processing method, and
predict time-series data of an observation value from a certain time point to a future time point by using the observation value at a certain time point as initial data and by applying the second processing method.

7. The information processing apparatus according to claim 1, wherein the at least one processor is further configured to:

use a second data set including a second parameter obtained from the user; and generate output data corresponding to the second data set.

8. A computer-implemented information processing method comprising the steps of:
    generating a first processing method based on a genetic algorithm using a plurality of data sets,
    each data set including data and a parameter representing a property of the each data;
    generating a first output data by processing the first input data set using the first processing method, the first input data set including a first input data and a first parameter representing a property of the first data;
    calculating the first evaluation value using the first output data;
    calculating a second evaluation value by:
        generating a second processing method by updating the first processing method;
        generating a second output data by processing the first input data using the second processing method; and
        calculating the second evaluation value using the second output data, wherein the second processing method is generated such that the second evaluation value is
            higher than the first evaluation value when the first parameter has a first value, and
            lower than the first evaluation value when the first parameter has a second value; and
    outputting at least one of the second output data or the second processing method.

9. A non-transitory computer-readable medium storing a program for causing a computer to execute the steps of:
    generating a first processing method based on a genetic algorithm using a plurality of data sets,
    each data set including data and a parameter representing a property of the each data;
    generating a first output data by processing the first input data set using the first processing method, the first input data set including a first input data and a first parameter representing a property of the first data;
    calculating the first evaluation value using the first output data;
    calculating a second evaluation value by:
        generating a second processing method by updating the first processing method;
        generating a second output data by processing the first input data using the second processing method; and
        calculating the second evaluation value using the second output data, wherein the second processing method is generated such that the second evaluation value is
            higher than the first evaluation value when the first parameter has a first value, and
            lower than the first evaluation value when the first parameter has a second value; and
    outputting at least one of the second output data or the second processing method.

* * * * *